US012802627B2

(12) United States Patent
Kim

(10) Patent No.: US 12,802,627 B2
(45) Date of Patent: Nov. 17, 2026

(54) DISPLAY DEVICE AND DRIVING METHOD OF THE SAME

(71) Applicant: LG Display Co., Ltd., Seoul (KR)

(72) Inventor: YoungJin Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/255,058

(22) Filed: Jun. 30, 2025

(65) Prior Publication Data

US 2026/0031027 A1 Jan. 29, 2026

(30) Foreign Application Priority Data

Jul. 26, 2024 (KR) ........................ 10-2024-0099649

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0861* (2013.01); *G09G 2310/0248* (2013.01); *G09G 2310/0267* (2013.01); *G09G 2310/0275* (2013.01); *G09G 2320/045* (2013.01); *G09G 2330/021* (2013.01); *G09G 2354/00* (2013.01)

(58) Field of Classification Search
None
See application file for complete search history.

(56) References Cited

U.S. PATENT DOCUMENTS

2009/0021455 A1* 1/2009 Miller .................. G09G 3/3216 345/77
2018/0211582 A1 7/2018 Sakariya et al.
2019/0347985 A1 11/2019 Shaeffer et al.
2026/0004707 A1* 1/2026 Zhai ......................... G09G 3/32

FOREIGN PATENT DOCUMENTS

KR 10-2018-0004247 A 1/2018
KR 10-2020-0106929 A 9/2020
KR 10-2023-0098350 A 7/2023
WO WO 2019/168763 A1 9/2019

* cited by examiner

*Primary Examiner* — Christopher J Kohlman
(74) *Attorney, Agent, or Firm* — Fenwick & West LLP

(57) ABSTRACT

A display device and a driving method of the same are disclosed, and more specifically, may provide a display device including a light emitting device including a first electrode and a second electrode, a column line electrically connected to the first electrode, a row line electrically connected to the second electrode, and a driver electrically connected to the column line and the row line, and configured to control an emission of the light emitting device in each of a plurality of sub-frame periods, wherein the light emitting device emits light with a first luminance in a first sub-frame period, wherein the light emitting device emits light with a second luminance different from the first luminance in a second sub-frame period different from the first sub-frame period, and wherein the first luminance is brighter than the second luminance, thereby providing a display device capable of low power consumption.

30 Claims, 35 Drawing Sheets

| | Lu1 | Lu2 | Lu3 | Lu4 | Lu5 | Lu6 | Lu7 | Lu8 | Lu9 | Lu10 | Lu_F |
|---|---|---|---|---|---|---|---|---|---|---|---|
| Case1 | 600 | 100 | 600 | 100 | 100 | 100 | 100 | 100 | 100 | 100 | 2000 |
| Case2 | 100 | 600 | 100 | 100 | 100 | 100 | 600 | 100 | 100 | 100 | 2000 |
| Case3 | 300 | 100 | 300 | 100 | 300 | 100 | 300 | 100 | 300 | 100 | 2000 |

FIG.34

DISPLAY DEVICE AND DRIVING METHOD OF THE SAME

CROSS REFERENCE TO RELATED APPLICATION

This application claims priority from Republic of Korea Patent Application No. 10-2024-0099649, filed on Jul. 26, 2024, which is hereby incorporated by reference in its entirety.

TECHNICAL FIELD

Embodiments of the present disclosure relate to a display device and a driving method of the same.

BACKGROUND

A display device is applied to various electronic devices such as televisions, mobile phones, laptops, and tablets. Display devices include an organic light emitting display (OLED) that emits light on their own, and a liquid crystal display (LCD) that requires a separate light source.

Recently, display devices with a light emitting diode (LED) are attracting attention as next-generation display devices. Since light emitting diodes are made of inorganic materials rather than organic materials, a display device with the light emitting diode has a characteristics of a faster lighting speed and superior light emitting efficiency, and can display high-luminance images compared to a liquid crystal display or an organic light emitting display.

SUMMARY

Embodiments of the present disclosure may provide a display device capable of reducing power consumption by directly supplying voltage to a light emitting device ED.

Embodiments of the present disclosure may provide a display device capable of easily implementing high luminance by directly supplying voltage to the light emitting device ED.

Embodiments of the present disclosure may provide a display device capable of preventing or at least reducing transistor deterioration that may occur when implementing high luminance by directly supplying voltage to the light emitting device ED.

Embodiments of the present disclosure may provide a display device capable of enabling low power consumption by directly supplying voltage to the light emitting device ED.

Embodiments of the present disclosure may provide a display device including a light emitting device including a first electrode and a second electrode, a column line electrically connected to the first electrode, a row line electrically connected to the second electrode, and a driver electrically connected to the column line and the row line, and configured to control an emission of the light emitting device in each of a plurality of sub-frame periods, wherein the light emitting device emits light with a first luminance in a first sub-frame period, wherein the light emitting device emits light with a second luminance different from the first luminance in a second sub-frame period different from the first sub-frame period, and wherein the first luminance is brighter than the second luminance.

Embodiments of the present disclosure may provide a display device including a light emitting device with a first electrode and a second electrode, a column driver electrically connected to the first electrode, and a row driver electrically connected to the second electrode, wherein the column driver includes a voltage control transistor electrically connected between the first electrode and a first voltage node, and an emission control transistor electrically connected between the first electrode and a driving voltage node.

Embodiments of the present disclosure may provide a driving method of a display device including a first driving step in which a light emitting device emits light with a first luminance in a first sub-frame period, and a second driving step in which the light emitting device emits light with a second luminance different from the first luminance in a second sub-frame period different from the first sub-frame period, wherein the light emitting device is driven during a frame period for expressing one frame, wherein the frame period includes the first sub-frame period and the second sub-frame period, and wherein, in the first driving step, the light emitting device emits light at the first luminance brighter than the second luminance.

According to embodiments of the present disclosure, it is possible to provide a display device capable of reducing power consumption by directly supplying voltage to a light emitting device ED.

According to embodiments of the present disclosure, it is possible to provide a display device capable of easily implementing high luminance by directly supplying voltage to the light emitting device ED.

According to embodiments of the present disclosure, it is possible to provide a display device capable of preventing transistor deterioration that may occur when implementing high luminance by directly supplying voltage to the light emitting device ED.

According to embodiments of the present disclosure, it is possible to provide a display device capable of enabling low power consumption by directly supplying voltage to the light emitting device ED.

BRIEF DESCRIPTION OF THE DRAWINGS

FIG. 32, FIG. 33, and FIG. 34 are examples of a luminance for each of a plurality of sub-frame periods according to embodiments of the present disclosure.

DETAILED DESCRIPTION

Figure 1:
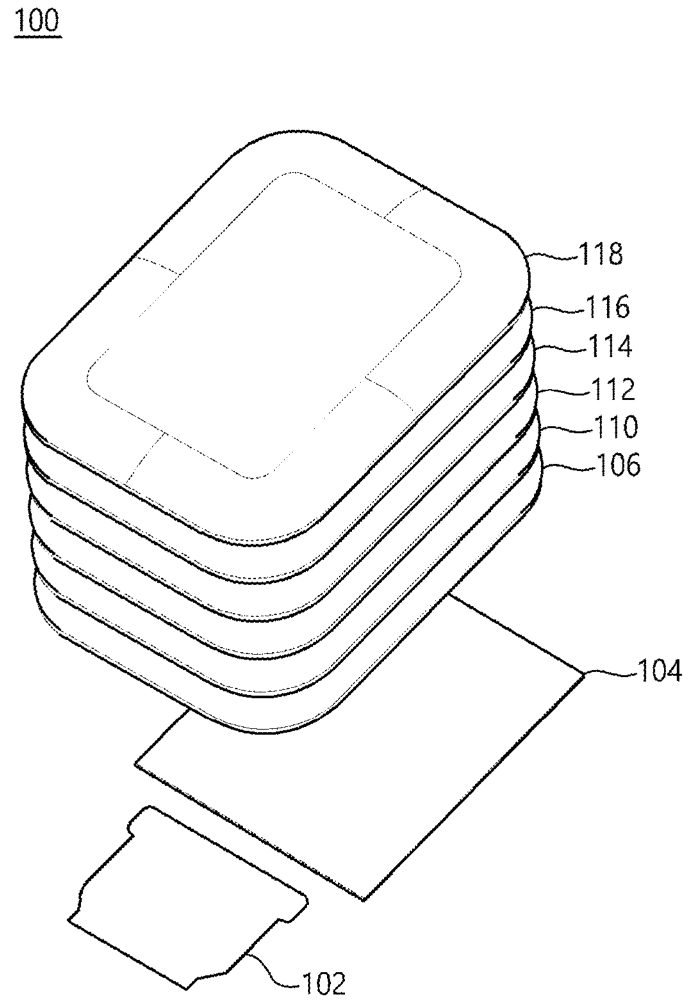
FIG. 1 illustrates a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as “including”, “having”, “containing”, and “constituting” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present invention. Each of these terms is not used to define essence, order, sequence, or number, etc. of elements, but is used merely to distinguish the corresponding element from other elements.

When it is mentioned that a first element “is connected or coupled to”, “overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “overlap”, etc. each other via a fourth element. Here, the second element may be included in at least one of two or more elements that “are connected or coupled to”, “overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various embodiments of the disclosure are described in detail with reference to the accompanying drawings.

Figure 2:
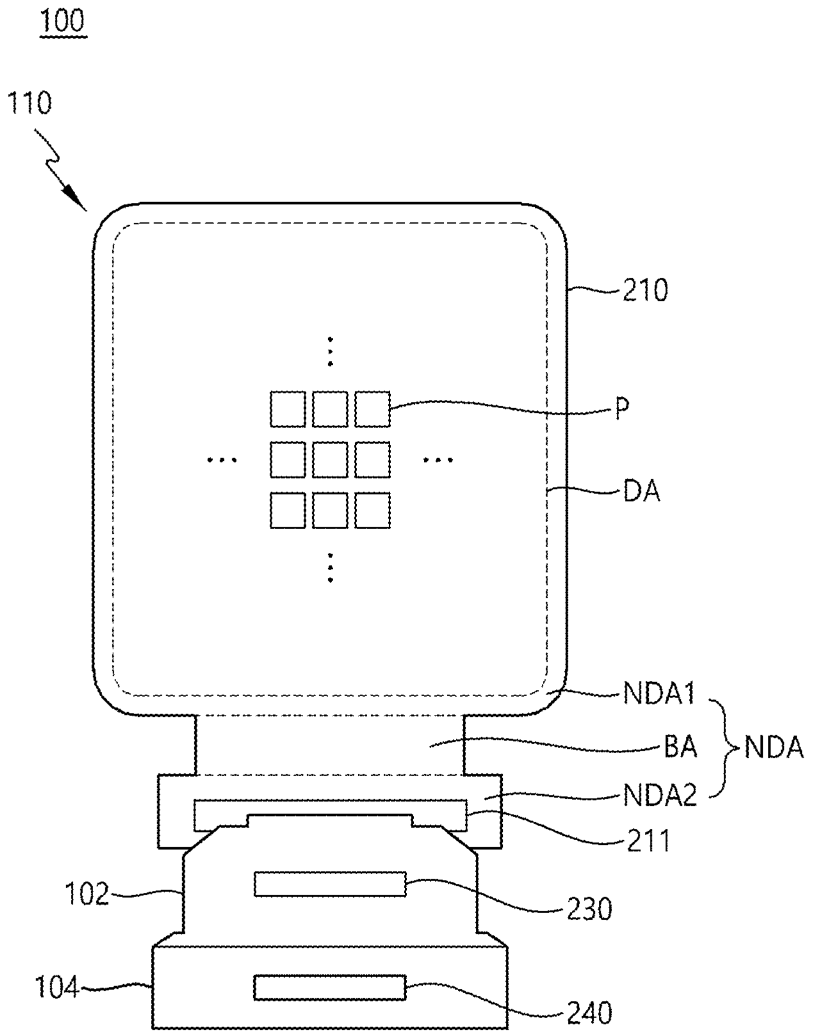
FIG. 2 is a plan view of a display device according to embodiments of the present disclosure.

FIG. 1 illustrates a display device 100 according to embodiments of the present disclosure, and FIG. 2 is a plan view of a display device 100 according to embodiments of the present disclosure.

Referring to FIG. 1, a display device 100 according to the embodiments of the present disclosure may include a display panel 110, a cover member 118 disposed on the display panel 110, a flexible printed circuit 102 connected to the display panel 110, and a printed circuit board 104 connected to the flexible printed circuit 102.

The display device 100 according to the embodiments of the present disclosure may further include a support substrate 106 disposed under the display panel 110 and supporting the lower portion of the display panel 110, a polarizing layer 114 disposed on the display panel 110, a first adhesive layer 112 disposed between the display panel 110 and the polarizing layer 114, and a second adhesive layer 116 disposed between the polarizing layer 114 and the cover member 118.

The display panel 110 may include a substrate 210. The substrate 210 may be a member on which various components such as a plurality of metal layers and a plurality of insulating material layers are formed. The substrate 210 may be made of an insulating material. For example, the substrate 210 may be made of glass or resin. In addition, the substrate 210 may be made of a flexible material. For example, the substrate 210 may be made of a flexible plastic material such as polyimide (PI). However, the embodiments of the present disclosure are not limited thereto.

The display panel 110 may display information, videos, and/or images provided to a user. For example, the display panel 110 may include a display area DA and a non-display area NDA. For example, the substrate 210 may include a display area DA and a non-display area NDA. The display area DA and the non-display area NDA are not limited to the substrate 210, but can be described throughout the entire display device 100.

The display area DA may be an area where an image is displayed. The display area DA may include a plurality of pixels P. Each of the plurality of pixels P may be composed of a plurality of subpixels. At least one light emitting device may be arranged in each of the plurality of subpixels. The light emitting device may be configured differently depending on the type of the display device 100. For example, if the display device 100 is an inorganic light emitting display device, the light emitting device may be an inorganic-based light emitting device, such as a light emitting diode (LED), a micro LED, or a mini LED, but the embodiments of the present disclosure are not limited thereto.

The non-display area NDA may be an area where an image is not displayed. In the non-display area NDA, various wirings, and circuits for driving a plurality of pixels P of the display area DA may be arranged. For example, various driving circuits and various wirings may be arranged in the non-display area NDA, and a pad section 211 to which an integrated circuit and a printed circuit are connected may be arranged, but the embodiments of the present disclosure are not limited thereto.

For example, the driving circuit may include a data driving circuit and/or a gate driving circuit, but the embodiments of the present disclosure are not limited thereto. Wires or lines supplied with a control signal for controlling the driving circuit may be arranged on the substrate 210. For example, the control signal may include various timing signals including a clock signal, an input data enable signal, and synchronization signals, but the embodiments of the present disclosure are not limited thereto. The control signal may be supplied to the substrate 210 from the outside of the substrate 210 through the pad section 211. For example, circuit components such as a flexible printed circuit 102 and a printed circuit board 104 may be connected to the pad section 211.

According to the present embodiments, the non-display area NDA may include a first non-display area NDA1, a bending area BA, and a second non-display area NDA2. For example, the first non-display area NDA1 may be an area surrounding at least a portion of the display area DA. The bending area BA may be an area extending from at least one of a plurality of sides of the first non-display area NDA1 and may be a bendable area. The second non-display area NDA2 may be an area extending from the bending area BA and may include a pad section 211. For example, the bending area BA may be in a bent state, and the remaining area of the substrate 210 excluding the bending area BA may be in a flat state. In this case, as the bending area BA is bent, the second non-display area NDA2 may be located on the back surface of the display area DA. However, the embodiments of the present disclosure are not limited thereto.

The display area DA of the substrate 210 or the display device 100 may be configured in various shapes according to the design of the display device 100. For example, the display area DA may be configured in a rectangular shape with four corners formed in a round shape, but the embodiments of the present disclosure are not limited thereto. In another example, the display area DA may be configured in a rectangular shape with four corners formed in a right angle shape, a circular shape or the like, but the embodiments of the present disclosure are not limited thereto.

According to the embodiments of the present disclosure, a width of the second non-display area NDA2 where the pad section 211 is arranged may be wider than a width of the bending area BA. In addition, a width of the display area DA may be wider than the width of the bending area BA. In the drawing, the width of the bending area BA is depicted as being narrower than the width of other areas of the substrate 210, but the shape of the substrate 210 including the bending area BA is exemplary, and the embodiments of the present disclosure are not limited thereto.

Referring to FIG. 1 and FIG. 2, a flexible printed circuit 102 and a printed circuit board 104 may be disposed at a lower portion of the display panel 110. The flexible printed circuit 102 and the printed circuit board 104 may be arranged at one edge of the display panel 110, but the embodiments of the present disclosure are not limited thereto. One side of the flexible printed circuit 102 may be connected to the display panel 110, and the other side may be connected to the printed circuit board 104, but the embodiments of the present disclosure are not limited thereto. The flexible printed circuit 102 may be a flexible film, but the embodiments of the present disclosure are not limited thereto.

The pad section 211 disposed in the second non-display area NDA2 includes a plurality of pads, and a driving component including one or more flexible printed circuits 102 and a printed circuit board 104 can be attached or bonded. The plurality of pads included in the pad section 211 are electrically connected to one or more flexible printed circuits 102, and may transmit various signals (or power) from the printed circuit board 104 and one or more flexible printed circuits 102 to a driving circuit (for example, a driver DRV of FIG. 3) arranged in the display area DA.

The flexible printed circuit 102 may be a film in which various components are arranged on a flexible base film. For example, a first circuit component 230, such as a gate drive integrated circuit and/or a data drive integrated circuit, may be arranged on one or more flexible printed circuits 102, but the embodiments of the present disclosure are not limited thereto. The first circuit component 230 may be a component that processes data and a driving signal for displaying an image. The first circuit component 230 may be arranged in a manner such as a chip-on-glass (COG), a chip-on-film (COF), or a tape carrier package (TCP) depending on the mounting method, but the embodiments of the present disclosure are not limited thereto. The flexible printed circuit 102 may be attached or bonded to a plurality of pads through a conductive adhesive layer, but the embodiments of the present disclosure are not limited thereto.

The printed circuit board 104 may be a component that is electrically connected to the flexible printed circuit 102 and supplies a signal to the first circuit component 230. The printed circuit board 104 may be arranged on one side of the flexible printed circuit 102 and may be electrically connected to the flexible printed circuit 102. Various components for supplying various signals to the first circuit component 230 may be arranged on the printed circuit board 104. For example, various second circuit components 240, such as a timing controller, a power supply, a memory, or a processor, may be arranged on the printed circuit board 104. For example, the second circuit components 240 arranged on the printed circuit board 104 may include a timing controller and/or a power management integrated circuit (PMIC), but the embodiments of the present disclosure are not limited thereto.

The printed circuit board 104 may include at least one hole, but the embodiments of the present disclosure are not limited thereto. An internal component detecting ambient light or temperature, such as a plurality of sensors, may be arranged in an area corresponding to at least one hole. For example, the internal component may include an ambient light sensor (ALS) or a temperature sensor, but the embodiments of the present disclosure are not limited thereto. For example, the hole may be a transmission hole, but the embodiments of the present disclosure are not limited thereto.

Referring to FIG. 1, a polarizing layer 114 may be arranged on a display panel 110 and may prevent or reduce light generated from an external light source from entering the display panel 110 and affecting a light emitting device.

A cover member 118 may be arranged on a polarizing layer 114 and may be a member for protecting the display panel 110.

A second adhesive layer 116 may be disposed between the polarizing layer 114 and the cover member 118. The second adhesive layer 116 may attach the cover member 118 to the display panel 110 or the polarizing layer 114.

A first adhesive layer 112 may be disposed between the display panel 110 and the polarizing layer 114. The first adhesive layer 112 may attach the polarizing layer 114 to the display panel 110. The first adhesive layer 112 may be omitted.

Each of the first adhesive layer 112 and the second adhesive layer 116 may include an optically clear adhesive (OCA), an optically clear resin (OCR), or a pressure sensitive adhesive (PSA), but the embodiments of the present disclosure are not limited thereto.

The support substrate 106 is disposed between the display panel 110 and the printed circuit board 104 to reinforce the rigidity of the display panel 110. The support substrate 106 may be a back plate, but the embodiments of the present disclosure are not limited thereto.

Figure 3:
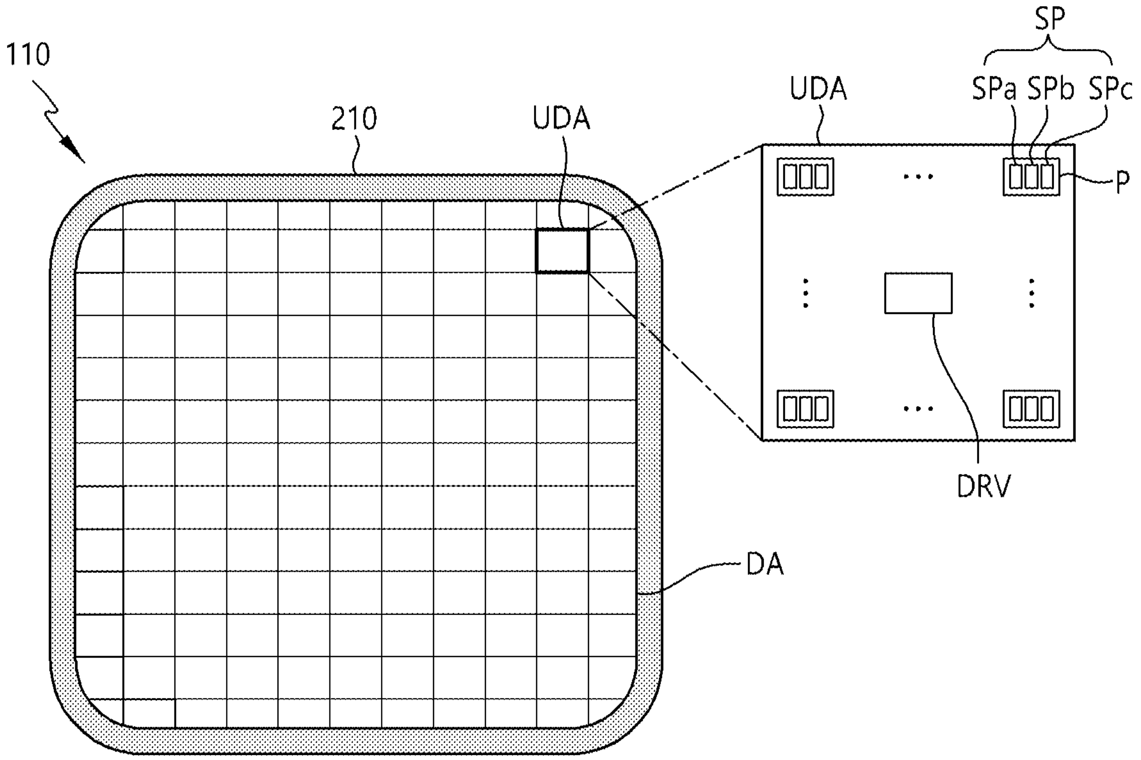
FIG. 3 is a plan view of a display panel according to embodiments of the present disclosure.
Figure 4:
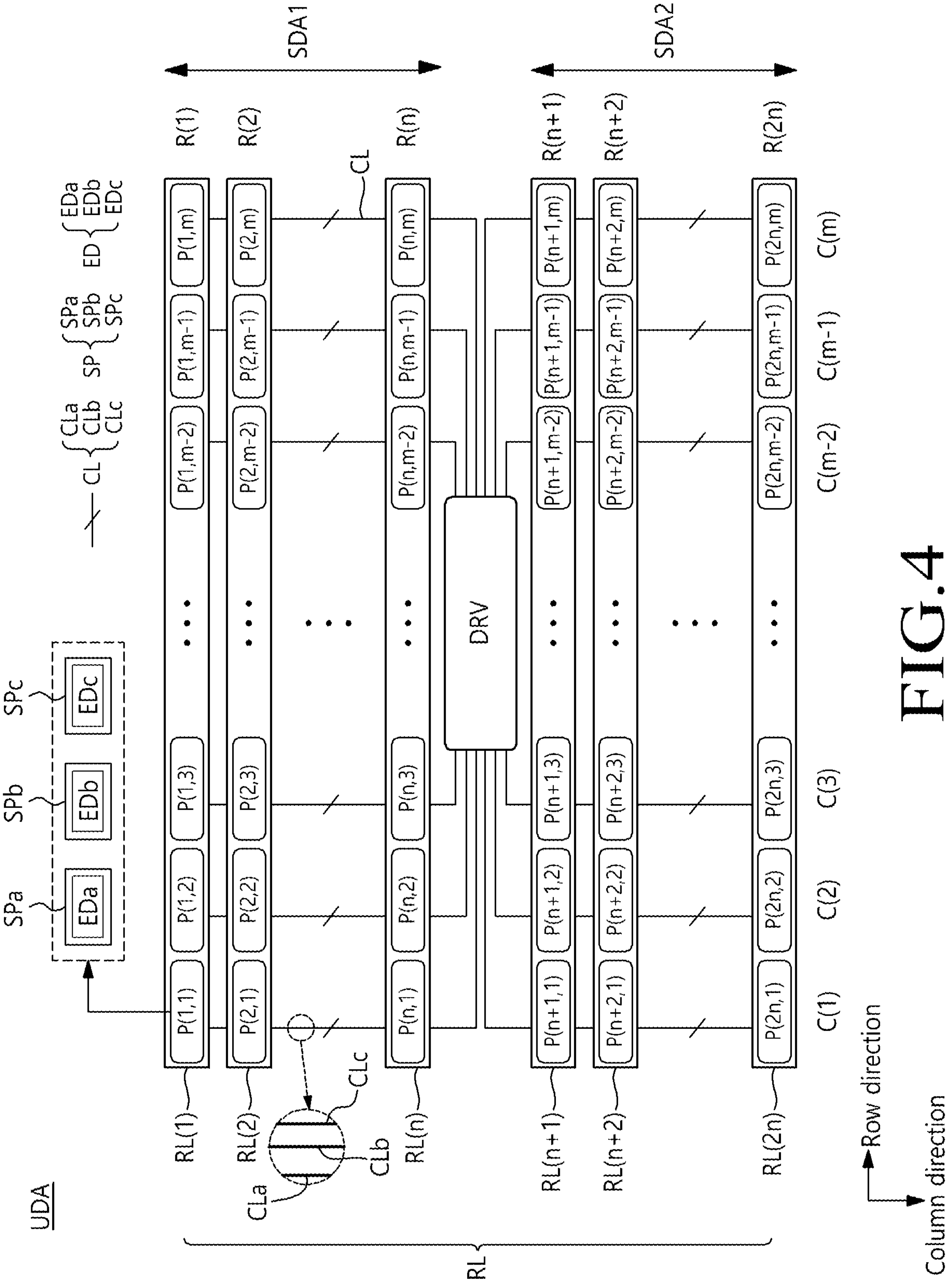
FIG. 4 is a plan view of a unit driving area of a display panel according to embodiments of the present disclosure.

FIG. 3 is a plan view of a display panel 110 according to embodiments of the present disclosure, and FIG. 4 is a plan view of a unit driving area UDA of a display panel 110 according to embodiments of the present disclosure.

Referring to FIG. 3, the display area DA of the display panel 110 according to the embodiments of the present disclosure may include a plurality of unit driving areas UDA.

Referring to FIG. 3, the display panel 110 according to the embodiments of the present disclosure may include a driver DRV arranged in each of the plurality of unit driving areas UDA. For example, the driver DRV may be a driving chip manufactured using a MOSFET (Metal-oxide-semiconductor field effect transistor) manufacturing process on a semiconductor substrate, but the embodiments of the present disclosure are not limited thereto.

Referring to FIG. 3, each of the plurality of unit driving areas UDA may be a driving area driven by one driver DRV. That is, the plurality of unit driving areas UDA may be independent driving areas driven by different drivers DRV.

Referring to FIG. 3, the display panel 110 according to the embodiments of the present disclosure may include a substrate 210 including a display area DA, and a plurality of pixels P arranged in a matrix form in the display area DA.

A plurality of pixels P may be arranged in each of the plurality of unit driving areas UDA. Each of the plurality of pixels P may include a plurality of subpixels SP. Each of the plurality of subpixels SP may include at least one light emitting device.

For example, the plurality of subpixels SP may include a first subpixel SPa, a second subpixel SPb, and a third subpixel SPc, but is not limited thereto. The first subpixel SPa may include a first light emitting device that emits a first color light, the second subpixel SPb may include a second light emitting device that emits a second color light, and the third subpixel SPc may include a third light emitting device that emits a third color light. For example, the first color light, the second color light, and the third color light may be red light, green light, and blue light, respectively, but are not limited thereto.

Referring to FIG. 4, the display panel 110 according to the embodiments of the present disclosure may include a plurality of light emitting devices ED. Each of the plurality of subpixels SP may include a light emitting device ED.

For example, the first subpixel SPa may include a first light emitting device EDa, the second subpixel SPb may include a second light emitting device EDb, and the third subpixel SPc may include a third light emitting device EDc.

Referring to FIG. 4, the display panel 110 according to the embodiments of the present disclosure may include a plurality of row lines RL and a plurality of column lines CL.

Each of the plurality of row lines RL may be arranged to extend in a row direction. The plurality of row lines RL may be electrically connected to a first electrode of each of a plurality of light emitting devices ED.

Each of the plurality of column lines CL may be arranged to extend in a column direction. The plurality of column lines CL may be electrically connected to a second electrode of each of the plurality of light emitting device ED.

For example, the first electrode of each of the plurality of light emitting device ED may be an anode electrode, and the second electrode of each of the plurality of light emitting device ED may be a cathode electrode. In another example, the first electrode of each of the plurality of light emitting device ED may be a cathode electrode, and the second electrode of each of the plurality of light emitting device ED may be an anode electrode.

Each of the plurality of row lines RL may be electrically connected to the second electrode of each of the plurality of light emitting device ED. That is, the second electrodes of each of the plurality of light emitting device ED may be commonly connected to one row line RL.

Each of the plurality of column lines CL may be electrically connected to the first electrode of each of the plurality of light emitting device ED. That is, the first electrode of each of the plurality of light emitting device ED may be commonly connected to one column line CL.

Referring to FIG. 4, the line width of each of the plurality of row lines RL may be greater than the line width of each of the plurality of column lines CL.

Referring to FIG. 4, the display panel 110 according to the embodiments of the present disclosure may include a plurality of drivers DRV. The plurality of drivers DRV may drive the plurality of light emitting device ED, the plurality of column lines CL, and the plurality of row lines RL.

The plurality of drivers DRV may be built into the display panel 110. The plurality of drivers DRV may be arranged in the display area DA and may be arranged on the substrate 210. The plurality of drivers DRV may be arranged to correspond to a plurality of unit driving areas UDA. That is, one driver DRV may be arranged in one unit driving area UDA.

Each of the plurality of drivers DRV can drive a plurality of row lines RL and a plurality of column lines CL arranged in a corresponding unit driving area UDA among the plurality of unit driving areas UDA, thereby emitting light from a plurality of light emitting device ED arranged in the corresponding unit driving area UDA.

The plurality of drivers DRV are disposed in the display area DA, and may be positioned closer to the substrate 210 than the plurality of light emitting device ED.

For example, the plurality of row lines RL may be driven sequentially. In another example, the plurality of row lines RL may be driven simultaneously. In another example, two or more row lines RL among the plurality of row lines RL may be driven simultaneously.

For example, during a specific display driving period, among the plurality of row lines RL arranged in the unit driving area UDA, at least one row line RL may be driven, and the remaining row lines RL may not be driven.

According to the embodiments of the present disclosure, a voltage applied to the row line RL may be referred to as a low-potential voltage, and the low-potential voltage may also be referred to as a row line voltage or a cathode voltage. The low-potential voltage may have various voltage values depending on the driving type or driving state. For example, the low-potential voltage may include a first low-potential voltage, a second low-potential voltage, and a third low-potential voltage.

Driving the row line RL may mean that the first low-potential voltage is supplied to the row line RL. Not driving the row line RL may mean that the second low-potential voltage higher than the first low-potential voltage is supplied to the row line RL. Accordingly, the light emitting device ED overlapping with the driven row line RL may emit light, and the light emitting device ED overlapping with the non-driven row line RL may not emit light.

For example, any first row line RL among the plurality of row lines RL may be supplied with a first low-potential voltage during a first period and may be supplied with a second low-potential voltage higher than the first low-potential voltage during a second period different from the first period. Accordingly, the light emitting devices ED overlapping with the first row line RL may emit light during the first period and may not emit light during the second period different from the first period. For example, the first period and the second period may be included in one display driving period. In another example, the first period and the second period may be included in different display driving periods.

The structure of one unit driving area UDA will be described in more detail with reference to FIG. 4.

Referring to FIG. 4, as an example, one unit driving area UDA may be divided into a first sub-driving area SDA1 and a second sub-driving area SDA2. As another example, one unit driving area UDA may be divided into three or more sub-driving areas. As another example, one unit driving area UDA may not be divided into two or more sub-driving areas.

Referring to FIG. 4, one unit driving area UDA may include one driver DRV and (2n×m) pixels P(1, 1), . . . , P(1, m), P(2, 1), . . . , P(2, m), . . . , P(2n, 1), . . . , P(2n, m) driven by one driver DRV.

In the embodiments of the present disclosure, n may be a sequence number of a row, or the number of rows in each of the first sub-driving area SDA1 and the second sub-driving area SDA2, or the number of row lines RL in each of the first sub-driving area SDA1 and the second sub-driving area SDA2, or the number of pixel rows in each of the first sub-driving area SDA1 and the second sub-driving area SDA2. m may be a sequence number of a column, or the number of columns in each of the first sub-driving area SDA1 and the second sub-driving area SDA2, or the number of column lines CL in each of the first sub-driving area SDA1 and the second sub-driving area SDA2, or the number of pixel columns in each of the first sub-driving area SDA1 and the second sub-driving area SDA2.

In the embodiments of the present disclosure, n may be a natural number greater than or equal to 1, and m may be a natural number greater than or equal to 1.

Referring to FIG. 4, (2n×m) pixels P(1, 1), . . . , P(1, m), P(2, 1), . . . , P(2, m), . . . , P(2n, 1), . . . , P(2n, m) may be arranged in 2n rows R(1), . . . , R(2n) and m columns C(1), . . . , C(m).

Among (2n×m) pixels P(1, 1), . . . , P(1, m), P(2, 1), . . . , P(2, m), . . . , P(2n, 1), . . . , P(2n, m), (n×m) pixels P(1, 1), . . . , P(1, m), P(2, 1), . . . , P(2, m), . . . , P(n, 1), . . . , P(n, m) arranged in the first to n-th rows R(1), . . . , R(n) may be arranged in the first sub-driving area SDA1.

Among (2n×m) pixels P(1, 1), . . . , P(1, m), P(2, 1), . . . , P(2, m), . . . , P(2n, 1), . . . , P(2n, m), (n×m) pixels P(n+1, 1), . . . , P(n+1, m), P(n+2, 1), . . . , P(n+2, m), . . . , P(2n, 1), . . . , P(2n, m) arranged in the (n+1)-th to the 2n-th row R(n+1), . . . , R(2n) may be arranged in the second sub-driving area SDA2.

Referring to FIG. 4, one unit driving area UDA may include 2n row lines RL(1), . . . , RL(2n) to drive (2n×m) pixels P(1, 1), . . . , P(1, m), P(2, 1), . . . , P(2, m), . . . , P(2n, 1), . . . , P(2n, m).

Among the 2n row lines RL(1), . . . , RL(2n), the first to n-th row lines R(1), . . . , RL(n) may be arranged in the first sub-driving area SDA1. Among the 2n row lines RL(1), . . . , RL(2n), the (n+1)-th to the 2n-th row lines R(n+1), . . . , R(2n) may be arranged in the second sub-driving area SDA2.

Each of the 2n row lines RL(1), . . . , RL(2n) may overlap with m pixels. For example, the first row line RL(1) may overlap with m pixels P(1, 1), . . . , P(1, m) arranged in the first row R(1). The n-th row line RL(n) may overlap with m pixels P(n, 1), . . . , P(n, m) arranged in the n-th row R(n). The (n+1)-th row line RL(n+1) may overlap with the m pixels P(n+1, 1), . . . , P(n+1, m) arranged in the (n+1)-th row R(n+1). The 2n-th row line RL(2n) may overlap with the m pixels P(2n, 1), . . . , P(2n, m) arranged in the 2nth row R(2n).

For example, the first row line RL(1) may be connected to the k subpixels SPa, SPb and SPc included in each of the m pixels P(1, 1), . . . , P(1, m) arranged in the first row R(1). More specifically, the first row line RL(1) may be connected to the second electrodes of the k light emitting devices EDa, EDb and EDc included in each of the m pixels P(1, 1), . . . , P(1, m) arranged in the first row R(1).

For example, the n-th row line RL(n) may be connected to the k subpixels SPa, SPb and SPc included in each of the m pixels P(n, 1), . . . , P(n, m) arranged in the n-th row R(n). More specifically, the n-th row line RL(n) may be connected to the first electrodes of the k light emitting devices EDa, EDb and EDc included in each of the m pixels P(n, 1), . . . , P(n, m) arranged in the n-th row R(n).

For example, the (n+1)-th row line RL(n+1) may be connected to k subpixels SPa, SPb and SPc included in each of m pixels P(n+1, 1), . . . , P(n+1, m) arranged in the (n+1)-th row R(n+1). More specifically, the (n+1)-th row line RL(n+1) may be connected to first electrodes of k light emitting devices EDa, EDb and EDc included in each of m pixels P(n+1, 1), . . . , P(n+1, m) arranged in the (n+1)-th row R(n+1).

For example, the 2n-th row line RL(2n) may be connected to k subpixels SPa, SPb and SPc included in each of m pixels P(2n, 1), . . . , P(2n, m) arranged in the 2n-th row R(2n). More specifically, the 2n-th row line RL(2n) may be connected to first electrodes of k light emitting devices EDa, EDb and EDc included in each of m pixels P(2n, 1), . . . , P(2n, m) arranged in the 2n-th row R(2n).

Referring to FIG. 4, one unit driving area UDA may include (m×k×2) column lines CL to drive (2n×m) pixels P(1, 1), . . . , P(1, m), P(2, 1), . . . , P(2, m), . . . , P(2n, 1), . . . , P(2n, m). Here, k is the number of subpixels SP included in one pixel P. In the example of FIG. 4, k is 3. That is, one pixel P may include three subpixels SPa, SPb and SPc.

The first sub-driving area SDA1 may include (m×k) column lines CL to drive (n×m) pixels P(1, 1), . . . , P(1, m), . . . , P(n, 1), . . . , P(n, m) arranged in the first sub-driving area SDA1. In the example of FIG. 4, since k is 3, the first sub-driving area SDA1 may include 3m column lines CL.

In the first sub-driving area SDA1, k column lines CLa, CLb and CLb may be arranged in each of the m columns C(1), . . . , C(m). In the example of FIG. 4, since k is 3, in the first sub-driving area SDA1, each of the m columns C(1), . . . , C(m) may include three column lines CLa, CLb and CLc.

In each of them columns C(1), . . . , C(m), each of the k column lines CL may be commonly connected to n pixels arranged in the corresponding column. In each of the m columns C(1), . . . , C(m), each of the k column lines CL may be commonly connected to first electrodes of n light emitting devices ED arranged in the corresponding column. In the example of FIG. 4, since k is 3, in each of the m columns C(1), . . . , C(m), three column lines CLa, CLb and CL may be connected to the first electrodes of the 3n light emitting devices ED included in the n pixels arranged in the corresponding column. For example, in each of the m columns C(1), . . . , C(m), a first column line CLa may be commonly connected to the first electrodes of the n first light emitting devices EDa arranged in the corresponding column. In each of the m columns C(1), . . . , C(m), a second column line CLb may be commonly connected to the first electrodes of the n second light emitting devices EDb arranged in the corresponding column. In each of the m columns C(1), . . . , C(m), a third column line CL3 may be commonly connected to the first electrodes of the n third light emitting devices EDc arranged in the corresponding column.

The second sub-driving area SDA2 may include (m×k) column lines CL to drive (n×m) pixels P(n+1, 1), . . . , P(n+1, m), . . . , P(2n, 1), . . . , P(2n, m) arranged in the second sub-driving area SDA2. In the example of FIG. 4, since k is 3, the second sub-driving area SDA2 may include 3m column lines CL.

In the second sub-driving area SDA2, k column lines CL may be arranged in each of them columns C(1), . . . , C(m). In the example of FIG. 4, since k is 3, in the second sub-driving area SDA2, each of the m columns C(1), . . . , C(m) may include three column lines CLa, CLb and CLc.

In each of them columns C(1), . . . , C(m), each of the k column lines CL may be commonly connected to n pixels arranged in the corresponding column. In each of the m columns C(1), . . . , C(m), each of the k column lines CL may be commonly connected to first electrodes of n light emitting devices ED arranged in the corresponding column. In the example of FIG. 4, since k is 3, in each of the m columns C(1), . . . , C(m), three column lines CLa, CLb and CL may be connected to the first electrodes of the 3n light emitting devices ED included in the n pixels arranged in the corresponding column. For example, in each of the m columns C(1), . . . , C(m), a first column line CLa may be commonly connected to the first electrodes of the n first light emitting devices EDa arranged in the corresponding column. In each of the m columns C(1), . . . , C(m), the second column line CLb may be commonly connected to the first electrodes of the n second light emitting devices EDb arranged in the corresponding column. In each of the m columns C(1), . . . , C(m), the third column line CL3 may be commonly connected to the first electrodes of the n third light emitting devices EDc arranged in the corresponding column.

Figure 5:
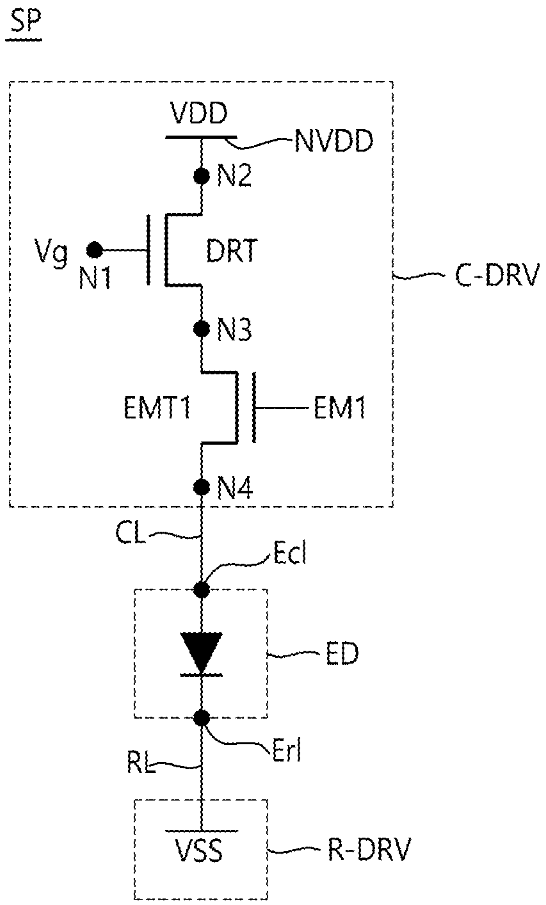
FIG. 5 illustrates a subpixel of a display panel according to embodiments of the present disclosure.

FIG. 5 illustrates a subpixel SP of a display panel 110 according to embodiments of the present disclosure.

Referring to FIG. 5, the subpixel SP according to embodiments of the present disclosure may include a light emitting device ED including a first electrode Ecl and a second electrode Erl, a column driver C-DRV for driving a column line CL electrically connected to the first electrode Ecl of the light emitting device ED, and a row driver R-DRV for driving a row line RL electrically connected to the second electrode Erl of the light emitting device ED.

Referring to FIG. 5, the light emitting device ED may include a first electrode Ecl and a second electrode Erl. The first electrode Ecl may be electrically connected to a column line CL, and the second electrode Erl may be electrically connected to a row line RL. For example, the first electrode Ecl may be an anode electrode, and the second electrode Erl may be a cathode electrode. In another example, the first electrode Ecl may be a cathode electrode, and the second electrode Erl may be an anode electrode.

Referring to FIG. 5, a column driver C-DRV included in a unit driving area UDA may be connected to a plurality of column lines CL included in the unit driving area UDA, and may drive a plurality of column lines CL included in the unit driving area UDA. Each of the plurality of column lines CL may be commonly connected to the first electrode Ecl of each of the plurality of light emitting devices ED included in the plurality of subpixels SP arranged in the corresponding column.

Referring to FIG. 5, a row driver R-DRV included in a unit driving area UDA may be connected to a plurality of row lines RL included in the unit driving area UDA and may drive a plurality of row lines RL included in the unit driving area UDA. Each of the plurality of row lines RL may be commonly connected to a second electrode Erl of each of a plurality of light emitting devices ED included in a plurality of subpixels SP arranged in the corresponding row.

Referring to FIG. 5, the column driver C-DRV may include main nodes including a first node N1, a second node N2, a third node N3, and a fourth node N4. The column driver C-DRV may include a driving transistor DRT and a first emission control transistor EMT1.

The first node N1 may be a node to which a voltage Vg for controlling the on-off of the driving transistor DRT is applied. The second node N2 may be a node electrically connected to a high-potential voltage node NVDD to which a high-potential voltage VDD is applied, also referred to as a driving voltage node. The third node N3 may be a node to which the driving transistor DRT and the first emission control transistor EMT1 are connected. The fourth node N4 may be a node to which the first emission control transistor EMT1 and the light emitting device ED are electrically connected and may be a node to which the column line CL is electrically connected. Here, a source electrode or a drain electrode of the first emission control transistor EMT1 and the first electrode Ecl of the light emitting device ED may be commonly connected to the column line CL.

The driving transistor DRT supplies a driving current to make the light emitting device ED emit light, is connected between the second node N2 and the third node N3 and may control the connection between the second node N2 and the third node N3 according to the voltage of the first node N1.

The gate electrode of the driving transistor DRT is electrically connected to the first node N1, and a gate voltage Vg may be applied thereto. The drain electrode or the source electrode of the driving transistor DRT may be electrically connected to the second node N2. The source electrode or the drain electrode of the driving transistor DRT may be electrically connected to the third node N3.

The first emission control transistor EMT1 may control a connection of a path through which the driving current flows, and may play a role in controlling an emission of the light emitting device ED.

If the driving transistor DRT and the first emission control transistor EMT1 are turned on between a high potential voltage VDD and a low potential voltage VSS, the driving current can be supplied to the light emitting device ED through the driving transistor DRT and the first emission control transistor EMT1. Accordingly, the light emitting device ED can emit light.

The first emission control transistor EMT1 is connected between the third node N3 and the fourth node N4 and can control the connection between the third node N3 and the fourth node N4 according to a first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or drain electrode of the first emission control transistor EMT1 may be electrically connected to the fourth node N4.

The first emission control signal EM1 may be a pulse width modulation signal that varies at a predefined time (for example, each frame, or each sub-frame included in one frame), but the embodiments of the present disclosure are not limited thereto.

The first emission control signal EM1 may be generated by the driver DRV, or may be supplied to the driver DRV from a driving-related circuit such as a timing controller.

Referring to FIG. 5, the row driver R-DRV may drive at least one row line RL by supplying a low-potential voltage VSS to at least one row line RL.

The row driver R-DRV may perform display-on driving or display-off driving for one row line RL.

The row driver R-DRV may supply a low-potential voltage for display-on driving to one row line RL in order to perform display-on driving for one row line RL. The row driver R-DRV may supply a low-potential voltage for display-off driving to one row line RL in order to perform display-off driving for one row line RL.

A low-potential voltage for display-on driving and a low-potential voltage for display-off driving may be different. For example, the low-potential voltage for display-on driving may be lower than the low-potential voltage for display-off driving. In the embodiments of the present disclosure, the "low-potential voltage for display-on driving" is also referred to as the "first low-potential voltage," and the "low-potential voltage for display-off driving" is also referred to as the "second low-potential voltage."

Referring to FIG. 5, the column driver C-DRV may further include at least one switching element and/or at least one transistor in addition to the driving transistor DRT and the first emission control transistor EMT1. Each of the transistors included in the column driver C-DRV may be an n-type transistor or a p-type transistor.

The column driver C-DRV may further include at least one capacitor.

The column driver C-DRV may further include at least one circuit element. For example, the at least one circuit element may include a power output buffer.

Referring to FIG. 5, the row driver R-DRV may include at least one switching element and/or at least one transistor. Each of the transistors included in the row driver R-DRV may be an n-type transistor or a p-type transistor.

The row driver R-DRV may further include at least one circuit element. For example, at least one circuit element may include a power output buffer.

Referring to FIG. 5, the column driver C-DRV and the row driver R-DRV may be internal circuits included in the driver DRV. As another example, the column driver C-DRV and the row driver R-DRV may not be included in the driver DRV and may be circuits formed on the substrate 210 of the display panel 110.

Figure 6:
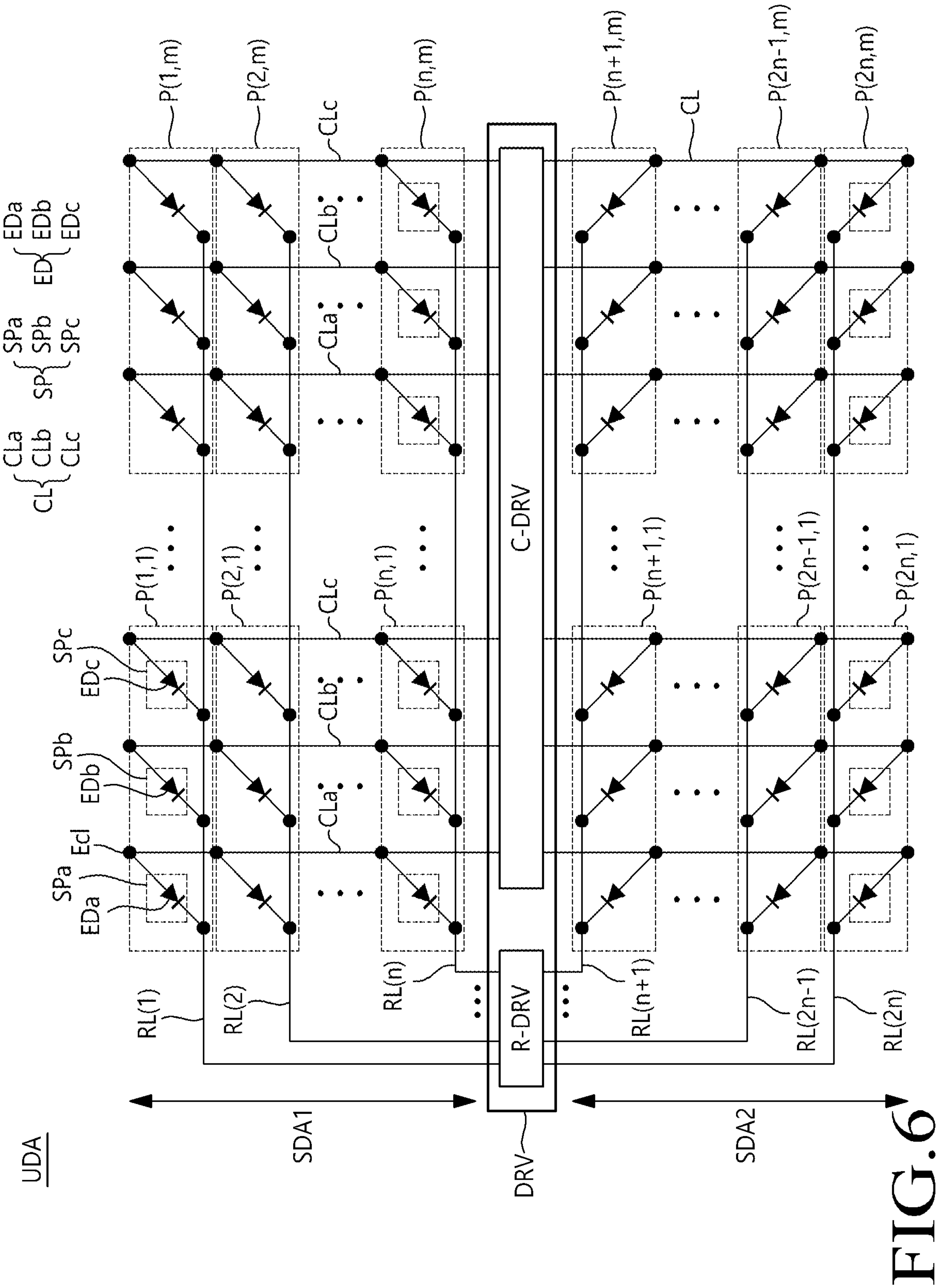
FIG. 6 is an equivalent circuit diagram of a unit driving area of a display panel according to embodiments of the present disclosure.

FIG. 6 is an equivalent circuit diagram of a unit driving area UDA of a display panel 110 according to embodiments of the present disclosure. In the following description, FIG. 4 and FIG. 5 are also referred to.

Referring to FIG. 6, each of the plurality of unit driving areas UDA may correspond to one driver DRV among the plurality of drivers DRV. For example, one driver DRV among the plurality of drivers DRV may be arranged in each of the plurality of unit driving areas UDAs.

Referring to FIG. 6, each of the plurality of unit driving areas UDAs may include two or more row lines RL(1) to RL(2n) among all row lines RL arranged in the display panel 110 and two or more column lines CL among all column lines CL arranged in the display panel 110.

Referring to FIG. 6, each of the plurality of unit driving areas UDAs may include a first sub-driving area SDA1 and a second sub-driving area SDA2. Some of the two or more row lines RL(1) to RL(2n) may be arranged in the first sub-driving area SDA1, and the rest may be arranged in the second sub-driving area SDA2. Some of the two or more column lines CL may be arranged in the first sub-driving area SDA1, and the rest may be arranged in the second sub-driving area SDA2.

Referring to FIG. 6, each of the plurality of unit driving areas UDAs may include a plurality of pixels P(1, 1), . . . , P(1, m), P(2, 1), . . . , P(2, m), . . . , P(2n, 1), . . . , P(2n, m) arranged in a matrix form.

Each of the plurality of pixels P(1, 1), . . . , P(1, m), P(2, 1), . . . , P(2, m), . . . , P(2n, 1), . . . , P(2n, m) may include k subpixels SPa, SPb and SPc. The k subpixels SPa, SPb and SPc may include k light emitting devices EDa, EDb and EDc.

Some of the plurality of pixels P(1, 1), . . . , P(1, m), P(2, 1), . . . , P(2, m), . . . , P(2n, 1), . . . , P(2n, m) may be arranged in the first sub-driving area SDA1, and the rest may be arranged in the second sub-driving area SDA2.

The k is the number of subpixels included in one pixel. In the example of FIG. 6, k is 3. That is, one pixel may include three subpixels SPa, SPb and SPc. Hereinafter, it will be described the structure of the unit driving area UDA is exemplary explained based on an example where k is 3.

The unit driving area UDA may include (2n×m) pixels P(1, 1), . . . , P(1, m), P(2, 1), . . . , P(2, m), . . . , P(2n, 1), . . . , P(2n, m). The (2n×m) pixels P(1, 1), . . . , P(1, m), P(2, 1), . . . , P(2, m), . . . , P(2n, 1), . . . , P(2n, m) may be arranged in 2n rows and m columns.

According to the example of FIG. 6, each of the (2n×m) pixels P(1, 1), . . . , P(1, m), P(2, 1), . . . , P(2, m), . . . , P(2n, 1), . . . , P(2n, m) may include three subpixels SPa, SPb and SPc.

According to the example of FIG. 6, three subpixels may include a first subpixel SPa including a first light emitting device EDa, a second subpixel SPb including a second light emitting device EDb, and a third subpixel SPc including a third light emitting device EDc.

Half of the (2n×m) pixels P(1, 1), . . . , P(1, m), P(2, 1), . . . , P(2, m), . . . , P(2n, 1), . . . , P(2n, m), which are (n×m) pixels P(1, 1), . . . , P(1, m), . . . , P(n, 1), . . . , P(n, m), may be arranged in the first sub-driving area SDA1.

Among the (2n×m) pixels P(1, 1), . . . , P(1, m), P(2, 1), . . . , P(2, m), . . . , P(2n, 1), . . . , P(2n, m), the remaining half(n×m) pixels P(n+1, 1), . . . , P(n+1, m), . . . , P(2n, 1), . . . , P(2n, m) may be arranged in the second sub-driving area SDA2.

According to the example of FIG. 6, the unit driving area UDA may include 2n row lines RL(1) to RL(2n) and (m×3×2) column lines CL.

Referring to FIG. 6, n row lines RL(1) to RL(n), which are half of 2n row lines RL(1) to RL(2n), may be arranged in the first sub-driving area SDA1, and n row lines RL(n+1) to RL(2n), which are the remaining half of 2n row lines RL(1) to RL(2n), may be arranged in the second sub-driving area SDA2.

Then row lines RL(1)-RL(n) arranged in the first sub-driving area SDA1 may correspond to (n×m) pixels P(1, 1), . . . , P(1, m), . . . , P(n, 1), . . . , P(n, m) arranged in the first sub-driving area SDA1 by row (i.e., pixel row).

For example, among the n row lines RL(1) to RL(n) arranged in the first sub-driving area SDA1, the first row line RL(1) arranged in the first row (i.e., the first pixel row) may correspond to m pixels P(1, 1), . . . , P(1, m) included in the first pixel row. The first row line RL(1) may be electrically connected to all of the second electrodes Erl of each of the 3m light emitting devices ED included in the first pixel row.

In another example, among the n row lines RL(1) to RL(n) arranged in the first sub-driving area SDA1, the second row line RL(2) arranged in the second row (i.e., the second pixel row) may correspond to m pixels P(2, 1), . . . , P(2, m) included in the second pixel row. The second row line RL(2) may be electrically connected to all of the second electrodes Erl of each of the 3m light emitting devices ED included in the second pixel row.

In another example, among the n row lines RL(1) to RL(n) arranged in the first sub-driving area SDA1, the n-th row line RL(n) arranged in the n-th row (i.e., the n-th pixel row) may correspond to the m pixels P(n, 1), . . . , P(n, m) included in the n-th pixel row. The n-th row line RL(n) may be electrically connected to all of the second electrodes Erl of each of the 3m light emitting devices ED included in the n-th pixel row.

Then row lines RL(n+1) to RL(2n) arranged in the second sub-driving area SDA2 may correspond to the (n×m) pixels P(n+1, 1), . . . , P(n+1, m), . . . , P(2n, 1), . . . , P(2n, m) arranged in the second sub-driving area SDA2 by row (i.e., pixel row).

For example, among then row lines RL(n+1) to RL(2n) arranged in the second sub-driving area SDA2, the (n+1)-th row line RL(n+1) arranged in the (n+1)-th row (i.e., the (n+1)-th pixel row) may correspond to the m pixels P(n+1, 1), . . . , P(n+1, m) included in the (n+1)-th pixel row. The (n+1)-th row line RL(n+1) may be electrically connected to all of the second electrodes Erl of each of the 3m light emitting devices ED included in the (n+1)-th pixel row.

In another example, among then row lines RL(n+1) to RL(2n) arranged in the second sub-driving area SDA2, the (2n−1)-th row line RL(2n−1) arranged in the (2n−1)-th row (i.e., the (2n−1)-th pixel row) may correspond to the m pixels P(2n−1, 1), . . . , P(2n−1, m) included in the (2n−1)-th pixel row. The (2n−1)-th row line RL(2n−1) may be electrically connected to all of the second electrodes Erl of each of the 3m light emitting devices ED included in the (2n−1)-th pixel row.

In another example, among then row lines RL(n+1) to RL(2n) arranged in the second sub-driving area SDA2, the 2n-th row line RL(2n) arranged in the 2n-th row (i.e., 2n-th pixel row) may correspond to the m pixels P(2n, 1), . . . , P(2n, m) included in the 2n-th pixel row. The 2n-th row line RL(2n) may be electrically connected to all of the second electrodes Erl of each of the 3m light emitting devices ED included in the 2n-th pixel row.

Referring to FIG. 6, 3m column lines CL, which are half of the (m×3×2) column lines CL, may be arranged in the first sub-driving area SDA1, and the remaining half of the (m×3×2) column lines CL, which are 3m column lines CL, may be arranged in the second sub-driving area SDA2.

Referring to FIG. 6, 3m column lines CL arranged in the first sub-driving area SDA1 may correspond to (n×m) pixels P(1, 1), . . . , P(1, m), . . . , P(n, 1), . . . , P(n, m) placed in the first sub-driving area SDA1 by column (i.e., pixel column).

For example, among the 3m column lines CL arranged in the first sub-driving area SDA1, three first column lines CLa, CLb and CLc arranged in a first column (i.e., the first pixel column) may correspond to n pixels P(1, 1), P(2, 1), . . . , P(n, 1) arranged in the first pixel column.

In the first sub-driving area SDA1, three first column lines CLa, CLb and CL arranged in the first pixel column may be connected to three subpixels SPa, SPb and SPc included in each of n pixels P(1, 1), P(2, 1), . . . , P(n, 1) arranged in the first pixel column.

In the first sub-driving area SDA1, three first column lines CLa, CLb and CL arranged in the first pixel column may be electrically connected to all of the first electrodes Ecl of three light emitting devices EDa, EDb and EDc included in each of n pixels P(1, 1), P(2, 1), . . . , P(n, 1) arranged in the first pixel column.

For example, among the 3m column lines CL arranged in the first sub-driving area SDA1, three m-th column lines CLa, CLb and CL arranged in a m-th column (i.e., m-th pixel column) may correspond to n pixels P(1, m), P(2, m), . . . , P(n, m) arranged in the m-th pixel column.

In the first sub-driving area SDA1, three m-th column lines CLa, CLb and CLc arranged in the m-th pixel column may be connected to three subpixels SPa, SPb and SPc included in each of n pixels P(1, m), P(2, m), . . . , P(n, m) arranged in the m-th pixel column.

In the first sub-driving area SDA1, three m-th column lines CLa, CLb and CLc arranged in the m-th pixel column may be electrically connected to all of the first electrodes Ecl of three light emitting devices EDa, EDb and EDc included in each of n pixels P(1, m), P(2, m), . . . , P(n, m) arranged in the m-th pixel column.

Referring to FIG. 6, 3m column lines CL arranged in the second sub-driving area SDA2 may correspond to (n×m) pixels P(n+1, 1), . . . , P(n+1, m), . . . , P(2n, 1), . . . , P(2n, m) arranged in the second sub-driving area SDA2 by column (i.e., pixel column).

For example, among the 3m column lines CL arranged in the second sub-driving area SDA2, three first column lines CLa, CLb and CLc arranged in the first column (i.e., the first pixel column) may correspond to n pixels P(n+1, 1), . . . , P(2n−1, 1), P(2n, 1) arranged in the first pixel column.

In the second sub-driving area SDA2, three first column lines CLa, CLb and CLc arranged in the first pixel column may be connected to three subpixels SPa, SPb and SPc included in each of n pixels P(n+1, 1), . . . , P(2n−1, 1), P(2n, 1) arranged in the first pixel column.

In the second sub-driving area SDA2, the three first column lines CLa, CLb and CLc arranged in the first pixel column may be electrically connected to all of the first electrodes Ecl of the three light emitting devices EDa, EDb and EDc included in each of the n pixels P(n+1, 1), . . . , P(2n−1, 1), P(2n, 1) arranged in the first pixel column.

For example, among the 3m column lines CL arranged in the second sub-driving area SDA2, the three m-th column lines CLa, CLb and CL arranged in the m-th column (i.e., the m-th pixel column) may correspond to the n pixels P(n+1, m), . . . , P(2n−1, m), P(2n, m) arranged in the m-th pixel column.

In the second sub-driving area SDA2, three m-th column lines CLa, CLb and CLc arranged in the m-th pixel column can be connected to three subpixels SPa, SPb and SPc included in each of n pixels P(n+1, m), . . . , P(2n−1, m), P(2n, m) arranged in the m-th pixel column.

In the second sub-driving area SDA2, three m-th column lines CLa, CLb and CLc arranged in the m-th pixel column may be electrically connected to all of the first electrodes Ecl of three light emitting devices EDa, EDb and EDc included in each of n pixels P(n+1, m), . . . , P(2n−1, m), P(2n, m) arranged in the m-th pixel column.

Referring to FIG. 6, two or more row lines RL(1) to RL(2n) arranged in the unit driving area UDA may be electrically connected to the row driver R-DRV included in the driver DRV of the unit driving area UDA. Two or more column lines CL arranged in the unit driving area UDA may be electrically connected to the column driver C-DRV included in the driver DRV of the unit driving area UDA.

Referring to FIG. 6, the driver DRV may be arranged between the first sub-driving area SDA1 and the second sub-driving area SDA2.

Figure 7:
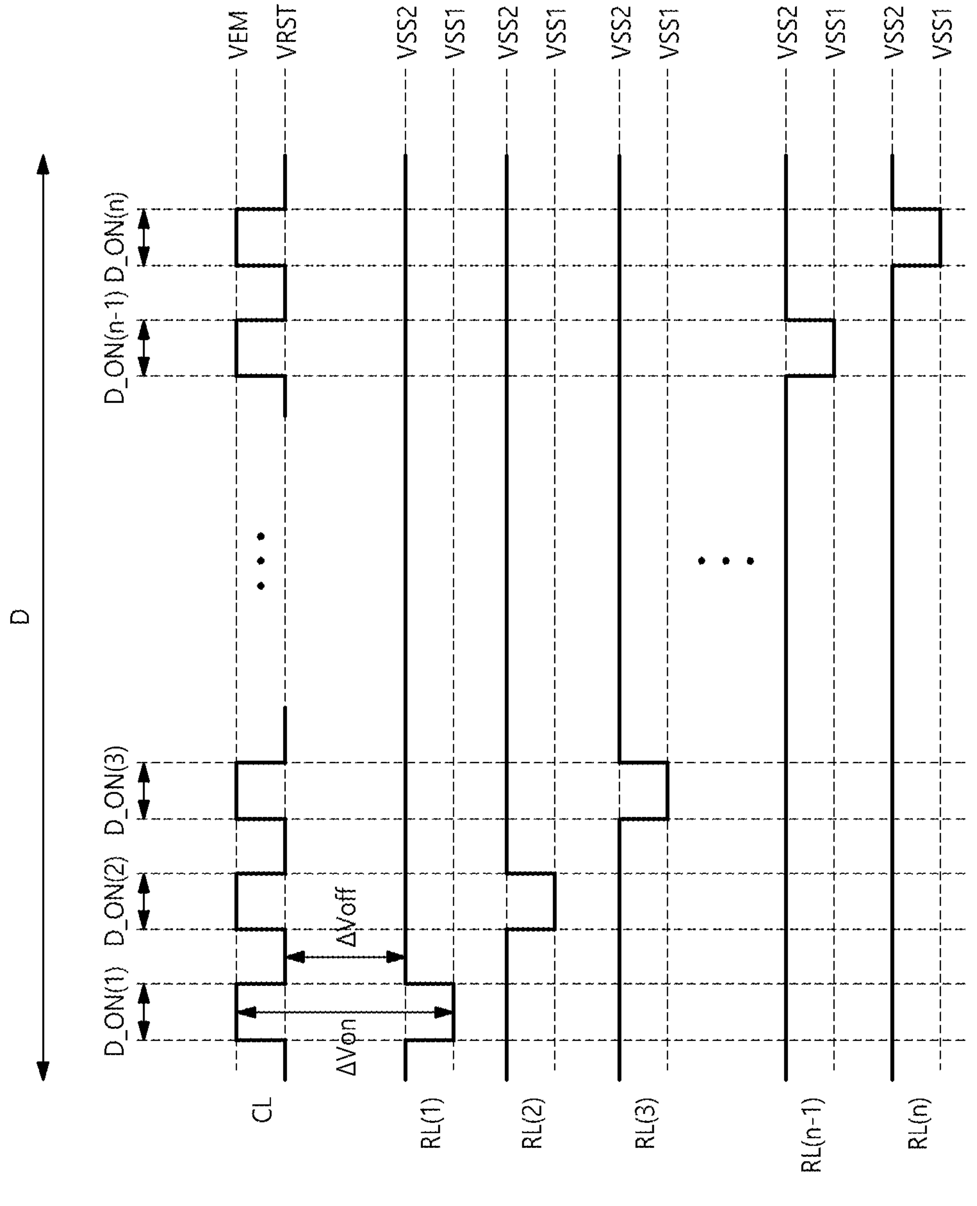
FIG. 7 illustrates a driving timing diagram for n row lines and one column line included in a first sub-driving area of a display panel according to embodiments of the present disclosure.

FIG. 7 illustrates a driving timing diagram for n row lines RL(1) to RL(n) and one column line CL included in a first sub-driving area SDA1 of a display panel 110 according to embodiments of the present disclosure. However, FIG. 6 is also referred to in the following description.

The row driver R-DRV of the driver DRV may drive n row lines RL(1) to RL(n) arranged in the first sub-driving area SDA1.

The driving for each of the n row lines RL(1) to RL(n) arranged in the first sub-driving area SDA1 may include display-on driving for emitting light emitting devices ED arranged in each of the n row lines RL(1) to RL(n) and display-off driving for not emitting light emitting devices EDs arranged in each of the n row lines RL(1) to RL(n).

Hereinafter, it will be exemplified the driving sequence for each of the n row lines RL(1) to RL(n) arranged in the first sub-driving area SDA1.

For example, display-on driving for each of the plurality of row lines RL may be performed sequentially. As another example, display-on driving for each of the plurality of row lines RL may be performed simultaneously. As another example, display-on driving for each of two or more row lines RL among the plurality of row lines RL may be performed simultaneously. Hereinafter, for convenience of explanation, it will be described as an example a case in which display-on driving for each of the plurality of row lines RL is performed sequentially. However, it is not limited thereto.

The row driver R-DRV of the driver DRV may sequentially drive n row lines RL(1) to RL(n) arranged in the first sub-driving area SDA1. That is, display-on driving periods D_ON(1) to D_ON(n) for n row lines RL(1) to RL(n) arranged in the first sub-driving area SDA1 may be sequential.

Among then row lines RL(1) to RL(n) arranged in the first sub-driving area SDA1, for anyone row line RL, during the display driving period D, the display-on driving period D_ON(1) for the corresponding row line RL may exist at least once. During the display driving period D, all remaining times except the display-on driving period D_ON(1) for the corresponding row line RL may be display-off driving periods.

Referring to FIG. 7, during any one display driving period D, among the n row lines RL(1) to RL(n) arranged in the unit driving area UDA, the display-on driving may be performed for at least one row line RL, and the display-on driving may not be performed for the remaining row lines RL, but the display-off driving may be performed.

For example, during any one display driving period D, among the n row lines RL(1) to RL(n) arranged in the unit driving area UDA, display-on driving may be performed for a first row line RL(1), and display-off driving may be performed for the second to n-th row lines RL(2) to RL(n).

In another example, during any one display driving period D, among the n row lines RL(1) to RL(n) arranged in the unit driving area UDA, display-on driving may be performed for the second row line RL(2), and display-on driving may not be performed for the first row line RL(1) and a third to n-th row lines RL(3) to RL(n).

In another example, during any one display driving period D, among the n row lines RL(1) to RL(n) arranged in the unit driving area UDA, display-on driving may be performed for the third row line RL(3), and display-off driving may be performed instead of display-on driving for the first and second row lines RL(1), RL(2) and the fourth to n-th row lines RL(4) to RL(n).

In another example, during any one display driving period D, among the n row lines RL(1) to RL(n) arranged in the unit driving area UDA, display-on driving may be performed for the (n−1)-th row line RL(n−1), and display-off driving may be performed instead of display-on driving for the first to (n−2)-th row lines RL(1) to RL(n−2) and the n-th row line RL(n).

In another example, during any one display driving period D, among the n row lines RL(1) to RL(n) arranged in the unit driving area UDA, display-on driving may be performed for the n-th row line RL(n), and display-off driving may be performed instead of display-on driving for the first to (n−1)-th row lines RL(1) to RL(n−1).

Referring to FIG. 7, if display-on driving is performed for any row line RL among the n row lines RL(1) to RL(n) arranged in the unit driving area UDA, it may mean that a first low-potential voltage VSS1 of a predefined level is supplied to the corresponding row line RL. When display-on driving is performed for any row line RL, the light emitting devices ED arranged corresponding to the corresponding row line RL may emit light.

When display-off driving is performed for any row line RL among the n row lines RL(1) to RL(n) arranged in the unit driving area UDA without display-on driving, it may mean that a second low-potential voltage VSS2 of a predefined level is supplied to the corresponding row line RL.

When display-off driving is performed for a specific row line RL, the light emitting devices ED arranged corresponding to the corresponding row line RL may not emit light.

The first low-potential voltage VSS1 may be a low-potential voltage VSS for display-on driving, and the second low-potential voltage VSS2 may be a low-potential voltage VSS for display-off driving. The second low-potential voltage VSS2 may be a voltage higher than the first low-potential voltage VSS1.

Referring to FIG. 7, any one row line RL among the n row lines RL(1) to RL(n) arranged in the unit driving area UDA may be supplied with the first low-potential voltage VSS1 during a first period, and may be supplied with the second low-potential voltage VSS2 higher than the first low-potential voltage VSS1 during a second period different from the first period. For example, the first period and the second period may be included in one display driving period D. In another example, the first period and the second period may be included in different display driving periods D.

For example, among the n row lines RL(1) to RL(n) arranged in the unit driving area UDA, the first row line RL(1) may be supplied with a first low-potential voltage VSS1 during a first display-on driving period D_ON(1), and may be supplied with a second low-potential voltage VSS2 higher than the first low-potential voltage VSS1 during a second to the n-th display-on driving period D_ON(2) to D_ON(n) different from the first display-on driving period D_ON(1).

For example, during the first display-on driving period D_ON(1), the first row line RL(1) may be supplied with a first low-potential voltage VSS1, and the second to n-th row lines RL(2) to RL(n) may be supplied with a second low-potential voltage VSS2. During the second display-on driving period D_ON(2), the second row line RL(2) may be supplied with a first low-potential voltage VSS1, and the first row line RL(1) and the third to n-th row lines RL(3) to RL(n) may be supplied with a second low-potential voltage VSS2.

For example, during the first display-on driving period D_ON(1), a plurality of light emitting devices ED overlapping with the first row line RL(1) and arranged in the first row may emit light, and a plurality of light emitting devices ED overlapping with the second to n-th row lines RL(2) to RL(n) and arranged in the second to n-th rows may not emit light. During the second display-on driving period D_ON (2), a plurality of light emitting devices ED overlapping with the second row line RL(2) and arranged in the second row may emit light, and a plurality of light emitting devices ED overlapping with the first row line RL(1) and the third to n-th row lines RL(3) to RL(n) and arranged in the first row and the third to n-th rows may not emit light.

For example, the first display-on driving period D_ON(1) and the second to the n-th display-on driving period D_ON (2) to D_ON(n) may be included in one display driving period D. In another example, the first display-on driving period D_ON(1) and the second to the n-th display-on driving period D_ON(2) to D_ON(n) may be included in different display driving periods D.

Referring to FIG. 7, (m×k) column lines CL may be arranged in a unit driving area UDA. In the unit driving area UDA, the (m×k) column lines CL may intersect with n row lines RL(1) to RL(n). The column line CL illustrated in FIG. 7 may be one of the (m×k) column lines CL.

During the display driving period D, each of the (m×k) column lines CL intersecting the n row lines RL(1) to RL(n) may be supplied with a display voltage VEM required to emit light from the corresponding light emitting device ED in synchronization with the display-on driving period D_ON (1) to D_ON(n) of each of the n row lines RL(1) to RL(n). Here, the display voltage VEM may also be referred to as a light emitting driving voltage or an emission driving voltage.

During the display driving period D, during all remaining times except for the display-on driving period D_ON(1) to D_ON(n) of each of the n row lines RL(1) to RL(n), a reset voltage VRST may be applied to each of the (m×k) column lines CL intersecting the n row lines RL(1) to RL(n).

The display voltage VEM may be a constant voltage or a voltage that varies depending on the image signal. The reset voltage VRST may be a voltage that is lower than the display voltage VEM, and may be a constant voltage or a variable voltage.

During the display driving period D, during the display-on driving period D_ON(1) to D_ON(n) of each of the n row lines RL(1) to RL(n), the voltage difference VEM-VSS1 between the display voltage VEM applied to the corresponding column line CL and the first low-potential voltage VSS1 applied to the corresponding row line RL may be a display-on voltage ΔVon.

A light emitting device ED may be connected between the corresponding column line CL and the corresponding row line RL. A display voltage VEM and a first low-potential voltage VSS1 may be applied to each of the first electrode Ecl and the second electrode Er of the light emitting device ED.

The display-on voltage ΔVon is a voltage difference between the first electrode Ecl and the second electrode Erl of the light emitting device ED, and may be a voltage that can cause the light emitting device ED to emit light. For example, the display-on voltage ΔVon may be equal to or higher than a threshold voltage, which is a unique characteristic value of the light emitting device ED.

During the display driving period D, during all the remaining time except for the display-on driving period D_ON(1) to D_ON(n) of each of the n row lines RL(1) to RL(n), the voltage difference VRST-VSS2 between the reset voltage VRST applied to the corresponding column line CL and the second low-potential voltage VSS2 applied to the corresponding row line RL may be a display-off voltage ΔVoff.

A light emitting device ED may be connected between the corresponding column line CL and the corresponding row line RL. A reset voltage VRST and a second low-potential voltage VSS2 may be applied to each of the first electrode Ecl and the second electrode Erl of the light emitting device ED.

The display-off voltage ΔVoff is a voltage difference between the first electrode Ecl and the second electrode Erl of the corresponding light emitting device ED, and may be a voltage that does not allow the corresponding light emitting device ED to emit light. For example, the display-off voltage ΔVoff may be less than the threshold voltage, which is a unique characteristic value of the corresponding light emitting device ED. That is, the display-on voltage ΔVon may be greater than or equal to the display-off voltage ΔVoff.

Hereinafter, it will be described in more detail a circuit for driving n light emitting devices ED(1) to ED(n) connected to one column line CL in the display panel 110 according to embodiments of the present disclosure.

Figure 8:
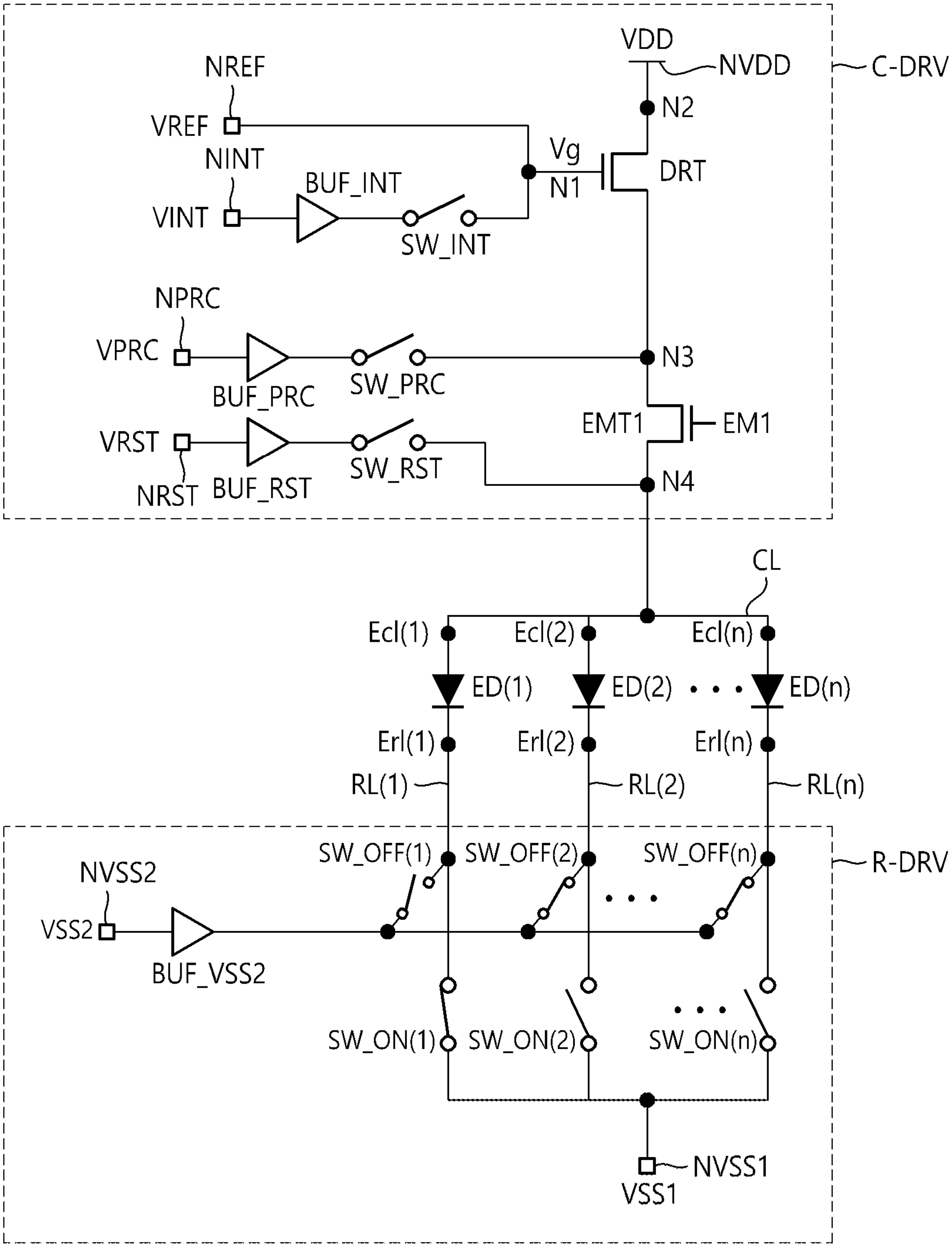
FIG. 8 and FIG. 9 illustrate circuits for driving n light emitting devices connected to one column line included in a first sub-driving area of a display panel according to embodiments of the present disclosure.

FIG. 8 illustrates a circuit for driving n light emitting devices ED(1) to ED(n) connected to one column line CL included in a first sub-driving area SDA1 of a display panel 110 according to embodiments of the present disclosure. FIG. 4 and FIG. 6 may also be referred to in the following description.

Referring to FIG. 8, n light emitting devices ED(1) to ED(n) connected to one column line CL may be arranged in the same column. The n light emitting devices ED(1) to ED(n) arranged in the same column may be connected to one column line CL. The n light emitting devices ED(1) to ED(n) connected to one column line CL may be arranged in one of the first sub-driving area SDA1 and the second sub-driving area SDA2 included in the unit driving area UDA.

The n light emitting devices ED(1) to ED(n) connected to one column line CL may be light emitting devices emitting the same color light. The n light emitting devices ED(1) to ED(n) arranged in the same column may be light emitting devices emitting the same color light.

For example, the n light emitting devices ED(1) to ED(n) arranged in the same column may emit light sequentially. As another example, the n light emitting devices ED(1) to ED(n) arranged in the same column may emit light simultaneously. As another example, two or more of n light emitting devices ED(1) to ED(n) arranged in the same column may emit light simultaneously.

Referring to FIG. 8, n light emitting devices ED(1) to ED(n) arranged in the same column may include first electrodes Ecl(1) to Ecl(n) and second electrodes Erl(1) to Erl(n).

All first electrodes Ecl(1) to Ecl(n) of n light emitting devices ED(1) to ED(n) arranged in the same column may be connected to one column line CL. The second electrodes Erl(1) to Erl(n) of the n light emitting devices ED(1) to ED(n) arranged in the same column may be respectively connected to the n row lines RL(1) to RL(n).

Referring to FIG. 8, a circuit for driving the n light emitting devices ED(1) to ED(n) arranged in the same column may include a column driver C-DRV and a row driver R-DRV.

The column driver C-DRV may be configured to drive the column line CL connected to all of the first electrodes Ecl(1) to Ecl(n) of the n light emitting devices ED(1) to ED(n) arranged in the same column.

The row driver R-DRV may be configured to drive n row lines RL(1) to RL(n) which are respectively connected to the second electrodes Erl(1) to Erl(n) of n light emitting devices ED(1) to ED(n) arranged in the same column.

Referring to FIG. 8, the column driver C-DRV may include first to fourth nodes N1 to N4, and may include a driving transistor DRT and a first emission control transistor EMT1.

The first node N1 may be a node to which a voltage Vg for controlling the on-off of the driving transistor DRT is applied. The second node N2 may be a node electrically connected to a high-potential voltage node NVDD to which a high-potential voltage VDD is applied. The third node N3 may be a node to which the driving transistor DRT and the first emission control transistor EMT1 are connected. The fourth node N4 may be a node to which the first emission control transistor EMT1 and the n light emitting devices ED(1) to ED(n) are electrically connected, and may be a node to which the column line CL is electrically connected. Here, the source electrode or the drain electrode of the first emission control transistor EMT1 and the first electrodes Ecl(1) to Ecl(n) of the n light emitting devices ED(1) to ED(n) may be commonly connected to the column line CL.

The driving transistor DRT supplies a driving current to emit light to n light emitting devices ED(1) to ED(n), is connected between the second node N2 and the third node N3, and may control the connection between the second node N2 and the third node N3 according to the voltage of the first node N1.

The gate electrode of the driving transistor DRT is electrically connected to the first node N1, and is supplied with a gate voltage Vg. The drain electrode or the source electrode of the driving transistor DRT may be electrically connected to the second node N2. The source electrode or the drain electrode of the driving transistor DRT may be electrically connected to the third node N3.

The first emission control transistor EMT1 may control the connection of a path through which the driving current flows, and may play a role in controlling an emission of the light emitting device ED.

The first emission control transistor EMT1 is connected between the third node N3 and the fourth node N4, and may control the connection between the third node N3 and the fourth node N4 according to the first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or the drain electrode of the first emission control transistor EMT1 may be electrically connected to the fourth node N4.

The first emission control signal EM1 may be a pulse width modulation signal that varies at a predefined time (for example, each frame, or each sub-frame included in one frame), but the embodiments of the present disclosure are not limited thereto.

The first emission control signal EM1 may be generated from the driver DRV or supplied to the driver DRV from a driving-related circuit such as a timing controller.

Referring to FIG. 8, the column driver C-DRV may further include a reference voltage node NREF electrically connected to the first node N1. A reference voltage VREF may be applied to the reference voltage node NREF. Here, the reference voltage VREF may be a gate voltage Vg of the driving transistor DRT.

For example, the reference voltage VREF may have a constant voltage value.

In another example, the reference voltage VREF may have a different voltage value depending on the color of the light emitted from the light emitting device ED in which the display-on operation is performed. For example, the reference voltage VREF applied to the first node N1 during the driving period for emitting light of the light emitting device EDa emitting a first color light, the reference voltage VREF applied to the first node N1 during the driving period for emitting light of the light emitting device EDb emitting a second color light, and the reference voltage VREF applied to the first node N1 during the driving period for emitting light of the light emitting device EDc emitting a third color light may have different voltage values.

Referring to FIG. 8, the column driver C-DRV may further include an initialization voltage node NINT electrically connected to the first node N1 through an initialization switch SW_INT. An initialization voltage VINT may be applied to the initialization voltage node NINT. Here, the initialization voltage VINT may be a gate voltage Vg of the driving transistor DRT.

The column driver C-DRV may further include an initialization buffer BUF_INT connected between the initialization switch SW_INT and the initialization voltage node NINT. The initialization buffer BUF_INT may amplify the initialization voltage VINT applied to the initialization voltage node NINT and supply an amplified initialization voltage to the first node N1.

Referring to FIG. 8, the column driver C-DRV may further include a pre-charge voltage node NPRC electrically connected to a third node N3 through a pre-charge switch SW_PRC. A pre-charge voltage VPRC may be applied to the pre-charge voltage node NPRC.

The column driver C-DRV may further include a pre-charge buffer BUF_PRC connected between the pre-charge switch SW_PRC and the pre-charge voltage node NPRC. The pre-charge buffer BUF_PRC may amplify the pre-charge voltage VPRC applied to the pre-charge voltage node NPRC and supply the amplified pre-charge voltage to the third node N3.

Referring to FIG. 8, the column driver C-DRV may further include a reset voltage node NRST electrically connected to a fourth node N4 through a reset switch SW_RST. A reset voltage VRST may be applied to the reset voltage node NRST.

The column driver C-DRV may further include a reset buffer BUF_RST connected between the reset switch SW_RST and the reset voltage node NRST. The reset buffer BUF_RST may amplify the reset voltage VRST applied to the reset voltage node NRST and supply the amplified reset voltage to the fourth node N4. Here, the fourth node N4 may be electrically connected to the corresponding column line CL.

Referring to FIG. 8, the row driver R-DRV may be configured to drive n row lines RL(1) to RL(n) each connected to the second electrodes Erl(1) to Erl(n) of n light emitting devices ED(1) to ED(n) arranged in the same column.

Referring to FIG. 8, the row driver R-DRV may include n display-on switches SW_ON(1) to SW_ON(n) that electrically connect each of n row lines RL(1) to RL(n) to a first low-potential voltage node NVSS1. A first low-potential voltage VSS1 may be applied to the first low-potential voltage node NVSS1.

The turn-on timing of each of the n display-on switches SW_ON(1) to SW_ON(n) may be different from each other. Accordingly, display-on driving for the n row lines RL(1) to RL(n) may be sequentially performed.

Referring to FIG. 8, the row driver R-DRV may include n display-off switches SW_OFF(1) to SW_OFF(n) that electrically connect each of the n row lines RL(1) to RL(n) to a second low-potential voltage node NVSS2 to which a second low-potential voltage VSS2 is applied. The second low-potential voltage VSS2 may be a low-potential voltage higher than the first low-potential voltage VSS1.

The row driver R-DRV may further include a second low-potential buffer BUF_VSS2 connected between the n display-off switches SW_OFF(1) to SW_OFF(n) and the second low-potential voltage node NVSS2.

The turn-on timing of each of the n display-off switches SW_OFF(1) to SW_OFF(n) may be different from each other. Accordingly, the display-off driving for the n display-off switches SW_OFF(1) to SW_OFF(n) may be performed at different timings.

According to the example of FIG. 8, the row driver R-DRV may perform display-on driving for the first row line RL(1) among the n row lines RL(1) to RL(n), and perform display-off driving for the second to n-th row lines RL(2) to RL(n).

To this end, among the n display-on switches SW_ON(1) to SW_ON(n), a first display-on switch SW_ON(1) may be in a turn-on state, and a second to n-th display-on switches SW_ON(2) to SW_ON(n) may be in a turn-off state. In addition, among the n display-off switches SW_OFF(1) to SW_OFF(n), the first display-off switch SW_OFF(1) may be in a turn-off state, and the second to n-th display-off switches SW_OFF(2) to SW_OFF(n) may be in a turn-on state.

Accordingly, among then row lines RL(1) to RL(n), a first low-potential voltage VSS1 may be applied to the first row line RL(1), and a second low-potential voltage VSS2 may be applied to the second to n-th row lines RL(2) to RL(n). Here, the first low-potential voltage VSS1 may have a lower voltage value than the second low-potential voltage VSS2.

Referring to FIG. 8, each of the transistors DRT and EMT1 included in the column driver C-DRV may be an n-type transistor or a p-type transistor. The switches SW_ON(1) to SW_ON(n), and SW_OFF(1) to SW_OFF(n) included in the row driver R-DRV may be implemented as an n-type transistor or a p-type transistor. The column driver C-DRV may further include at least one capacitor.

Hereinafter, it will be described the different circuit structures of the column driver C-DRV and the row driver R-DRV with reference to FIG. 9.

Figure 9:
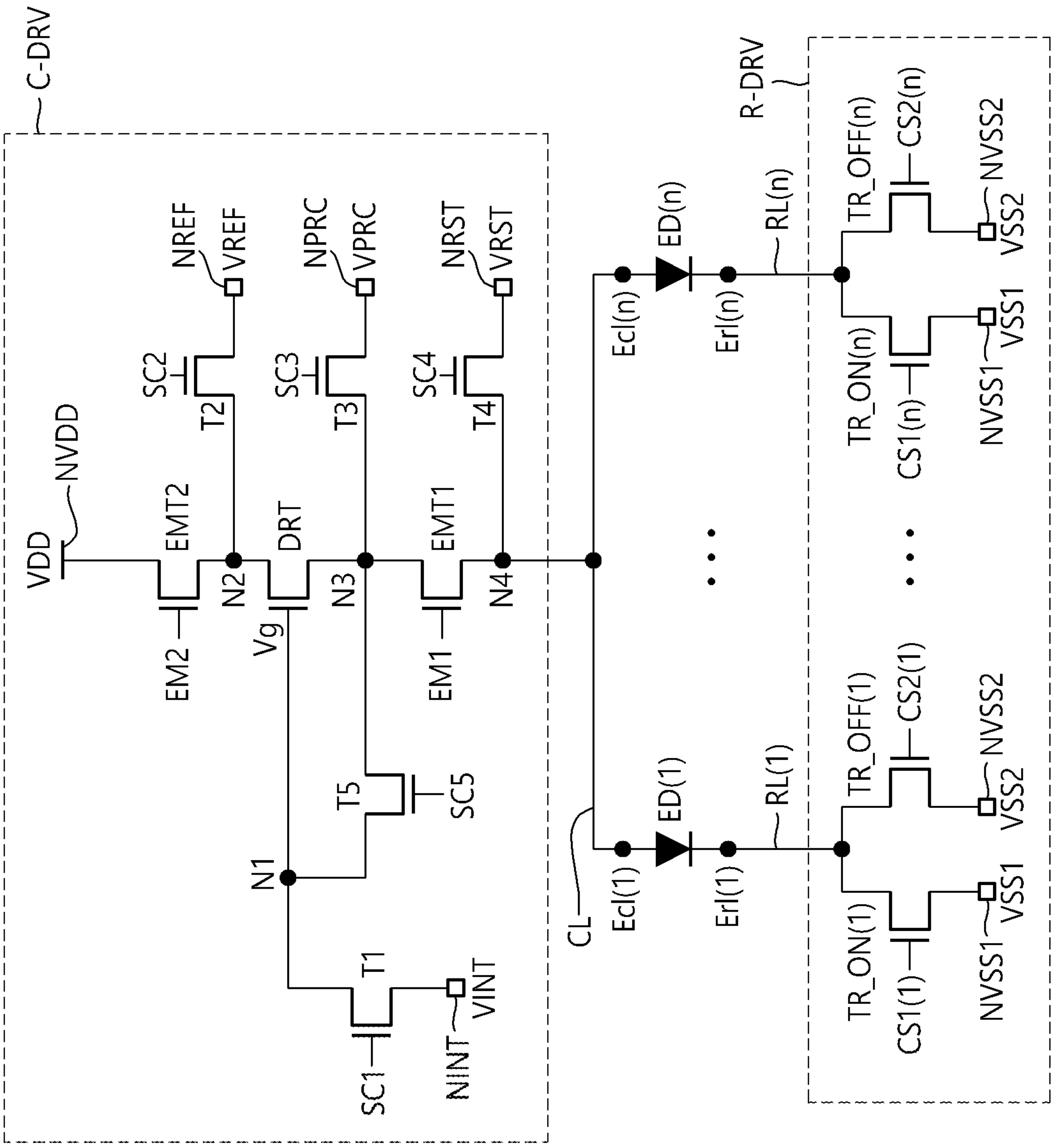

FIG. 9 illustrates another circuit for driving n light emitting devices ED(1) to ED(n) connected to one column line CL included in the first sub-driving area SDA1 of the display panel 110 according to the embodiments of the present disclosure. In the following description, the description of the same content as in the circuit of FIG. 8 may be omitted.

Referring to FIG. 9, n light emitting devices ED(1) to ED(n) connected to one column line CL may be arranged in the same column. The n light emitting devices ED(1) to ED(n) arranged in the same column may be connected to one column line CL. The n light emitting devices ED(1) to ED(n) connected to one column line CL may be arranged in one of the first sub-driving area SDA1 and the second sub-driving area SDA2 included in the unit driving area UDA.

The n light emitting devices ED(1) to ED(n) connected to one column line CL may be light emitting devices emitting the same color light. The n light emitting devices ED(1) to ED(n) arranged in the same column may be light emitting devices emitting the same color light.

Referring to FIG. 9, the n light emitting devices ED(1) to ED(n) arranged in the same column may include first electrodes Ecl(1) to Ecl(n) and second electrodes Erl(1) to Erl(n).

The first electrodes Ecl(1) to Ecl(n) of the n light emitting devices ED(1) to ED(n) arranged in the same column may all be connected to one column line CL. The second electrodes Erl(1) to Erl(n) of the n light emitting devices ED(1) to ED(n) arranged in the same column may be respectively connected to the n row lines RL(1) to RL(n).

Referring to FIG. 9, a circuit for driving the n light emitting devices ED(1) to ED(n) arranged in the same column may include a column driver C-DRV and a row driver R-DRV.

Referring to FIG. 9, the column driver C-DRV may include first to fourth nodes N1 to N4, and may include a driving transistor DRT, a first emission control transistor EMT1, and a second emission control transistor EMT2.

The first node N1 may be a node to which a voltage Vg for controlling on-off of the driving transistor DRT is applied. The second node N2 may be a node to which the second emission control transistor EMT2 and the driving transistor DRT are connected. The third node N3 may be a node to which the driving transistor DRT and the first emission control transistor EMT1 are connected. The fourth node N4 may be a node to which the first emission control transistor EMT1 and the n light emitting devices ED(1) to ED(n) are electrically connected, and may be a node to which the column line CL is electrically connected. Here, the source electrode or the drain electrode of the first emission control transistor EMT1 and the first electrodes Ecl(1) to Ecl(n) of the n light emitting devices ED(1) to ED(n) may be commonly connected to the column line CL.

The driving transistor DRT supplies a driving current to emit light to n light emitting devices ED(1) to ED(n), is connected between the second node N2 and the third node N3, and may control the connection between the second node N2 and the third node N3 according to the voltage of the first node N1.

The gate electrode of the driving transistor DRT is electrically connected to the first node N1, and may be supplied with a gate voltage Vg. The drain electrode or the source electrode of the driving transistor DRT may be electrically connected to the second node N2. The source electrode or the drain electrode of the driving transistor DRT may be electrically connected to the third node N3.

The first emission control transistor EMT1 and the second emission control transistor EMT2 may control the connection of a path through which a driving current flows, and may play a role in controlling an emission of a light emitting device ED.

The first emission control transistor EMT1 is connected between the third node N3 and the fourth node N4, and may control the connection between the third node N3 and the fourth node N4 according to a first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or the drain electrode of the first emission control transistor EMT1 may be electrically connected to the fourth node N4.

The first emission control signal EM1 may be a pulse width modulation signal that varies at a predefined time (for example, each frame, or each sub-frame included in a frame), but the embodiments of the present disclosure are not limited thereto. The first emission control signal EM1 may be generated by the driver DRV or may be supplied to the driver DRV from a driving-related circuit such as a timing controller.

The second emission control transistor EMT2 is connected between the high-potential voltage node NVDD and the second node N2 and may control the connection between the high-potential voltage node NVDD and the second node N2 according to a second emission control signal EM2. The second emission control signal EM2 may be applied to the gate electrode of the second emission control transistor EMT2. The drain electrode or the source electrode of the second emission control transistor EMT2 may be electrically connected to the high-potential voltage node NVDD. The source electrode or drain electrode of the second emission control transistor EMT2 may be electrically connected to the second node N2. Here, the second emission control signal EM2 may be the same as or different from the first emission control signal EM1.

Referring to FIG. 9, the column driver C-DRV may further include a first transistor T1 whose on-off is controlled according to a first scan signal SC1 and which controls the connection between the first node N1 and the initialization voltage node NINT. Here, the initialization voltage VINT may be applied to the initialization voltage node NINT.

Referring to FIG. 9, the column driver C-DRV may further include a second transistor T2 whose on-off is controlled according to a second scan signal SC2 and which controls the connection between the second node N2 and the reference voltage node NREF. Here, a reference voltage VREF may be applied to the reference voltage node NREF.

Referring to FIG. 9, the column driver C-DRV may further include a third transistor T3 whose on-off is controlled according to a third scan signal SC3 and which controls the connection between the third node N3 and the pre-charge voltage node NPRC. Here, a pre-charge voltage VPRC may be applied to the pre-charge voltage node NPRC.

Referring to FIG. 9, the column driver C-DRV may further include a fourth transistor T4 whose on-off is controlled according to a fourth scan signal SC4 and which controls the connection between the fourth node N4 and the reset voltage node NRST. Here, a reset voltage VRST may be applied to the reset voltage node NRST.

Referring to FIG. 9, the column driver C-DRV may further include a fifth transistor T5 that controls the connection between the first node N1 and the third node N3 by controlling the on-off according to a fifth scan signal SC5. If the fifth transistor T5 is turned on, the first node N1 and the third node N3 are electrically connected, so that the driving transistor DRT may be in a diode-connected state. Here, for example, the fifth scan signal SC5 may be a scan signal that is different from or the same as the second scan signal SC2.

Referring to FIG. 9, the row driver R-DRV may be configured to drive n row lines RL(1) to RL(n) that are respectively connected to the second electrodes Erl(1) to Erl(n) of n light emitting devices ED(1) to ED(n) arranged in the same column.

Referring to FIG. 9, the row driver R-DRV may include n display-on transistors TR_ON(1) to TR_ON(n) that electrically connect each of n row lines RL(1) to RL(n) to a first low-potential voltage node NVSS1. A first low-potential voltage VSS1 may be applied to the first low-potential voltage node NVSS1. The n display-on transistors TR_ON(1) to TR_ON(n) may be turned on and off by n display-on control signals CS1(1) to CS1(*n*).

The turn-on timing of each of the n display-on transistors TR_ON(1) to TR_ON(n) may be different from each other. Accordingly, display-on driving for the n row lines RL(1) to RL(n) may be sequentially performed.

Referring to FIG. 9, the row driver R-DRV may include n display-off transistors TR_OFF(1) to TR_OFF(n) that electrically connect each of n row lines RL(1) to RL(n) to a second low-potential voltage node NVSS2 to which a second low-potential voltage VSS2 is applied. The second low-potential voltage VSS2 may be a low-potential voltage higher than the first low-potential voltage VSS1.

The n display-off transistors TR_OFF(1) to TR_OFF(n) may be turned on and off by n display-off control signals CS2(1) to CS2(*n*).

The turn-on timing of each of the n display-off transistors TR_OFF(1) to TR_OFF(n) may be different from each other. Accordingly, display-off driving for n display-off transistors TR_OFF(1) to TR_OFF(n) may be performed at different timings.

That is, one display-on transistor among n display-on transistors TR_ON(1) to TR_ON(n) and one display-off transistor among n display-off transistors TR_OFF(1) to TR_OFF(n) may be connected to each of n row lines RL(1) to RL(n).

Only one of the display-on transistors and display-off transistors connected to each of n row lines RL(1) to RL(n) may be selectively turned on.

For example, if a display-on driving is performed for the first row line RL(1) among the n row lines RL(1) to RL(n), among the first display-on transistor TR_ON(1) and the first display-off transistor TR_OFF(1) connected to the first row line RL(1), the first display-on transistor TR_ON(1) may be turned on and the first display-off transistor TR_OFF(1) may be turned off. At this time, if display-on driving is performed for the second to n-th row lines RL(2) to RL(n), among the display-on transistors and display-off transistors connected to each of the second to n-th row lines RL(2) to RL(n), the display-on transistor may be turned off and the display-off transistor may be turned on. Accordingly, a first low-potential voltage VSS1, which is a low-potential voltage for driving the display-on, may be applied only to the first row line RL(1) among the n row lines RL(1) to RL(n), and a second low-potential voltage VSS2, which is a low-potential voltage for driving the display-off, may be applied to the remaining second to n-th row lines RL(2) to RL(n). Referring to FIG. 9, the driving timing of the subpixel SP is as follows.

During a first driving period, the first transistor T1 among the first to fifth transistors T1 to T5 may be turned on, and the initialization voltage VINT may be applied to the first node N1. The driving transistor DRT may be turned on by the initialization voltage VINT applied to the first node N1.

Thereafter, during a second driving period, the second transistor T2 may be turned on, and the reference voltage VREF may be applied to the second node N2. In this case, the fifth transistor T5 may also be turned on.

Thereafter, during a third driving period, the third transistor T3 may be turned on, so that the pre-charge voltage VPRC may be applied to the third node N3.

Then, during a fourth driving period, one of the n light emitting devices ED(1) to ED(n) may emit light. During the fourth driving period, the light emitting devices in an emission state among the light emitting devices arranged in n row lines RL(1) to RL(n) may be supplied with the first low-potential voltage VSS1, which is a low-potential voltage for display-on driving, and the light emitting devices in a non-emission state may be supplied with the second low-potential voltage VSS2, which is a low-potential voltage for display-off driving.

To this end, among the n row lines RL(1) to RL(n), the row line on which display-on driving is performed may be supplied with the first low-potential voltage VSS1, and the remaining row lines on which display-off driving is performed may be supplied with the second low-potential voltage VSS2.

Therefore, among the display-on transistor and the display-off transistor connected to the row line where the display-on driving is performed, the display-on transistor may be in a turn-on state and the display-off transistor may be in a turn-off state.

Among the display-on transistor and the display-off transistor connected to the row line where the display-off driving is performed, the display-on transistor may be in a turn-off state and the display-off transistor may be in a turn-on state.

Thereafter, during a fifth driving period, the fourth transistor T4 may be turned on, so that the reset voltage VRST may be applied to the fourth node N4. Accordingly, the column line CL may be reset to the reset voltage VRST. In addition, all of the first electrodes Ecl(l) to Ecl(n) of the n light emitting devices ED(1) to ED(n) connected to the column line CL may be reset to the reset voltage VRST.

The first to fourth scan signals SC1 to SC4 and the first and second emission control signals EM1 and EM2 may be generated by the corresponding driver DRV or may be supplied to the corresponding driver DRV from a driving-related circuit such as a timing controller.

Referring to FIG. 9, each of the transistors DRT and T1 to T5 included in the column driver C-DRV may be an n-type transistor or a p-type transistor. Each of the transistors TR_ON(1) to TR_ON(n) and TR_OFF(1) to TR_OFF(n) included in the row driver R-DRV may be an n-type transistor or a p-type transistor. The column driver C-DRV may further include at least one capacitor.

As described above, the column driver C-DRV and the row driver R-DRV may be included in the driver DRV.

In order for the plurality of drivers DRV included in the display device 100 according to the embodiments of the present disclosure to perform a driving operation, the plurality of drivers DRV are required to be supplied with power required for the driving operation. Accordingly, hereinafter, it will be described a power supply structure for supplying power required for the driving operation to the plurality of drivers DRV with reference to FIG. 10.

Figure 10:
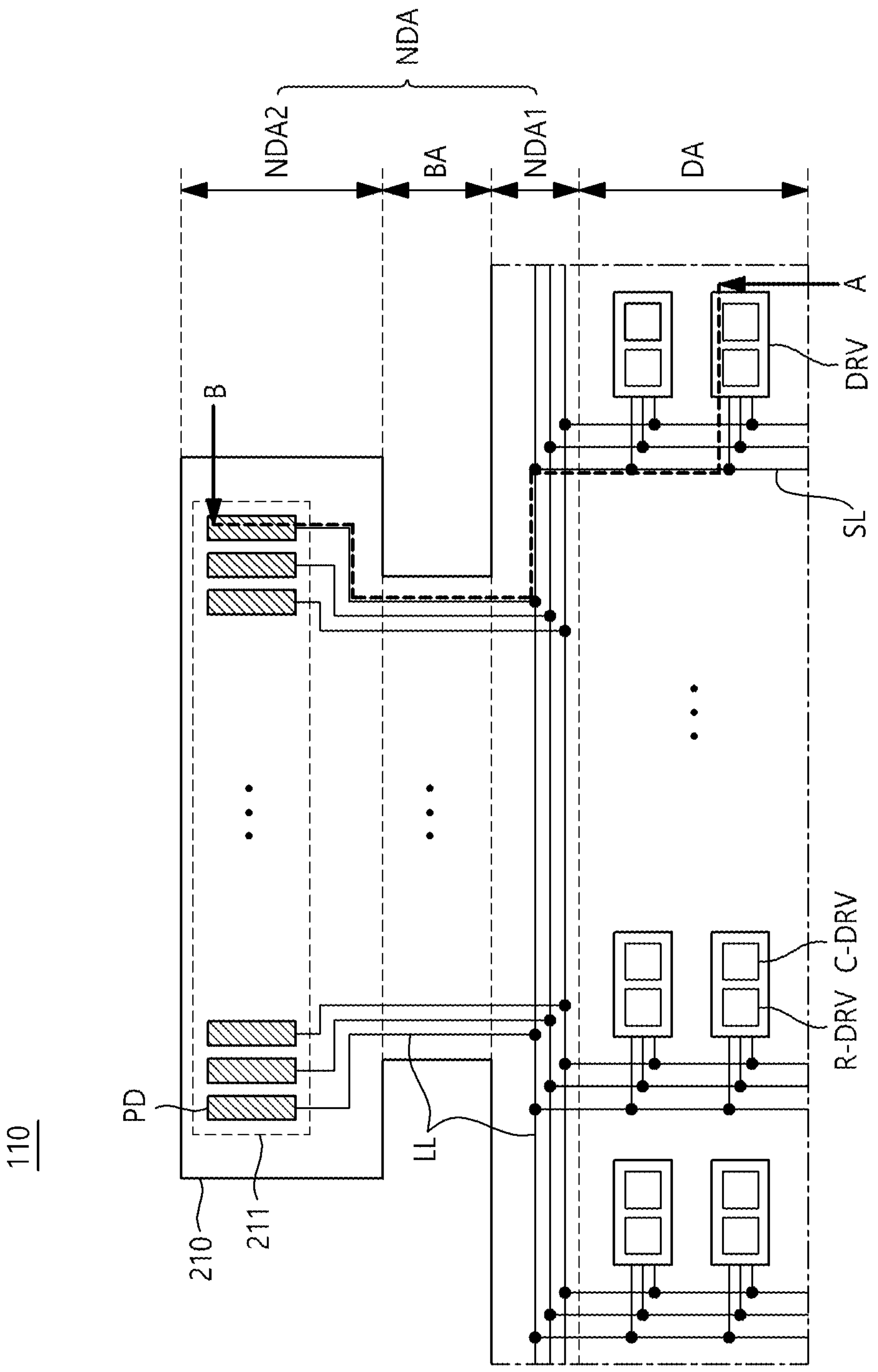
FIG. 10 is a plan view of a display panel according to embodiments of the present disclosure.

FIG. 10 is a plan view of the display panel 110 according to the embodiments of the present disclosure.

Referring to FIG. 10, the substrate 210 of the display panel 110 according to the embodiments of the present disclosure may include a display area DA and a non-display area NDA, and the non-display area NDA may include a first non-display area NDA1, a bending area BA, and a second non-display area NDA2.

Referring to FIG. 10, a plurality of drivers DRV may be arranged in the display area DA. Each of the plurality of drivers DRV may be a circuit for driving light emitting devices of a plurality of subpixels included in a corresponding unit driving area (UDA of FIGS. 4 and 6). Each of the plurality of drivers DRV may include a row driver R-DRV for driving a plurality of row lines and a column driver C-DRV for driving a plurality of column lines, in order to drive a plurality of light emitting devices ED included in a corresponding unit driving area (UDA of FIGS. 4 and 6).

Referring to FIG. 10, a pad section 211 including a plurality of pads PD may be arranged in the second non-display area NDA2.

Referring to FIG. 10, a plurality of signal lines SL and a plurality of link lines LL for signal transmission between a plurality of drivers DRV arranged in the display area DA and the pad section 211 may be arranged on the substrate 210. The plurality of signal lines SL may be electrically connected between the plurality of link lines LL and the plurality of drivers DRV. The plurality of link lines LL may electrically connect the plurality of pads PD and the plurality of signal lines SL.

Referring to FIG. 10, the plurality of link lines LL may be arranged in the non-display area NDA, and all or part of each of the plurality of signal lines SL may be arranged in the display area DA.

Each of the plurality of drivers DRV may receive various signals to perform a driving operation through the plurality of link lines LL and the plurality of signal lines SL. Here, the various signals may include various power voltages and various signals required for the driving operation of each of the plurality of drivers DRV.

As the bending area BA is bent, a portion of the plurality of link lines LL may also be bent. Stress may be concentrated on a portion of the bent link line LL, and thus cracks may occur in the link line LL. Accordingly, the plurality of link lines LL may be formed of a conductive material having excellent ductility to reduce cracks when the bending area BA is bent. For example, the plurality of link lines LL may be formed of a conductive material having excellent ductility, such as gold (Au), silver (Ag), aluminum (Al), but the embodiments of the present disclosure are not limited thereto. In addition, the plurality of link lines LL may be composed of one of various conductive materials used in the display area DA. For example, the plurality of link lines LL may be composed of molybdenum (Mo), chromium (Cr), titanium (Ti), nickel (Ni), neodymium (Nd), copper (Cu), and an alloy of silver (Ag) and magnesium (Mg), or an alloy thereof, but the embodiments of the present disclosure are not limited thereto. The plurality of link lines LL may be composed of a multilayer structure including various conductive materials. For example, the plurality of link lines LL may be composed of a triple layer structure of titanium (Ti)/aluminum (Al)/titanium (Ti), but the embodiments of the present disclosure are not limited thereto.

The plurality of link lines LL may be composed of various shapes to reduce stress. At least a portion of the plurality of link lines LL arranged on the bending area BA may extend in the same direction as the extension direction of the bending area BA or may extend in a direction different from the extension direction of the bending area BA to reduce stress. For example, if the bending area BA extends in one direction from the first non-display area NDA1 toward the second non-display area NDA2, at least a portion of the link lines LL arranged on the bending area BA may extend in a direction oblique to the one direction. As another example, at least a portion of the plurality of link lines LL may be configured as patterns of various shapes. For example, at least a portion of the plurality of link lines LL arranged on the bending area BA may be a shape in which conductive patterns having at least one shape among a diamond shape, a rhombus shape, a trapezoidal wave shape, a triangular wave shape, a sawtooth wave shape, a sine wave shape, a circular shape, and an omega (Ω) shape are repeatedly arranged, but the embodiments of the present disclosure are not limited thereto. Therefore, in order to minimize the stress concentrated on the plurality of link lines LL and the resulting cracks, the shapes of the plurality of link lines LL may be formed in various shapes including the shapes described above, but the embodiments of the present disclosure are not limited thereto.

Figure 11:
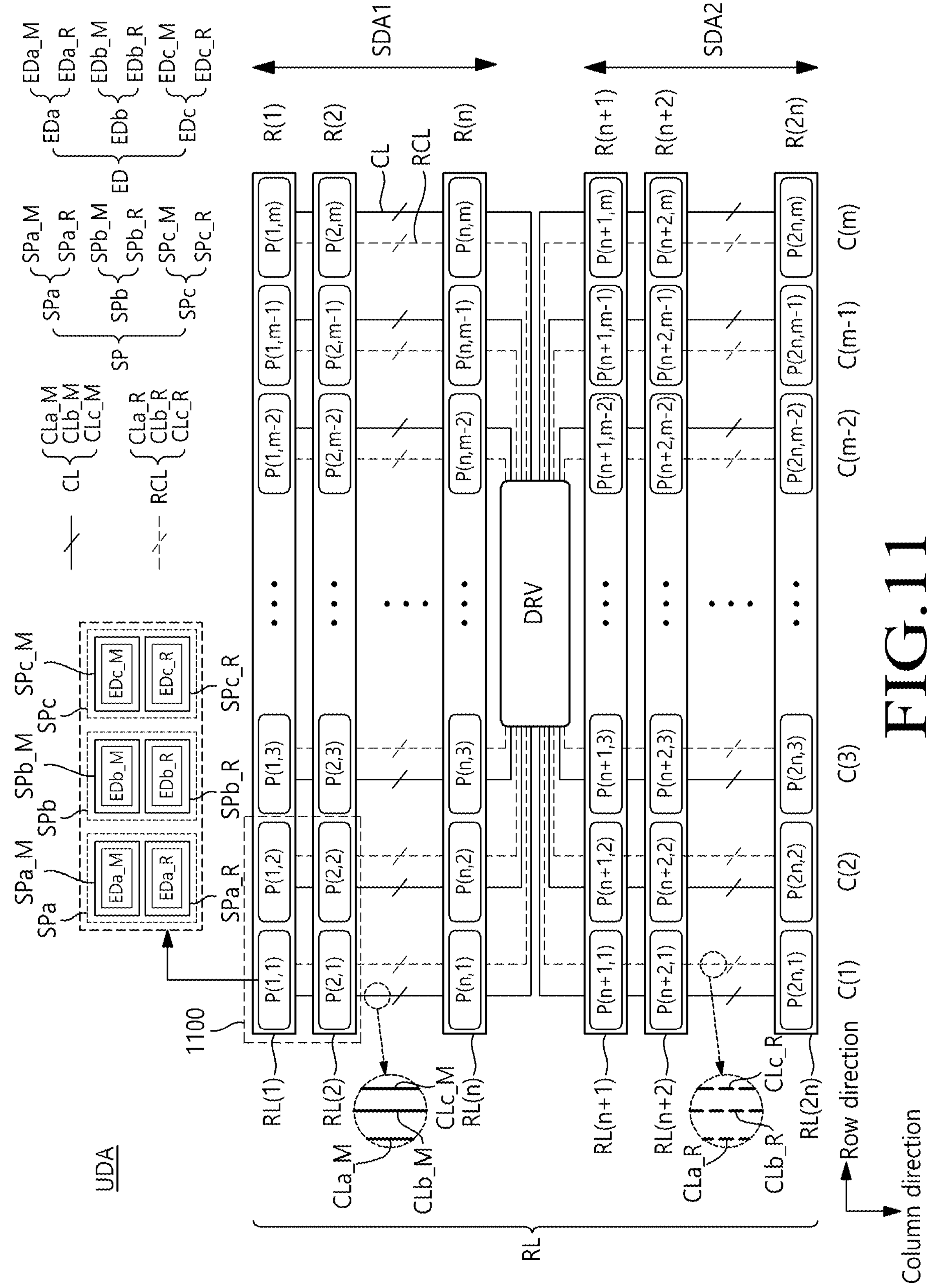
FIG. 11 illustrates a unit driving area of a display panel according to embodiments of the present disclosure.

FIG. 11 illustrates a unit driving area UDA of a display panel 110 according to embodiments of the present disclosure. In the following description, FIG. 3 and FIG. 4 are also referred to, and the same contents described with reference to FIG. 3 and FIG. 4 may be omitted.

Referring to FIG. 11, the display panel 110 according to embodiments of the present disclosure may include a plurality of pixels P, a plurality of row lines RL, and a plurality of column lines CL.

According to the example of FIG. 11, the plurality of pixels P may include pixels P(1, 1), . . . , P(1, m), P(2, 1), . . . , P(2, m), . . . , P(2n, 1), . . . , P(2n, m) of (2n×m) pixels arranged in the unit driving area UDA. The plurality of row lines RL may include 2n row lines RL(1) to RL(2n) arranged in the unit driving area UDA.

Referring to FIG. 11, the display panel 110 according to the embodiments of the present disclosure may include a redundancy structure.

Referring to FIG. 11, according to the redundancy structure, each of the plurality of pixels P may include k main subpixels and k redundancy subpixels. Each of the k main subpixels may include a main light emitting device, and each of the k redundancy subpixels may include a redundancy light emitting device. In other words, each of the plurality of pixels P may include k main light emitting devices EDa_M, EDb_M and EDc_M and k redundancy light emitting devices EDa_R, EDb_R and EDc_R.

Referring to FIG. 11, each of the plurality of pixels P(1, 1), . . . , P(1, m), P(2, 1), . . . , P(2, m), . . . , P(2n, 1), . . . , P(2n, m) may include a first subpixel SPa, a second subpixel SPb, and a third subpixel SPc.

The first subpixel SPa may include a first main subpixel SPa_M and a first redundancy subpixel SPa_R. The first main subpixel SPa_M may include a first main light emitting device EDa_M, and the first redundancy subpixel SPa_R may include a first redundancy light emitting device EDa_R.

The first subpixel SPa may include a first light emitting device EDa that emits a first color light, and the first light emitting device EDa may include a first main light emitting device EDa_M and a first redundancy light emitting device EDa_R.

The second subpixel SPb may include a second main subpixel SPb_M and a second redundancy subpixel SPb_R. The second main subpixel SPb_M may include a second main light emitting device EDb_M, and the second redundancy subpixel SPb_R may include a second redundancy light emitting device EDb_R.

The second subpixel SPb may include a second light emitting device EDb that emits second color light, and the second light emitting device EDb may include a second main light emitting device EDb_M and a second redundancy light emitting device EDb_R.

The third subpixel SPc may include a third main subpixel SPc_M and a third redundancy subpixel SPc_R. The third main subpixel SPc_M may include a third main light emitting device EDc_M, and the third redundancy subpixel SPc_R may include a third redundancy light emitting device EDc_R.

The third subpixel SPc may include a third light emitting device EDc that emits a third color light, and the third light emitting device EDc may include a third main light emitting device EDc_M and a third redundancy light emitting device EDc_R.

Referring to FIG. 11, the plurality of column lines CL may include a plurality of main column lines CLa_M, CLb_M and CLc_M and a plurality of redundancy column lines CLa_R, CLb_R and CLeR.

In each of the plurality of columns (i.e., a plurality of pixel columns) included in each of the first sub-driving area SDA1 and the second sub-driving area SDA2, k main column lines CLa_M, CLb_M and CL_M, and k redundancy column lines CLa_R CLb_R and CL_R may be arranged.

In each column (i.e., each pixel column), k main column lines CLa_M, CLb_M and CLc_M may be connected to the first electrodes Ecl of k main light emitting devices EDa_M, EDb_M and EDc_M.

In each column (i.e., each pixel column), k redundancy column lines CLa_R, CLb_R and CL_R may be connected to the first electrodes Ecl of k redundancy light emitting devices EDa_R, EDb_R and EDc_R.

Hereinafter, in order to examine the planar structure of the display panel 110 according to the embodiments of the present disclosure in more detail, it will be described the planar structure of a portion 1100 of the planar view of FIG. 11 in more detail as an example.

Figure 12:
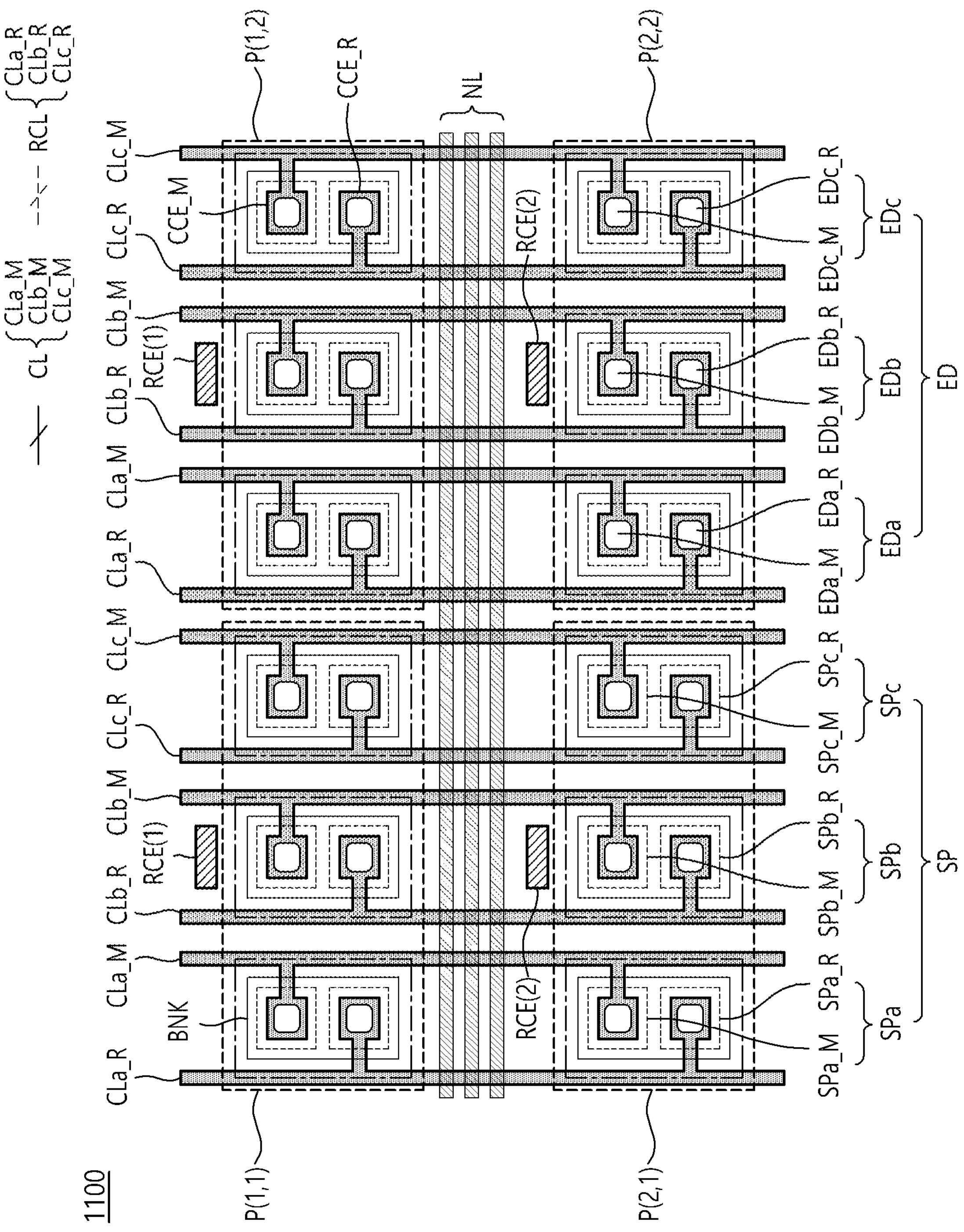
FIG. 12 and FIG. 13 are plan views of a portion of a display panel according to embodiments of the present disclosure.
Figure 13:
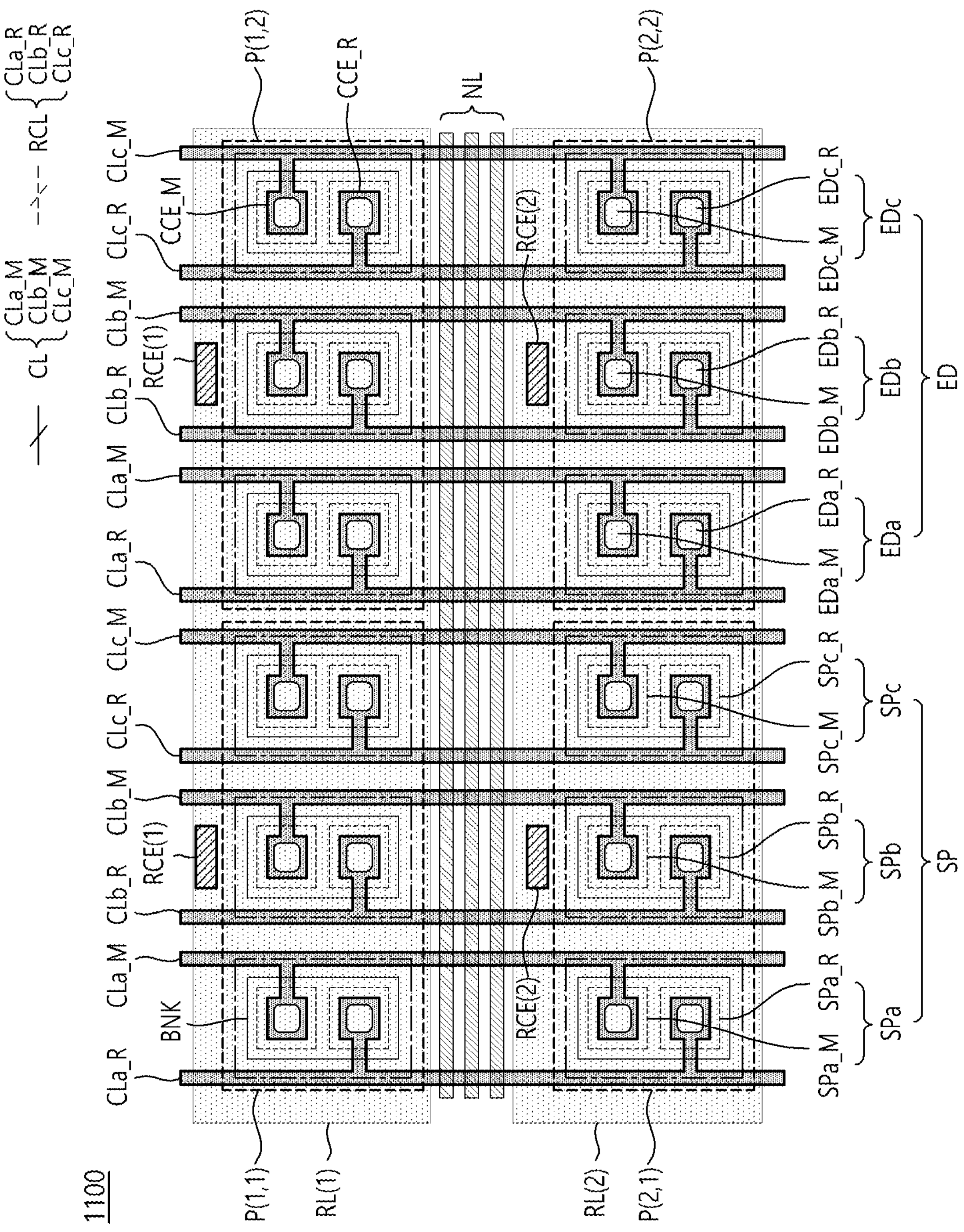

FIG. 12 and FIG. 13 are plan views of a portion 1100 of a display panel 110 according to embodiments of the present disclosure.

FIG. 12 and FIG. 13 are enlarged plan views of a portion 1100 of the plan view of FIG. 11, and are enlarged plan views of a two-row, two-column area 1100.

FIG. 12 is a plan view that does not represent two row lines RL(1) and RL(2) arranged in a two-row, two-column area 1100, and FIG. 13 is a plan view that adds two row lines RL(1) and RL(2) arranged in a two-row, two-column area 1100 to the plan view of FIG. 12.

Referring to FIG. 12 and FIG. 13, in the two-row, two-column area 1100, four pixels P(1,1), P(1,2), P(2,1), P(2,2) may be arranged in two rows and two columns. That is, in the two-row, two-column area 1100, two pixels P(1,1) and P(1,2) may be arranged in a first row (e.g., a first pixel row), and two pixels P(2,1) and P(2,2) may be arranged in a second row (e.g., a second pixel row). In addition, two pixels P(1,1) and P(2,1) may be arranged in a first column (e.g., a first pixel column), and two pixels P(1,2) and P(2,2) may be arranged in a second column (e.g., a second pixel column).

Referring to FIG. 12 and FIG. 13, in the two-row, two-column area 1100, each of the four pixels P(1,1), P(1,2), P(2,1) and P(2,2) arranged in two rows and two columns may include k subpixels.

Here, k is the number of subpixels included in one pixel.

In FIG. 12 and FIG. 13, it is exemplified a case where k is 3 is as an example. Accordingly, in the two-row, two-column area 1100, each of the four pixels P(1,1), P(1,2), P(2,1) and P(2,2)) arranged in two rows and two columns may include three subpixels SPa, SPb and SPc. In the following description, it may be explained assuming the case where k is 3.

The three subpixels may include a first subpixel SPa including a first light emitting device EDa that emits a first color light, a second subpixel SPb including a second light emitting device EDb that emits a second color light, and a third subpixel SPc including a third light emitting device EDc that emits a third color light.

If the display panel 110 according to the embodiments of the present disclosure has a redundancy structure, the subpixel redundancy structure is as follows.

The first subpixel SPa may include a first main subpixel SPa_M including a first main light emitting device EDa_M and a first redundancy subpixel SPa_R including a first redundancy light emitting device EDa_R, the second subpixel SPb may include a second main subpixel SPb_M including a second main light emitting device EDb_M and a second redundancy subpixel SPb_R including a second redundancy light emitting device EDb_R, and the third subpixel SPc may include a third main subpixel SPc_M including a third main light emitting device EDc_M and a third redundancy subpixel SPc_R including a third redundancy light emitting device EDc_R.

If the display panel 110 according to the embodiments of the present disclosure has a redundancy structure, the light emitting device redundancy structure is as follows.

The first light emitting device EDa may include a first main light emitting device EDa_M that emits a first color light and a first redundancy light emitting device EDa_R that emits a first color light, the second light emitting device EDb may include a second main light emitting device EDb_M that emits a second color light and a second redundancy light emitting device EDb_R that emits a second color light, and the third light emitting device EDb may include a third main light emitting device EDc_M that emits a third color light and a third redundancy light emitting device EDc_R that emits a third color light.

Referring to FIG. 12 and FIG. 13, in the two-row, two-column area 1100, a first row line RL(1) and a second row line RL(2) may be arranged. The first row line RL(1) may be arranged in the first row (i.e., the first pixel row), and the second row line RL(2) may be arranged in the second row (i.e., the second pixel row).

The first row line RL(1) may correspond to two pixels P(1,1) and P(1,2) arranged in the first row (or the first pixel row), and may correspond to three subpixels SPa, SPb and SPc included in each of the two pixels P(1,1) and P(1,2) arranged in the first row (or the first pixel row).

In terms of the subpixel redundancy structure, the first row line RL(1) may be connected to the first main subpixel SPa_M, the first redundancy subpixel SPa_R, the second main subpixel SPb_M, the second redundancy subpixel SPb_R, the third main subpixel SPc_M, and the third redundancy subpixel SPc_R arranged in the first row (or the first pixel row).

At least a portion of the first row line RL(1) may overlap with the first main subpixel SPa_M, the first redundancy subpixel SPa_R, the second main subpixel SPb_M, the second redundancy subpixel SPb_R, the third main subpixel SPc_M, and the third redundancy subpixel SPc_R arranged in the first row (or the first pixel row).

From the perspective of the light emitting device redundancy structure, the first row line RL(1) may be connected to the second electrode En of each of the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

At least a part of the first row line RL(1) may overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

The second row line RL(2) may correspond to two pixels P(2,1) and P(2,2) arranged in a second row (or the second pixel row), and may correspond to three subpixels SPa, SPb and SPc included in each of the two pixels P(2,1) and P(2,2) arranged in the second row (or the second pixel row).

In terms of the subpixel redundancy structure, the second row line RL(2) may be connected to the first main subpixel SPa_M, the first redundancy subpixel SPa_R, the second main subpixel SPb_M, the second redundancy subpixel SPb_R, the third main subpixel SPc_M, and the third redundancy subpixel SPc_R arranged in the second row (or the second pixel row).

At least a portion of the second row line RL(2) may overlap with the first main subpixel SPa_M, the first redundancy subpixel SPa_R, the second main subpixel SPb_M, the second redundancy subpixel SPb_R, the third main subpixel SPc_M, and the third redundancy subpixel SPc_R arranged in the second row (or the second pixel row).

In terms of the light emitting device redundancy structure, the second row line RL(2) may be connected to the second electrode Erl of each of the first main light emitting device EDa_M, the first redundancy light emitting device EDa_R, the second main light emitting device EDb_M, the second redundancy light emitting device EDb_R, the third main light emitting device EDe_M, and the third redundancy light emitting device EDc_R arranged in the second row (or the second pixel row).

At least a portion of the second row line RL(2) may overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the second row (or the second pixel row).

Referring to FIG. 12 and FIG. 13, a plurality of column lines CL may be arranged in the two-row two-column area 1100. A plurality of column lines CL arranged in a two-row two-column area 1100 may include a plurality of first column lines CL connected to two pixels P(1,1) and P(2,1) arranged in a first column (or a first pixel column), and a plurality of second column lines CL connected to two pixels P(1,2) and P(2,2) arranged in a second column (or a second pixel column).

Referring to FIGS. 12 and 13, from the perspective of subpixel redundancy, a plurality of first column lines CL arranged in a first column (or first pixel column) may include a first main column line CLa_M that is commonly connected to a first main subpixel SPa_M included in each of two pixels P(1,1) and P(2,1) arranged in the first column (or first pixel column), and a first redundancy column line CLa_R that is commonly connected to a first redundancy subpixel SPa_R included in each of two pixels P(1,1) and P(2,1) arranged in the first column (or first pixel column).

The first main subpixel SPa_M included in each of the two pixels P(1,1) and P(2,1) arranged in the first column (or the first pixel column) may include a first main light emitting device EDa_M, and the first redundancy subpixel SPa_R included in each of the two pixels P(1,1) and P(2,1) arranged in the first column (or the first pixel column) may include a first redundancy light emitting device EDa_R.

The first main column line CLa_M arranged in the first column (or the first pixel column) may be commonly connected to the first electrodes Ecl of the two first main light emitting devices EDa_M arranged in the first column (or the first pixel column).

The first redundancy column line CLa_R arranged in the first column (or the first pixel column) may be commonly connected to the first electrodes Ecl of two first redundancy light emitting devices EDa_R arranged in the first column (or the first pixel column).

In addition, the plurality of first column lines CL arranged in the first column (or the first pixel column) may further include a second main column line CLb_M commonly connected to a second main subpixel SPb_M included in each of the two pixels P(1,1) and P(2,1) arranged in the first column (or the first pixel column), and a second redundancy column line CLb_R commonly connected to a second redundancy subpixel SPb_R included in each of the two pixels P(1,1) and P(2,1) arranged in the first column (or the first pixel column).

The second main subpixel SPb_M included in each of the two pixels P(1,1) and P(2,1) arranged in the first column (or the first pixel column) may include a second main light emitting device EDb_M, and the second redundancy subpixel SPb_R included in each of the two pixels P(1,1) and P(2,1) arranged in the first column (or the first pixel column) may include a second redundancy light emitting device EDb_R.

The second main column line CLb_M arranged in the first column (or the first pixel column) may be commonly connected to the first electrodes Ecl of the two second main light emitting devices EDb_M arranged in the first column (or the first pixel column).

The second redundancy column line CLb_R arranged in the first column (or the first pixel column) may be commonly connected to the first electrodes Ecl of the two second redundancy light emitting devices EDb_R arranged in the first column (or the first pixel column).

In addition, the plurality of first column lines CL arranged in the first column (or the first pixel column) may further include a third main column line CLc_M commonly connected to the third main subpixel SPc_M included in each of the two pixels P(1,1) and P(2,1) arranged in the first column (or the first pixel column), and a third redundancy column line CL_R commonly connected to the third redundancy subpixel SPc_R included in each of the two pixels P(1,1) and P(2,1) arranged in the first column (or the first pixel column).

The third main subpixel SPc_M included in each of the two pixels P(1,1) and P(2,1) arranged in the first column (or the first pixel column) may include a third main light emitting device EDc_M, and the third redundancy subpixel SPc_R included in each of the two pixels P(1,1) and P(2,1) arranged in the first column (or the first pixel column) may include a third redundancy light emitting device EDc_R.

The third main column line CLc_M arranged in the first column (or the first pixel column) may be commonly connected to the first electrodes Ecl of the two third main light emitting devices EDc_M arranged in the first column (or the first pixel column).

The third redundancy column line CL_R arranged in the first column (or the first pixel column) may be commonly connected to the first electrodes Ecl of two third redundancy light emitting devices EDc_R arranged in the first column (or the first pixel column).

Referring to FIGS. 12 and 13, from the perspective of subpixel redundancy, a plurality of second column lines CL arranged in a second column (or second pixel column) may include a first main column line CLa_M that is commonly connected to a first main subpixel SPa_M included in each of two pixels P(1,2) and P(2,2) arranged in the second column (or second pixel column), and a first redundancy column line CLa_R that is commonly connected to a first redundancy subpixel SPa_R included in each of two pixels P(1,2) and P(2,2) arranged in the second column (or second pixel column).

The first main subpixel SPa_M included in each of the two pixels P(1,2) and P(2,2) arranged in the second column (or the second pixel column) may include a first main light emitting device EDa_M, and the first redundancy subpixel SPa_R included in each of the two pixels P(1,2) and P(2,2) arranged in the second column (or the second pixel column) may include a first redundancy light emitting device EDa_R.

The first main column line CLa_M arranged in the second column (or the second pixel column) may be commonly connected to the first electrodes Ecl of the two first main light emitting devices EDa_M arranged in the second column (or the second pixel column).

The first redundancy column line CLa_R arranged in the second column (or the second pixel column) may be commonly connected to the first electrodes Ecl of the two first redundancy light emitting devices EDa_R arranged in the second column (or the second pixel column).

In addition, the plurality of second column lines CL arranged in the second column (or second pixel column) may further include a second main column line CLb_M commonly connected to a second main subpixel SPb_M included in each of two pixels P(1,2) and P(2,2) arranged in the second column (or second pixel column), and a second redundancy column line CLb_R commonly connected to a second redundancy subpixel SPb_R included in each of two pixels P(1,2) and P(2,2) arranged in the second column (or second pixel column).

The second main subpixel SPb_M included in each of the two pixels P(1,2) and P(2,2) arranged in the second column (or the second pixel column) may include a second main light emitting device EDb_M, and the second redundancy subpixel SPb_R included in each of the two pixels P(1,2) and P(2,2) arranged in the second column (or the second pixel column) may include a second redundancy light emitting device EDb_R.

The second main column line CLb_M arranged in the second column (or the second pixel column) may be commonly connected to the first electrodes Ecl of the two second main light emitting devices EDb_M arranged in the second column (or the second pixel column).

The second redundancy column line CLb_R arranged in the second column (or the second pixel column) may be commonly connected to the first electrodes Ecl of two second redundancy light emitting devices EDb_R arranged in the second column (or the second pixel column).

In addition, the plurality of first column lines CL arranged in the second column (or the second pixel column) may further include a third main column line CLc_M commonly connected to a third main subpixel SPc_M included in each of two pixels P(1,2) and P(2,2) arranged in the second column (or the second pixel column), and a third redundancy column line CLc_R commonly connected to a third redundancy subpixel SPc_R included in each of two pixels P(1,2) and P(2,2) arranged in the second column (or the second pixel column).

The third main subpixel SPc_M included in each of the two pixels P(1,2) and P(2,2) arranged in the second column (or the second pixel column) may include a third main light emitting device EDc_M, and the third redundancy subpixel SPc_R included in each of the two pixels P(1,2) and P(2,2) arranged in the second column (or the second pixel column) may include a third redundancy light emitting device EDc_R.

The third main column line CLc_M arranged in the second column (or the second pixel column) may be commonly connected to the first electrodes Ecl of the two third main light emitting devices EDc_M arranged in the second column (or the second pixel column).

The third redundancy column line CL_R arranged in the second column (or the second pixel column) may be commonly connected to the first electrodes Ecl of two third redundancy light emitting devices EDc_R arranged in the second column (or the second pixel column).

Referring to FIGS. 12 and 13, in each of the first column (or the first pixel column) and the second column (or the second pixel column), each of the plurality of column lines CL may include at least one column connection electrode having a shape protruding above a bank BNK. For example, the at least one column connection electrode may be an electrode electrically connected to each of the plurality of column lines CL or a portion protruding from each of the plurality of column lines CL.

Referring to FIGS. 12 and 13, each of the first main column line CLa_M, the second main column line CLb_M, and the third main column line CLc_M may include a main column connection electrode CCE_M protruding above the bank BNK and extending above the bank BNK.

The first main light emitting devices EDa_M, the second main light emitting devices EDb_M, and the third main light emitting devices EDc_M may be arranged on the main column connection electrodes CCE_M arranged to extend above the bank BNK.

Referring to FIGS. 12 and 13, in each of the first column (or first pixel column) and the second column (or second pixel column), each of the first redundancy column line CLa_R, the second redundancy column line CLb_R, and the third redundancy column line CLc_R may include a redundancy column connection electrode CCE_R that protrudes toward the bank BNK and extends above the bank BNK.

On the redundancy column connection electrodes CCE_R arranged to extend above the bank BNK, the first redundancy light emitting devices EDa_R, the second redundancy light emitting devices EDb_R, and the third redundancy light emitting devices EDc_R may be arranged.

The main column connection electrodes CCE_M and the redundancy column connection electrodes CCE_R arranged in the first column (or the first pixel column) may be disposed between the first main column line CLa_M and the first redundancy column line CLa_R.

The main column connection electrodes CCE_M and the redundancy column connection electrodes CCE_R arranged in the second column (or the second pixel column) may be disposed between the second main column line CLb_M and the second redundancy column line CLb_R.

The main column connection electrodes CCE_M and the redundancy column connection electrodes CCE_R arranged in the third column (or the third pixel column) may be disposed between the third main column line CLc_M and the third redundancy column line CL_R.

The display panel 110 according to the embodiments of the present disclosure may further include at least one row connection electrode for electrically connecting each of the plurality of row lines RL to the driver DRV.

Referring to FIGS. 12 and 13, the display panel 110 according to the embodiments of the present disclosure may further include at least one first row connection electrode RCE(1) connected to a first row line RL(1) arranged in a first row (or a first pixel row), and at least one second row connection electrode RCE(2) connected to a second row line RL(2) arranged in a second row (or a second pixel row).

The first row line RL(1) may be vertically overlapped with at least one first row connection electrode RCE(1), and the second row line RL(2) may be vertically overlapped with at least one second row connection electrode RCE(2).

The first row line RL(1) may be electrically connected to the row driver R-DRV of the corresponding driver DRV through at least one first row connection electrode RCE(1). The second row line RL(2) may be electrically connected to the row driver R-DRV of the corresponding driver DRV through at least one second row connection electrode RC(2).

According to embodiments of the present disclosure, a bank BNK may be arranged in each of a plurality of subpixels SP. The plurality of banks BNK may be structures on which a plurality of light emitting devices ED are mounted. When manufacturing a panel, in a transfer process for transferring a plurality of light emitting devices ED to a display device 100, a plurality of banks BNK can guide the positions of the plurality of light emitting devices ED. That is, when manufacturing a panel, a plurality of light emitting devices ED can be transferred onto a plurality of banks BNK in a transfer process of the plurality of light emitting devices ED. The plurality of banks BNK may be an organic insulating layer, a bank pattern, or a structure, but the embodiments of the present disclosure are not limited thereto.

The banks BNK of each of the plurality of subpixels SP may be arranged to be spaced apart from each other. The banks BNK of each of the plurality of subpixels SP may be configured to be separated from each other. Accordingly, the banks BNK of the first subpixel SPa, the second subpixel SPb, and the third subpixel SPc to which different types of light emitting devices ED are transferred can be easily identified.

The bank BNK of the first main subpixel SPa_M and the bank BNK of the first redundancy subpixel SPa_R may be connected to each other or may be formed spaced apart from each other or separately. For example, considering the design of the transfer process requirements, the bank BNK of the first main subpixel SPa_M and the bank BNK of the first redundancy subpixel SPa_R, in which light emitting devices EDa_M, EDa_R of the same type (for example, types that emit the same color light) are arranged, may be connected to each other, or may be formed spaced apart from each other or separately. In addition, the bank BNK of the second main subpixel SPb_M and the bank BNK of the second redundancy subpixel SPb_R may be connected to each other or may be formed spaced apart from each other or separately. The bank BNK of the third main subpixel SPc_M and the bank BNK of the third redundancy subpixel SPc_R may be connected to each other or may be formed to be spaced apart from each other or separated from each other.

The bank BNK of the first main subpixel SPa_M and the first redundancy subpixel SPa_R, the bank BNK of the second main subpixel SPb_M and the second redundancy subpixel SPb_R, and the bank BNK of the third main subpixel SPc_M and the third redundancy subpixel SPc_R may be formed in various ways, and the embodiments of the present disclosure are not limited thereto.

For example, the plurality of banks BNK may be formed of an organic insulating material. The plurality of banks BNK may be formed of a single layer or multiple layers of an organic insulating material. For example, the plurality of banks BNK may be composed of a photo resist, a polyimide (PI), or an acrylic material, but the embodiments of the present disclosure are not limited thereto.

The plurality of row lines RL may be formed of a transparent conductive material, but the embodiments of the present disclosure are not limited thereto. The plurality of row lines RL may be composed of a transparent conductive material so that light emitted from the light emitting devices ED may be directed upward through the row lines RL. For example, the plurality of row lines RL may be composed of a transparent conductive material such as indium tin oxide (ITO), indium zinc oxide (IZO), indium gallium zinc oxide (IGZO), and the like, but the embodiments of the present disclosure are not limited thereto.

The plurality of column lines CL may be made of a conductive material. For example, the plurality of column lines CL may be formed of a conductive material such as titanium (Ti), aluminum (Al), copper (Cu), molybdenum (Mo), nickel (Ni), chromium (Cr), indium tin oxide (ITO), indium zinc oxide (IZO), indium gallium zinc oxide (IGZO), but the embodiments of the present disclosure are not limited thereto. In another example, the plurality of column lines CL may have a multilayer structure of conductive materials. For example, the plurality of column lines CL may be made of a multilayer structure of titanium (Ti)/aluminum (Al)/titanium (Ti)/indium tin oxide (ITO), but the embodiments of the present disclosure are not limited thereto.

For example, if the light emitting device ED is a device manufactured through a semiconductor process, such as a micro LED, a plurality of light emitting devices ED may be formed on a wafer and the light emitting devices ED may be transferred to a substrate 210 of the display panel 110 to manufacture the display panel 110. In the process of transferring a plurality of light emitting devices ED having a microscopic size from the wafer to the substrate 210, various defects may occur. For example, a non-transfer defect may occur in which the light emitting device ED is not transferred in some subpixels SP, and a misalignment defect may occur in which the light emitting device ED is transferred out of its proper position due to an alignment error in other subpixels SP. In addition, the transfer process may proceed normally, but the transferred light emitting device ED itself may have a defect. Therefore, considering the defects (including non-transfer defects) that occur during the transfer process of the light emitting devices EDs, the main light emitting device and the redundancy light emitting device, which are light emitting devices of the same type (e.g., light emitting devices that emit light of the same color), can be transferred to one subpixel SP. A lighting test may be performed on the main light emitting device and the redundancy light emitting device of the same type, and it is possible to utilize only one of the main light emitting device and the redundancy light emitting device that is finally determined to be normal.

For example, the first main light emitting device EDa_M and the first redundancy light emitting device EDa_R may be transferred together to one first subpixel SPa, and the first main light emitting device EDa_M and the first redundancy light emitting device EDa_R may be inspected for defects. If, as a result of the inspection, both the first main light emitting device EDa_M and the first redundancy light emitting device EDa_R are determined to be normal, the first main light emitting device EDa_M can be used, and the first redundancy light emitting device EDa_R may be not used. If, as a result of the inspection, the first redundancy light emitting device EDa_R among the first main light emitting device EDa_M and the first redundancy light emitting device EDa_R is normal, the first main light emitting device EDa_M is not used, and the first redundancy light emitting device EDa_R can be used. Accordingly, even if the same first main light emitting device EDa_M and the first redundancy light emitting device EDa_R are transferred to one first subpixel SPa, one of the first main light emitting device EDa_M and the first redundancy light emitting device EDa_R can be used finally.

Accordingly, among the main light emitting device and the redundancy light emitting device arranged in one subpixel SP, the redundancy light emitting device may be a spare light emitting device transferred in preparation for a failure of the main light emitting device. In the event of a failure of the main light emitting device, the redundancy light emitting device can be used as a replacement. Therefore, by transferring the main light emitting device and the redundancy light emitting device together to one subpixel SP, it is possible to minimize the deterioration of display quality due to a defect in one of the main light emitting device and the redundancy light emitting device.

In the embodiments of the present disclosure, the first main subpixel SPa_M and the first redundancy subpixel SPa_R may also be referred to as a 1-1 subpixel and a 1-2 subpixel, respectively, the second main subpixel SPb_M and the second redundancy subpixel SPb_R may also be referred to as a 2-1 subpixel and a 2-2 subpixel, respectively, and the third main subpixel SPc_M and the third redundancy subpixel SPc_R may also be referred to as a 3-1 subpixel and a 3-2 subpixel, respectively.

In the embodiments of the present disclosure, the first main light emitting device EDa_M and the first redundancy light emitting device EDa_R may also be referred to as a 1-1 light emitting device and a 1-2 light emitting device, the second main light emitting device EDb_M and the second redundancy light emitting device EDb_R may also be referred to as a 2-1 light emitting device and a 2-2 light emitting device, and the third main light emitting device EDc_M and the third redundancy light emitting device EDc_R may also be referred to as a 3-1 light emitting device and a 3-2 light emitting device.

Referring to FIG. 12 and FIG. 13, the display panel 110 according to the embodiments of the present disclosure may further include a plurality of communication lines NL. The plurality of communication lines NL may be arranged so as not to overlap with the metal layer in a vertical direction. For example, a plurality of communication lines NL may be arranged between a first row line RL(1) and a second row line RL(2).

For example, the plurality of communication lines NL may be wires for short-range communication such as NFC (Near Field Communication) and Bluetooth. The plurality of communication lines NL may serve as signal transmission wires and/or antennas, but the embodiments of the present disclosure are not limited thereto.

Referring to FIG. 13, the first row line RL(1) may be arranged above a plurality of light emitting devices arranged in the first row (or the first pixel row) and may be arranged in a bar shape overlapping with all of the plurality of light emitting devices arranged in the first row (or the first pixel row).

The second row line RL(2) may be arranged above the plurality of light emitting devices arranged in the second row (or the second pixel row), and may be arranged in a bar shape overlapping with all of the plurality of light emitting devices arranged in the second row (or the second pixel row).

Figure 14:
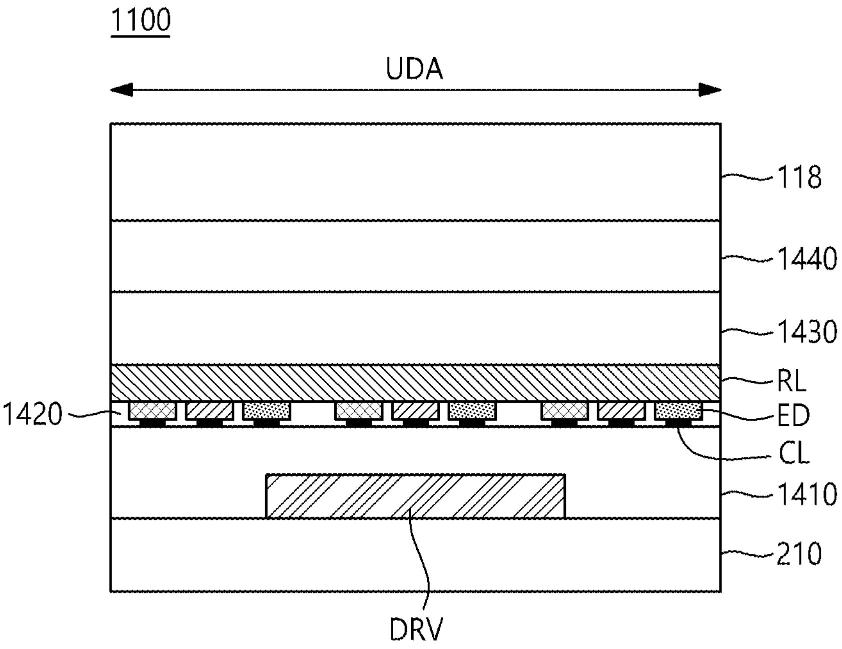
FIG. 14 is a cross-sectional view of a display panel according to embodiments of the present disclosure.

FIG. 14 is a cross-sectional view of a display panel 110 according to embodiments of the present disclosure. However, FIG. 14 is a cross-sectional view of a portion 1100 of a unit driving area UDA in which one driver DRV is arranged.

Referring to FIG. 14, a display panel 110 according to embodiments of the present disclosure may include a substrate 210, a driver DRV on the substrate 210, a layer stack 1410 on the driver DRV, a plurality of light emitting devices ED disposed on the layer stack 1410, an optical layer 1420 disposed on the layer stack 1410 and between the plurality of light emitting devices ED, an overcoat layer 1430 disposed on the plurality of light emitting devices ED and the optical layer 1420, an adhesive layer 1440 disposed on the overcoat layer 1430, and a cover member 118 disposed on the adhesive layer 1440.

Referring to FIG. 14, a plurality of column lines CL may be arranged on a layer stack 1410. Each of the plurality of column lines CL may be arranged between the layer stack 1410 and a light emitting device ED. A plurality of row lines RL may be arranged on a plurality of light emitting devices ED and an optical layer 1420.

A display panel 110 according to embodiments of the present disclosure may include a substrate 210 including a display area DA, a plurality of light emitting devices ED arranged in the display area DA, a plurality of column lines CL electrically connected to first electrodes Ecl of each of the plurality of light emitting devices ED, a plurality of row lines RL electrically connected to second electrodes Erl of each of the plurality of light emitting devices ED, and a plurality of drivers DRV configured to drive the plurality of light emitting devices ED, the plurality of column lines CL, and the plurality of row lines RL.

A plurality of drivers DRV may be arranged in the display area DA, and may be positioned closer to the substrate 210 than the plurality of light emitting devices ED.

The layer stack 1410 may include a plurality of insulating layers. The plurality of insulating layers may include a plurality of organic layers. At least one of the plurality of organic layers may be arranged on a side of the driver DRV. For example, two or more organic layers may be arranged on a side of the driver DRV.

The layer stack 1410 may further include at least one metal layer connecting the driver DRV and the column line CL, and at least one metal layer connecting the driver DRV and the row line RL.

Figure 15:
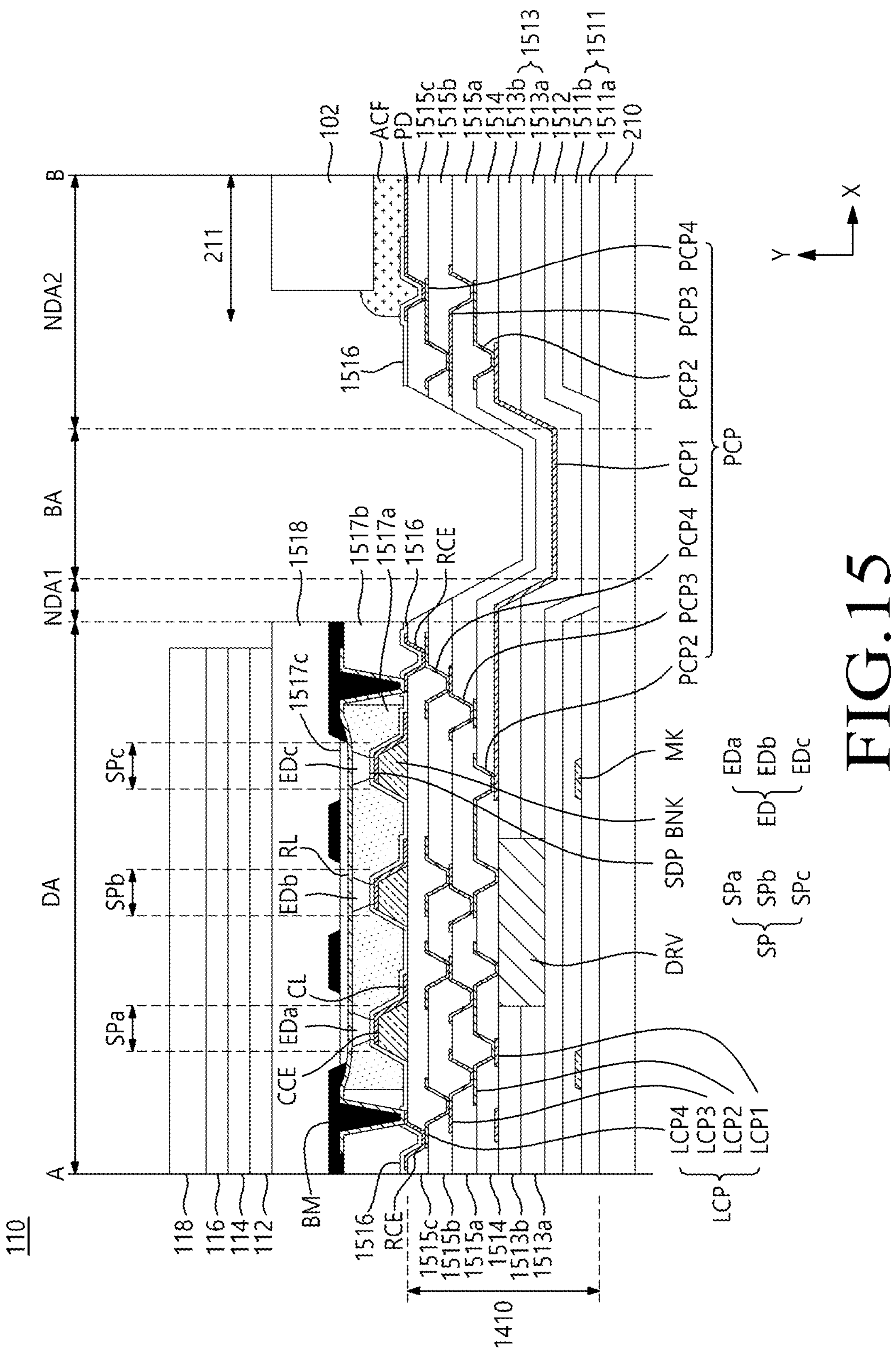
FIG. 15 is a detailed cross-sectional view of a display panel according to embodiments of the present disclosure, taken along the A-B cutting line of FIG. 10.
Figure 16:
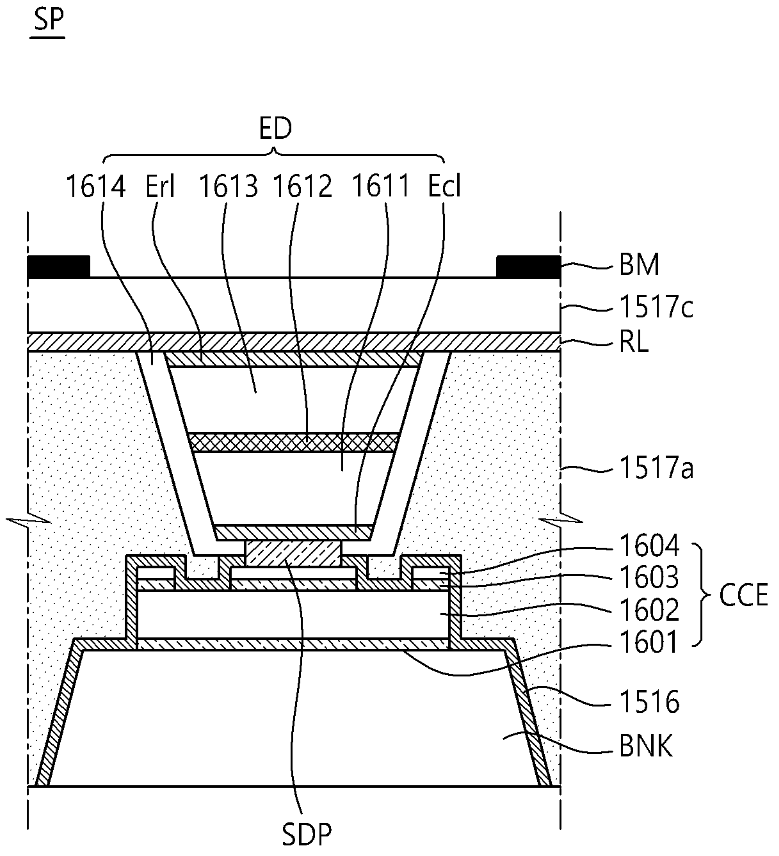
FIG. 16 is an enlarged cross-sectional view of a first subpixel of a display panel according to embodiments of the present disclosure.

FIG. 15 is a detailed cross-sectional view of a display panel 110 according to embodiments of the present disclosure taken along the A-B cutting line of FIG. 10, and FIG. 16 is an enlarged cross-sectional view of a subpixel SP of a display panel 110 according to embodiments of the present disclosure. However, FIG. 15 is a cross-sectional view of a display area DA, a first non-display area NDA1, a bending area BA, and a second non-display area NDA2.

Meanwhile, for the convenience of illustration, the A-B cutting line in FIG. 10 is illustrated as not overlapping with a signal line SL and a link line LL, but the A-B cutting line in FIG. 10 is intended to indicate the same position as the adjacent signal line SL and the link line LL.

Referring to FIG. 15, a buffer layer 1511 may be included on the substrate 210. The buffer layer 1511 may include a first buffer layer 1511*a* and a second buffer layer 1511*b*. The first buffer layer 1511*a* and the second buffer layer 1511*b* may be arranged in the display area DA, the first non-display area NDA1, and the second non-display area NDA2, and may not be arranged in the entirety or part of the bending area BA. However, the present disclosure is not limited thereto.

The first buffer layer 1511*a* and the second buffer layer 1511*b* may reduce the penetration of moisture or impurities through the substrate 210. The first buffer layer 1511*a* and the second buffer layer 1511*b* may be made of an inorganic insulating material. For example, the first buffer layer 1511*a* and the second buffer layer 1511*b* may be composed of a single layer or multiple layers of silicon oxide (SiOx) or silicon nitride (SiNx), but the embodiments of the present disclosure are not limited thereto.

For example, a portion of the first buffer layer 1511*a* and the second buffer layer 1511*b* on the bending area BA may be removed. The upper surface of the substrate 210 located on the bending area BA may be exposed by the area (e.g., opening) where the first buffer layer 1511*a* and the second buffer layer 1511*b* are removed.

By removing the first buffer layer 1511*a* and the second buffer layer 1511*b* from the bending area BA, it is possible to minimize or at least reduce an occurrence of cracks in the first buffer layer 1511*a* and the second buffer layer 1511*b* that may occur during bending.

A plurality of alignment keys MK may be arranged between the first buffer layer 1511*a* and the second buffer layer 1511*b*. The plurality of alignment keys MK may be configured to identify the position of the driver DRV during the manufacturing process of the display panel 110. For example, the plurality of alignment keys MK may be configured to align the position of the driver DRV transferred on the adhesive layer 1512. In another example, the plurality of alignment keys MK may be omitted.

An adhesive layer 1512 may be disposed on the second buffer layer 1511*b*. The adhesive layer 1512 may be disposed in the display area DA, the first non-display area NDA1, the bending area BA, and the second non-display area NDA2. In another example, at least a portion of the adhesive layer 1512 may be removed in the non-display area NDA including the bending area BA. For example, the adhesive layer 1512 may be made of any one of an adhesive polymer, an epoxy resin, a UV-curable resin, a polyimide series, an acrylate series, a urethane series, and a polydimethylsiloxane (PDMS), but the embodiments of the present disclosure are not limited thereto.

A driver DRV may be disposed on the adhesive layer 1512 in the display area DA. If the driver DRV is implemented as a driving chip (e.g., driver integrated circuit), the driving driver may be mounted on the adhesive layer 1512 by a transfer process, but the embodiments of the present disclosure are not limited thereto.

The display panel 110 may further include a side protection layer 1513 disposed on the side of the plurality of drivers DRV, and an upper protection layer 1514 disposed on the plurality of drivers DRV and the side protection layer 1513. For example, the side protection layer 1513 may include at least one of a first protection layer 1513*a* and a second protection layer 1513*b* disposed on the side of the plurality of drivers DRV, and in some cases, may further include at least one additional protection layer. The first protection layer 1513*a* and the second protection layer 1513*b* may be disposed on the adhesive layer 1512. The first protection layer 1513*a* and the second protection layer 1513*b* may be arranged to surround the side surface of the driver DRV, but the embodiments of the present disclosure are not limited thereto. For example, the second protection layer 1513*b* may be arranged to cover at least a portion of the upper surface of the driver DRV. For example, at least one of the first protection layer 1513*a* and the second protection layer 1513*b* arranged on the bending area BA may be omitted. For example, the first protection layer 1513*a* may be arranged entirely on the display area DA and the non-display area NDA, and the second protection layer 1513*b* may be partially arranged on the display area DA, the first non-display area NDA1, and the second non-display area NDA2. For example, at least a portion of the second protection layer 1513*b* may be removed in all or part of the bending area BA. However, the embodiments of the present disclosure are not limited thereto.

For example, the side protection layer 1513 including at least one of the first protection layer 1513*a* and the second protection layer 1513*b* may be composed of an organic insulating material (i.e., organic layer), but the embodiments of the present disclosure are not limited thereto. For example, the first protection layer 1513*a* and the second protection layer 1513*b* may be composed of a photo resist, a polyimide (PI), or a photo acryl-based material, but the embodiments of the present disclosure are not limited thereto. For example, the first protection layer 1513*a* and the second protection layer 1513*b* may be an overcoating layer or an insulating layer, but the embodiments of the present disclosure are not limited thereto.

According to embodiments of the present disclosure, in the display area DA, a plurality of line connection patterns LCP may be arranged on the second protection layer 1513*b*. The plurality of line connection patterns LCP may be wiring for electrically connecting the driver DRV to other components. For example, the driver DRV may be electrically connected to a plurality of column lines CL, a plurality of row lines RL, and a plurality of row connection electrodes RCE through the plurality of line connection patterns LCP.

For example, the plurality of line connection patterns LCP may include a first line connection pattern LCP1, a second line connection pattern LCP2, a third line connection pattern LCP3, and a fourth line connection pattern LCP4, but the embodiments of the present disclosure are not limited thereto. For example, the first line connection pattern LCP1, the second line connection pattern LCP2, the third line connection pattern LCP3, and the fourth line connection pattern LCP4 may be arranged in different metal layers.

For example, a plurality of first line connection patterns LCP1 may be arranged on the second protection layer 1513*b*. The plurality of first line connection patterns LCP1 may be electrically connected to the driver DRV. The plurality of first line connection patterns LCP1 may transmit the voltage output from the driver DRV to the column line CL or the row line RL.

The display panel 110 may further include a side protection layer 1513 including at least one of the first protection layer 1513*a* and the second protection layer 1513*b*, and an upper protection layer 1514 arranged on the plurality of drivers DRV. For example, the upper protection layer 1514 may include a third protection layer 1514, and in some cases, may further include at least one additional protection layer. The third protection layer 1514 may be disposed on the second protection layer 1513*b* and the plurality of first line connection patterns LCP1. The third protection layer 1514 may be disposed entirely in the display area DA and the non-display area NDA. In the bending area BA, the third protection layer 1514 may cover or enclose the side surface of the second protection layer 1513*b* and the upper surface of the first protection layer 1513*a*.

For example, the third protection layer 1514 may be composed of an organic insulating material. For example, the third protection layer 1514 may be composed of a photo resist, a polyimide (PI), or a photo acryl-based material, but the embodiments of the present disclosure are not limited thereto. For example, the first protection layer 1513*a*, the second protection layer 1513*b*, and the third protection layer 1514 may be composed of the same insulating material, or at least one of the first protection layer 1513*a*, the second protection layer 1513, and the third protection layer 1514 may be composed of a different insulating material from the rest. However, the embodiments of the present disclosure are not limited thereto.

A plurality of second line connection patterns LCP2 may be arranged on the third protection layer 1514. The plurality of second line connection patterns LCP2 may be electrically connected or directly connected to the driver DRV. For example, some of the second line connection patterns LCP2 may be directly or indirectly connected to the driver DRV through contact holes of the third protection layer 1514. Other parts of the second line connection patterns LCP2 may be electrically connected to the first line connection pattern LCP1 through contact holes of the third protection layer 1514. However, the embodiments of the present disclosure are not limited thereto. The voltage output from the driver DRV may be transmitted to the column line CL or the row line RL through the plurality of second line connection patterns LCP2 and other connection patterns.

A first insulating layer 1515*a* may be disposed on the plurality of second line connection patterns LCP2. The first insulating layer 1515*a* may be disposed entirely over the display area DA and the non-display area NDA, but the embodiments of the present disclosure are not limited thereto. The first insulating layer 1515*a* may be composed of an organic insulating material, but the embodiments of the present disclosure are not limited thereto. For example, the first insulating layer 1515*a* may be composed of a photo resist, a polyimide (PI), or a photo acryl-based material, but the embodiments of the present disclosure are not limited thereto.

A plurality of third line connection patterns LCP3 may be disposed on the first insulating layer 1515*a*. The plurality of third line connection patterns LCP3 may be electrically connected to the plurality of second line connection patterns LCP2. For example, the third line connection pattern LCP3 may be electrically connected to the second line connection pattern LCP2 through a contact hole of the first insulating layer 1515*a*.

A second insulating layer 1515*b* may be disposed on a plurality of third line connection patterns LCP3. The second insulating layer 1515*b* may be disposed in the display area DA, the first non-display area NDA1, and the second non-display area NDA2, and may not be disposed in the entirety or part of the bending area BA, but the embodiments of the present disclosure are not limited thereto. For example, the second insulating layer 1515*b* may be removed from the entirety or part of the bending area BA. The second insulating layer 1515*b* may be composed of an organic insulating material, but the embodiments of the present disclosure are not limited thereto. For example, the second insulating layer 1515*b* may be composed of a photo resist, a polyimide (PI), or a photo acryl-based material, but the embodiments of the present disclosure are not limited thereto.

A plurality of fourth line connection patterns LCP4 may be arranged on the second insulating layer 1515*b*. The plurality of fourth line connection patterns LCP4 may be electrically connected to a plurality of third line connection patterns LCP3. For example, the fourth line connection patterns LCP4 may be electrically connected to the third line connection patterns LCP3 through a contact hole of the second insulating layer 1515*b*.

Referring to FIG. 15, according to the embodiments of the present disclosure, in the non-display area NDA, a plurality of pad connection patterns PCP may be arranged on the second protection layer 1513*b*. A plurality of pad connection patterns PCPs may be wiring for transmitting a signal transmitted from a flexible printed circuit 102 to a pad section 211 to a driver DRV of a display area DA. For example, a plurality of pad connection patterns PCP may be electrically connected to a plurality of pads PDs and may receive signals from the flexible printed circuit 102 through the plurality of pads PDs. The flexible printed circuit 102 may be connected to a printed circuit board 104 (see FIGS. 1 and 2).

For example, a plurality of pad connection patterns PCP may extend from the pad section 211 toward the display area DA and transmit signals to the wiring of the display area DA. In this case, a plurality of pad connection patterns PCP may function as link wiring LL (see FIG. 10). The plurality of pad connection patterns PCP may include a first pad connection pattern PCP1, a second pad connection pattern PCP2, a third pad connection pattern PCP3, and a fourth pad connection pattern PCP4.

The plurality of first pad connection patterns PCP1 may be arranged on the second protection layer 1513*b*. Each of the plurality of first pad connection patterns PCP1 may be arranged across the second non-display area NDA2, the bending area BA, and the first non-display area NDA1. Each of the plurality of first pad connection patterns PCP1 may include a first portion arranged in the bending area BA, a second portion extending from the first portion to the first non-display area NDA1, and a third portion extending from the first portion to the second non-display area NDA2. Each of the plurality of first pad connection patterns PCP1 may extend from the first non-display area NDA1 to a portion of the display area DA. The plurality of first pad connection patterns PCP1 may transmit a signal transmitted from the flexible printed circuit 102 to the pad portion 211 to the driver DRV of the display area DA.

Each of the plurality of first pad connection patterns PCP1 may be electrically connected to the pad PD of the pad section 211 through connection patterns arranged in the second non-display area NDA2. Here, the connection patterns electrically connecting each of the plurality of first pad connection patterns PCP1 to the pad PD may include at least one of the second pad connection pattern PCP2, the third pad connection pattern PCP3, and the fourth pad connection pattern PCP4 arranged in the second non-display area NDA2.

Each of the plurality of first pad connection patterns PCP1 may be electrically connected to the driver DRV through connection patterns arranged in the display area DA. Here, the connection patterns electrically connecting each of the plurality of first pad connection patterns PCP1 to the driver DRV may include at least one of the second pad connection pattern PCP2, the third pad connection pattern PCP3, and the fourth pad connection pattern PCP4 arranged in the display area DA.

The plurality of second pad connection patterns PCP2 may be arranged on the third protection layer 1514. The plurality of second pad connection patterns PCP2 may be arranged in the second non-display area NDA2. The second pad connection pattern PCP2 may be electrically connected to the first pad connection pattern PCP1 through a contact hole of the third protection layer 1514. Therefore, the signal supplied from the flexible printed circuit 102 can be transmitted to the first pad connection pattern PCP1 through the second pad connection pattern PCP2.

The third pad connection pattern PCP3 may be arranged on the first insulating layer 1515*a*. The third pad connection pattern PCP3 may be arranged in the second non-display area NDA2. The third pad connection pattern PCP3 may be electrically connected to the second pad connection pattern PCP2 through a contact hole of the first insulating layer 1515*a*. Therefore, the signal supplied from the flexible printed circuit 102 can be transmitted to the second pad connection pattern PCP2 through the third pad connection pattern PCP3, and the signal transmitted to the second pad connection pattern PCP2 can be transmitted again to the first pad connection pattern PCP1.

The fourth pad connection pattern PCP4 may be arranged on the second insulating layer 1515*b*. The fourth pad connection pattern PCP4 may be arranged in the second non-display area NDA2. The fourth pad connection pattern PCP4 may be electrically connected to the third pad connection pattern PCP3 through a contact hole of the second insulating layer 1515*b*. The pad PD of the pad section 211 may be electrically connected to the fourth pad connection pattern PCP4 through a contact hole of the third insulating layer 1515*c*.

A signal supplied from a flexible printed circuit 102 is input to a pad PD of a pad section 211, and a signal input to the pad PD is transmitted to a third pad connection pattern PCP3 through a fourth pad connection pattern PCP4, and a signal transmitted to the third pad connection pattern PCP3 can be transmitted again to a first pad connection pattern PCP1 through a second pad connection pattern PCP2. A signal transmitted to the first pad connection pattern PCP1 can be transmitted to a driver DRV through connection patterns arranged in a display area DA.

Referring to FIG. 15, a plurality of line connection patterns LCP and a plurality of pad connection patterns PCP may be arranged in various metal layers. The plurality of line connection patterns LCP and the plurality of pad connection patterns PCP may be formed of any one of a conductive material having excellent ductility and various conductive materials used in a display area DA.

For example, a metal pattern such as a first pad connection pattern PCP1 at least partially disposed in the bending area BA may be composed of a conductive material having excellent ductility, such as gold (Au), silver (Ag), or aluminum (Al), but the embodiments of the present disclosure are not limited thereto. In another example, the plurality of line connection patterns LCP and the plurality of pad connection patterns PCP may be composed of molybdenum (Mo), chromium (Cr), titanium (Ti), nickel (Ni), neodymium (Nd), copper (Cu), and an alloy of silver (Ag) and magnesium (Mg), or an alloy thereof, but the embodiments of the present disclosure are not limited thereto.

A third insulating layer 1515*c* may be disposed on the plurality of line connection patterns LCP and the plurality of pad connection patterns PCP. The third insulating layer 1515*c* is disposed in the display area DA, the first non-display area NDA1, and the second non-display area NDA2, and may be disposed in all or part of the bending area BA, but the embodiments of the present disclosure are not limited thereto. In the bending area BA, a part of the third insulating layer 1515*c* may be removed. The third insulating layer 1515*c* may be composed of an organic insulating material, but the embodiments of the present disclosure are not limited thereto. For example, the third insulating layer 1515*c* may be composed of a photo resist, a polyimide (PI), or a photo acryl-based material, but the embodiments of the present disclosure are not limited thereto.

A plurality of banks BNK may be disposed on the third insulating layer 1515*c* in the display area DA. The plurality of banks BNKs may be arranged to overlap with at least a portion of each of the plurality of subpixels SPa, SPb and SPc. For example, the first subpixel SPa may include a first light emitting device EDa that emits a first color light, the second subpixel SPb may include a second light emitting device EDb that emits a second color light, and the third subpixel SPc may include a third light emitting device EDc that emits a third color light.

As an example, one light emitting device ED may be arranged on top of each of the plurality of banks BNKs. As another example, two or more light emitting devices ED may be arranged on top of each of the plurality of banks BNK. The two or more light emitting devices EDs arranged on top of each of the plurality of banks BNK may be light emitting devices of the same type. For example, the light emitting devices of the same type may be light emitting devices that emit the same color light. For example, the two or more light emitting devices ED arranged on top of each of the plurality of banks BNK may include a main light emitting device and a redundancy light emitting device.

In the display area DA, a plurality of row connection electrodes RCE may be arranged on the third insulating layer 1515*c*. The plurality of row connection electrodes RCE may transfer a low-potential voltage VSS output from the driver DRV to the row line RL.

In the display area DA, a plurality of column lines CL may be arranged on the third insulating layer 1515*c*. The plurality of column lines CL may be arranged in an area between the plurality of banks BNK. For example, the plurality of column lines CL may be arranged adjacent to one of the plurality of banks BNK.

Each of the plurality of column lines CL may include a wiring portion and a column connection electrode CCE protruding from the wiring portion. The wiring portion and the column connection electrode CCE included in each of the plurality of column lines CL may be formed integrally or may be different metals that are electrically connected.

For example, each of the plurality of column lines CL may include a column connection electrode CCE that is a portion protruding above an adjacent bank BNK among the plurality of banks BNK. The column connection electrode CCE of each of the plurality of column lines CL may be arranged to extend along the side and upper surface of the bank BNK. The column connection electrode CCE may be an electrode electrically connected to each of the plurality of column lines CL or may be a portion protruding from each of the plurality of column lines CL.

Referring to FIG. 16, the column connection electrode CCE of the column line CL may be composed of one conductive layer or multiple conductive layers. For example, a column connection electrode CCE electrically connected to a column line CL or protruding from the column line CL may include a first conductive layer 1601, a second conductive layer 1602, a third conductive layer 1603, and a fourth conductive layer 1604, but the embodiments of the present disclosure are not limited thereto.

The first conductive layer 1601 may be disposed on a bank BNK. The second conductive layer 1602 may be disposed on the first conductive layer 1601. The third conductive layer 1603 may be disposed on the second conductive layer 1602, and the fourth conductive layer 1604 may be disposed on the third conductive layer 1603. For example, each of the first conductive layer 1601, the second conductive layer 1602, the third conductive layer 1603, and the fourth conductive layer 1604 may be composed of titanium (Ti), molybdenum (Mo), aluminum (Al), or titanium (Ti) and indium tin oxide (ITO), but the embodiments of the present disclosure are not limited thereto.

According to the embodiments of the present disclosure, among the plurality of conductive layers constituting the column connection electrode CCE, some conductive layers having good reflection efficiency may be configured as an alignment key and/or a reflector for aligning the light emitting devices ED. For example, among the plurality of conductive layers constituting the column connection electrode CCE, the second conductive layer 1602 may include a reflective material. For example, the second conductive layer 1602 may include aluminum (Al), but the embodiments of the present disclosure are not limited thereto. Accordingly, the second conductive layer 1602 may be configured as a reflector. In addition, due to the high reflection efficiency of the second conductive layer 1602, it can be easily identified in the manufacturing process, and thus the position or transfer position of the light emitting device ED can be aligned based on the second conductive layer 1602.

For example, in order to configure the second conductive layer 1602 as a reflector, the third conductive layer 1603 and the fourth conductive layer 1604 disposed on the second conductive layer 1602 may be partially removed or etched. For example, a portion of the third conductive layer 1603 and the fourth conductive layer 1604 disposed on the bank BNK may be removed or etched to expose the upper surface of the second conductive layer 1602. That is, the openings of the third conductive layer 1603 and the fourth conductive layer 1604 may overlap with a portion of the upper surface of the second conductive layer 1602. For example, in the third conductive layer 1603 and the fourth conductive layer 1604, the central portion and the edge portion where a solder pattern SDP is arranged may remain, and the remaining portions excluding this portion (e.g., the central portion, the edge portion) may be removed. For example, the edge portion of each of the third conductive layer 1603 made of titanium (Ti) and the fourth conductive layer 1604 made of indium tin oxide (ITO) may not be etched. Accordingly, it is possible to prevent other conductive layers of the column connection electrode CC of the column line CL from being corroded by the TMAH (Tetra Methyl Ammonium Hydroxide) solution used in the mask process of the column connection electrode CCE.

According to the embodiments of the present disclosure, the first conductive layer 1601 and the third conductive layer 1603 may include titanium (Ti) or molybdenum (Mo). The second conductive layer 1602 may include aluminum (Al). The fourth conductive layer 1604 may include a transparent conductive oxide layer such as indium tin oxide (ITO) or indium zinc oxide (IZO) that has good adhesion to the solder pattern SDP and corrosion resistance and acid resistance. However, the embodiments of the present disclosure are not limited thereto.

The first conductive layer 1601, the second conductive layer 1602, the third conductive layer 1603, and the fourth conductive layer 1604 may be sequentially deposited and then patterned by performing a photolithography process and an etching process, but the embodiments of the present disclosure are not limited thereto.

According to embodiments of the present disclosure, two or more of the column connection electrode CCE, the column line CL, the row connection electrode RCE, and the pad PD may be arranged on the same layer. The column connection electrode CCE, the column line CL, the row connection electrode RCE, and the pad PD may be composed of a single layer or multiple layers of a conductive material, but the embodiments of the present disclosure are not limited thereto. For example, two or more of the column connection electrode CCE, the column line CL, the row connection electrode RCE, and the pad PD may be composed of a multiple layer of indium tin oxide (ITO)/titanium (Ti)/aluminum (Al)/titanium (Ti), but the embodiments of the present disclosure are not limited thereto.

According to embodiments of the present disclosure, a solder pattern SDP may be arranged on the column connection electrode CCE in each of a plurality of subpixels. The solder pattern SDP may bond the light emitting device ED to the column connection electrode CCE. The column connection electrode CCE and the light emitting device ED may be electrically connected through eutectic bonding using the solder pattern SDP, but the embodiments of the present disclosure are not limited thereto. For example, if the solder pattern SDP is composed of indium (In) and the first electrode Ecl of the light emitting device ED is composed of gold (Au), the solder pattern SDP and the first electrode Ecl of the light emitting device ED may be bonded by applying heat and pressure in a transfer process of the light emitting device ED. Through eutectic bonding, the light emitting device ED may be bonded to the solder pattern SDP and the column connection electrode CCE without a separate adhesive. For example, the solder pattern SDP may be composed of indium (In), tin (Sn), or an alloy thereof, but the embodiments of the present disclosure are not limited thereto. For example, the solder pattern SDP may be a bonding pad, but the embodiments of the present disclosure are not limited thereto.

According to the embodiments of the present disclosure, the passivation layer 1516 may be disposed on a plurality of column lines CL, a plurality of column connection electrodes CCE, a plurality of row connection electrodes RCE, and a third insulating layer 1515*c*.

For example, the passivation layer 1516 may be disposed on a display area DA, a first non-display area NDA1, and a second non-display area NDA2. In the entirety or a portion of the bending area BA, at least a portion of the passivation layer 1516 covering the plurality of pads PD may be removed. A portion of the passivation layer 1516 covering the plurality of pads PD in the second non-display area NDA2 may be removed. In addition, as illustrated in FIG. 16, the passivation layer 1516 may be removed from the area where the solder pattern SDP is arranged.

Since the passivation layer 1516 is arranged to cover the remaining area except for the bending area BA, the plurality of pads PD, and the area where the solder pattern SDP is arranged, the penetration of moisture or impurities into the light emitting device ED can be reduced. For example, the passivation layer 1516 may be composed of a single layer or multiple layers of silicon oxide (SiOx) or silicon nitride (SiNx), but the embodiments of the present disclosure are not limited thereto. For example, the passivation layer 1516 may be a protection layer or an insulating layer, but the embodiments of the present disclosure are not limited thereto. For example, as illustrated in FIG. 16, the passivation layer 1516 may include a hole through which the solder pattern SDP is exposed. That is, the hole of the passivation layer 1516 may overlap with the solder pattern SDP.

Referring to FIG. 16, a light emitting device ED may be arranged on the solder pattern SDP in each of a plurality of subpixels SP. The light emitting device ED may be formed on a silicon wafer by a method such as Metal Organic Chemical Vapor Deposition (MOCVD), Chemical Vapor Deposition (CVD), Plasma-Enhanced Chemical Vapor Deposition (PDCVD), Molecular Beam Epitaxy (MBE), Hydride Vapor Phase Epitaxy (HVPD), or Sputtering, but the embodiments of the present disclosure are not limited thereto.

Referring to FIG. 16, the light emitting device ED may include a first electrode Ecl, a first semiconductor layer 1611, an active layer 1612, a second semiconductor layer 1613, a second electrode Erl, and an encapsulation film 1614, but the embodiments of the present disclosure are not limited thereto. For example, the encapsulation film 1614 may not be included in the light emitting device ED.

The first semiconductor layer 1611 may be disposed on the solder pattern SDP. The second semiconductor layer 1613 may be disposed on the first semiconductor layer 1611.

For example, one of the first semiconductor layer 1611 and the second semiconductor layer 1613 may be implemented as a compound semiconductor of group III-V, group II-VI, and may be doped with an impurity (or dopant). For example, one of the first semiconductor layer 1611 and the second semiconductor layer 1613 may be a semiconductor layer doped with an n-type impurity, and the other may be a semiconductor layer doped with a p-type impurity, but the embodiments of the present disclosure are not limited thereto. For example, at least one of the first semiconductor layer 1611 and the second semiconductor layer 1613 may be a layer doped with an n-type or p-type impurity in a material such as gallium nitride (GaN), gallium phosphide (GaP), gallium arsenide phosphide (GaAsP), aluminum gallium indium phosphide (AlGaInP), indium aluminum phosphide (InAlP), aluminum gallium nitride (AlGaN), aluminum indium nitride (AlInN), aluminum indium gallium nitride (AlInGaN), aluminum gallium arsenide (AlGaAs), or gallium arsenide (GaAs), but the embodiments of the present disclosure are not limited thereto. For example, the n-type impurity may be silicon (Si), germanium (Ge), selenium (Se), carbon (C), tellurium (Te), or tin (Sn), but the embodiments of the present disclosure are not limited thereto. For example, the p-type impurity may be magnesium (Mg), zinc (Zn), calcium (Ca), strontium (Sr), barium (Ba), or beryllium (Be), but the embodiments of the present disclosure are not limited thereto.

For example, the first semiconductor layer 1611 and the second semiconductor layer 1613 may be a nitride semiconductor including an n-type impurity and a nitride semiconductor including a p-type impurity, respectively, but the embodiments of the present disclosure are not limited thereto. For example, the first semiconductor layer 1611 may be a nitride semiconductor containing a p-type impurity, and the second semiconductor layer 1613 may be a nitride semiconductor containing an n-type impurity, but the embodiments of the present disclosure are not limited thereto.

The active layer 1612 may be arranged between the first semiconductor layer 1611 and the second semiconductor layer 1613. The active layer 1612 may receive holes and electrons from the first semiconductor layer 1611 and the second semiconductor layer 1613 to emit light. For example, the active layer 1612 may be configured as one of a single well structure, a multi-well structure, a single quantum well structure, a multi-quantum well (MQW) structure, a quantum dot structure, and a quantum wire structure, but the embodiments of the present disclosure are not limited thereto. For example, the active layer 1612 may be configured as indium gallium nitride (InGaN) or gallium nitride (GaN), but the embodiments of the present disclosure are not limited thereto.

In another example, the active layer 1612 may include a multi-quantum well (MQW) structure having a well layer and a barrier layer having a higher band gap than the well layer. For example, the active layer 1612 may be formed of InGaN as a well layer and an AlGaN layer as a barrier layer, but the embodiments of the present disclosure are not limited thereto.

The first electrode Ecl of the light emitting device ED may be arranged between the first semiconductor layer 1611 and the solder pattern SDP. For example, the first electrode Ecl of the light emitting device ED may electrically connect the first semiconductor layer 1611 and the column connection electrode CCE. The column line voltage (e.g., the anode voltage) output from the driver DRV may be applied to the first semiconductor layer 1611 through the column line CL, the column connection electrode CCE, and the first electrode Ecl. For example, the first electrode Ecl may be composed of a conductive material capable of eutectic bonding with the solder pattern SDP, but the embodiments of the present disclosure are not limited thereto. For example, the first electrode Ecl of the light emitting device ED may be composed of gold (Au), tin (Sn), tungsten (W), silicon (Si), silver (Ag), titanium (Ti), iridium (Ir), chromium (Cr), indium (In), zinc (Zn), lead (Pb), nickel (Ni), platinum (Pt), and copper (Cu), or an alloy thereof, but the embodiments of the present disclosure are not limited thereto.

The second electrode Erl of the light emitting device ED may be disposed on the second semiconductor layer 1613. For example, the second electrode Erl of the light emitting device ED may electrically connect the second semiconductor layer 1613 and the row line RL. A row line voltage (e.g., referred to as a low-potential voltage VSS as a cathode voltage) output from the driver DRV may be applied to the second semiconductor layer 1613 through the row connection electrode RCE, the row line RL, and the second electrode Erl. The second electrode Erl of the light emitting device ED may be made of a transparent conductive material so that light emitted from the light emitting device ED can be directed to the upper portion of the light emitting device ED, but the embodiments of the present disclosure are not limited thereto. For example, the second electrode Erl may be made of a material such as indium tin oxide (TTO), indium zinc oxide (IZO), or indium gallium zinc oxide (IGZO), but the embodiments of the present disclosure are not limited thereto.

The encapsulation film 1614 may be disposed on at least a portion of the first semiconductor layer 1611, the active layer 1612, the second semiconductor layer 1613, the first electrode Ecl, and the second electrode En. For example, the encapsulation film 1614 may surround at least a portion of the first semiconductor layer 1611, the active layer 1612, the second semiconductor layer 1613, the first electrode Ecl, and the second electrode Erl.

For example, the encapsulation film 1614 may protect the first semiconductor layer 1611, the active layer 1612, and the second semiconductor layer 1613. For example, the encapsulation film 1614 may be disposed on a side surface of the first semiconductor layer 1611, a side surface of the active layer 1612, and a side surface of the second semiconductor layer 1613.

For example, the encapsulation film 1614 may be disposed on at least a portion of the first electrode Ecl and the second electrode Erl of the light emitting device ED. For example, the encapsulation film 1614 may be disposed on an edge portion (or one side) of the first electrode Ecl of the light emitting device ED and an edge portion (or one side) of the second electrode Erl of the light emitting device ED. At least a portion of the first electrode Ecl may be exposed from the encapsulation film 1614 so that the first electrode Ecl may be connected to the solder pattern SDP. For example, at least a portion of the second electrode Erl may be exposed from the encapsulation film 1614 so that the second electrode Erl may be connected to the row line RL. For example, the encapsulation film 1614 may be made of an insulating material such as silicon nitride (SiNx) or silicon oxide (SiOx), but the embodiments of the present disclosure are not limited thereto.

In another example, the encapsulation film 1614 may have a structure in which a reflective material is dispersed in a resin layer, but the embodiments of the present disclosure are not limited thereto. For example, the encapsulation film 1614 may be manufactured as a reflector of various structures, but the embodiments of the present disclosure are not limited thereto. Light emitted from the active layer 1612 may be reflected upward by the encapsulation film 1614, thereby improving light extraction efficiency. For example, the encapsulation film 1614 may be a reflective layer, but the embodiments of the present disclosure are not limited thereto.

According to the embodiments of the present disclosure, the light emitting device ED is described as having a vertical structure, but the embodiments of the present disclosure are not limited thereto. For example, the light emitting device ED may have a lateral structure or a flip chip structure.

The structure of the light emitting device ED illustrated in FIG. 16 may be substantially equally applied to all of the first light emitting device EDa, the second light emitting device EDb, and the third light emitting device EDc. According to embodiments of the present disclosure, a first optical layer 1517*a* may be arranged to surround a plurality of light emitting devices ED in the display area DA. For example, the first optical layer 1517*a* may be arranged to cover a plurality of light emitting devices ED and the bank BNK in the area of a plurality of subpixels SP. For example, the first optical layer 1517*a* may cover a bank BNK, a portion of the passivation layer 1516, and a region between the plurality of light emitting devices ED. The first optical layer 1517*a* may be arranged or covered between a plurality of light emitting devices ED included in one pixel and between a plurality of banks BNK. For example, the first optical layer 1517*a* may be arranged to extend in the first direction (X) and be spaced apart from each other in the second direction (Y). For example, the first optical layer 1517*a* may be arranged to surround the side of the light emitting devices ED and the banks BNK between the passivation layer 1516 and the row line RL, but the embodiments of the present disclosure are not limited thereto. For example, the first optical layer 1517*a* may be a diffusion layer or a sidewall diffusion layer, but the embodiments of the present disclosure are not limited thereto.

The first optical layer 1517*a* may include an organic insulating material having fine particles dispersed therein, but the embodiments of the present disclosure are not limited thereto. For example, the first optical layer 1517*a* may be composed of siloxane having fine metal particles, such as titanium dioxide (TiO2) particles, dispersed therein, but the embodiments of the present disclosure are not limited thereto. Light from a plurality of light emitting devices ED may be scattered by the fine particles dispersed in the first optical layer 1517*a* and emitted to the outside of the display device 100. Accordingly, the first optical layer 1517*a* may improve the extraction efficiency of light emitted from the plurality of light emitting devices ED.

For example, the first optical layer 1517*a* may be arranged on each of a plurality of pixels or may be arranged together on some pixels arranged in the same row, but the embodiments of the present disclosure are not limited thereto. For example, the first optical layer 1517*a* may be arranged on each of a plurality of pixels, or the plurality of pixels may share one first optical layer 1517*a*. In another example, each of the plurality of subpixels may separately include a first optical layer 1517*a*, but the embodiments of the present disclosure are not limited thereto.

According to the embodiments of the present disclosure, in the display area DA, a second optical layer 1517*b* may be arranged on the passivation layer 1516. For example, the second optical layer 1517*b* may be arranged to surround the first optical layer 1517*a*. For example, the second optical layer 1517*b* may be in contact with a side surface of the first optical layer 1517*a*. For example, the second optical layer 1517*b* may be arranged in an area between the plurality of pixels. However, the embodiments of the present disclosure are not limited thereto. For example, the second optical layer 1517*b* may be a diffusion layer, a diffusion layer window, or a window diffusion layer, but the embodiments of the present disclosure are not limited thereto.

The second optical layer 1517*b* may be composed of an organic insulating material, but the embodiments of the present disclosure are not limited thereto. The second optical layer 1517*b* may be composed of the same material as the first optical layer 1517*a*, but the embodiments of the present disclosure are not limited thereto. For example, the first optical layer 1517*a* may include fine particles, and the second optical layer 1517*b* may not include fine particles. For example, the second optical layer 1517*b* may be composed of siloxane, but the embodiments of the present disclosure are not limited thereto.

For example, the thickness of the first optical layer 1517*a* may be smaller than the thickness of the second optical layer 1517*b*, but the embodiments of the present disclosure are not limited thereto. Accordingly, when viewed from a planar view, the area where the first optical layer 1517*a* is disposed may include a concave portion that is sunken inwardly from the upper surface of the second optical layer 1517*b*.

According to the embodiments of the present disclosure, a row line RL may be disposed on the first optical layer 1517*a* and the second optical layer 1517*b*. For example, the row line RL may be electrically connected to a plurality of row connection electrodes RCE through contact holes of the second optical layer 1517*b*. For example, the row line RL may be disposed on a plurality of light emitting devices ED. For example, the row line RL may include a transparent conductive oxide such as indium tin oxide (TTO) or indium zinc oxide (IZO), but the embodiments of the present disclosure are not limited thereto. For example, the row line RL may be arranged to be in contact with the second electrode Erl of the light emitting device ED. For example, the row line RL may overlap with the first optical layer 1517*a*. For example, the row line RL may cover a plane on the outside of the first optical layer 1517*a*.

The row line RL may extend continuously in the first direction (X) of the substrate 210. Accordingly, the row line RL may be commonly connected to a plurality of pixels arranged in the first direction (X) of the substrate 210. For example, the row line RL may be commonly connected to a plurality of pixels.

According to the embodiments of the present disclosure, the row line RL may be continuously extended on the first optical layer 1517*a*, the second optical layer 1517*b*, and the light emitting device ED. The area where the first optical layer 1517*a* is disposed may include a concave portion that is sunken inwardly from the upper surface of the second optical layer 1517*b*. Accordingly, the first part of the row line RL disposed on the first optical layer 1517*a* may be disposed along the concave portion, and thus may be disposed at a lower position than the second part of the row line RL disposed on the second optical layer 1517*b*.

A third optical layer 1517*c* may be disposed on the row line RL. The third optical layer 1517*c* may be disposed so as to overlap with a plurality of light emitting devices ED and the first optical layer 1517*a*. Since the third optical layer 1517*c* is arranged on the row line RL and the plurality of light emitting devices ED, it is possible to improve a mura that may occur in some of the plurality of light emitting devices ED. For example, when transferring a plurality of light emitting devices ED onto the substrate 210 of the display panel 110, there may occur an area where the spacing between the plurality of light emitting devices ED is not uniform due to process deviation. If the spacing between the plurality of light emitting devices ED is not uniform, emission areas of each of the plurality of light emitting devices ED may be arranged unevenly, and thus a mura may be visible to the user. Accordingly, since the third optical layer 1517*c* is arranged to uniformly diffuse light over the plurality of light emitting devices ED, it is possible to reduce light emitted from some of the light emitting devices ED from being visible as a mura. Accordingly, since the light emitted from the plurality of light emitting devices EDs is evenly diffused by the third optical layer 1517*c* and extracted to the outside of the display device 100, the luminance uniformity of the display device 100 can be improved.

The third optical layer 1517*c* may be composed of an organic insulating material in which fine particles are dispersed, but the embodiments of the present disclosure are not limited thereto. For example, the third optical layer 1517*c* may be composed of siloxane in which fine metal particles such as titanium dioxide (TiO2) particles are dispersed, but the embodiments of the present disclosure are not limited thereto. For example, the third optical layer 1517*c* may be composed of the same material as the first optical layer 1517*a*, but the embodiments of the present disclosure are not limited thereto. For example, the third optical layer 1517*c* may be a diffusion layer or an upper diffusion layer, but the embodiments of the present disclosure are not limited thereto.

According to the embodiments of the present disclosure, light from a plurality of light emitting devices ED may be scattered by fine particles dispersed in a third optical layer 1517*c* and emitted to the outside of the display device 100. The third optical layer 1517*c* may evenly mix light emitted from a plurality of light emitting devices ED, thereby further improving the luminance uniformity of the display device 100. In addition, the light extraction efficiency of the display device 100 may be improved by the light scattered from the plurality of fine particles, thereby enabling the display device 100 to be driven at low power.

A black matrix BM may be arranged on the row line RL, the first optical layer 1517*a*, the second optical layer 1517*b*, and the third optical layer 1517*c* in the display area DA. For example, the black matrix BM may fill a contact hole of the second optical layer 1517*b*. The black matrix BM may be configured to cover the display area DA, so that the color mixing of light and external light reflection of the plurality of subpixels can be reduced. For example, the black matrix BM may also be arranged in the contact hole where the row line RL and the row connection electrode RCE are connected, so that light leakage between the neighboring plurality of subpixels can be prevented.

For example, the black matrix BM may be composed of an opaque material, but the embodiments of the present disclosure are not limited thereto. For example, the black matrix BM may be an organic insulating material to which a black pigment or a black dye is added, but the embodiments of the present disclosure are not limited thereto.

A cover layer 1518 may be arranged on the black matrix BM in the display area DA. The cover layer 1518 may protect a configuration under the cover layer 1518. For example, the cover layer 1518 may be composed of an organic insulating material, but the embodiments of the present disclosure are not limited thereto. For example, the cover layer 1518 may be composed of a photo resist, polyimide (PI), or photo acryl-based material, but the embodiments of the present disclosure are not limited thereto. For example, the cover layer 1518 may be an overcoating layer or an insulating layer, but the embodiments of the present disclosure are not limited thereto.

A polarizing layer 114 may be arranged on the cover layer 1518 via a first adhesive layer 112. A cover member 118 may be arranged on the polarizing layer 114 via a second adhesive layer 116. For example, the first adhesive layer 112 and the second adhesive layer 116 may include an optically clear adhesive (OCA), an optically clear resin (OCR), or a pressure sensitive adhesive (PSA), but the embodiments of the present disclosure are not limited thereto.

According to embodiments of the present disclosure, a plurality of pads PD may be arranged on a third insulating layer 1515*c* in a second non-display area NDA2. For example, at least a portion of the plurality of pads PD may be exposed from a passivation layer 1516. For example, the plurality of pads PD may be electrically connected to a fourth pad connection pattern PCP4 through a contact hole of the third insulating layer 1515*c*.

An adhesive layer ACF may be arranged on the plurality of pads PD. The adhesive layer ACF may be an adhesive layer in which conductive balls are dispersed in an insulating material, but embodiments of the present disclosure are not limited thereto. When heat or pressure is applied to the adhesive layer ACF, the conductive balls may be electrically connected at a portion where the heat or pressure is applied, thereby having conductive properties. The adhesive layer ACF may be disposed between a plurality of pads PD and a flexible printed circuit 102, so that the flexible printed circuit 102 may be attached or bonded to the plurality of pads PD. For example, the adhesive layer ACF may be an anisotropic conductive film ACF, but the embodiments of the present disclosure are not limited thereto.

A flexible printed circuit 102 may be disposed on the adhesive layer ACF. The flexible printed circuit 102 may be electrically connected to the plurality of pads PD through the adhesive layer ACF. Accordingly, a signal supplied from the flexible printed circuit 102 may be transmitted to a driver DRV of a display area DA through the plurality of pads PD, the fourth pad connection pattern PCP4, the third pad connection pattern PCP3, the second pad connection pattern PCP2, and the first pad connection pattern PCP1.

Referring to FIG. 15, the display panel 110 according to the embodiments of the present disclosure may include a substrate 210, a layer stack 1410 on a plurality of drivers DRV disposed on the substrate 210, an optical layer 1517*a* disposed between a plurality of light emitting devices EDa, EDb and EDc on the layer stack 1410, an adhesive layer 116 disposed on the plurality of light emitting devices EDa, EDb and EDc and the optical layer 1517*a*, and a cover member 118 disposed on the adhesive layer 116.

Referring to FIG. 15, a plurality of column lines CL may be disposed between the layer stack 1410 and the plurality of light emitting devices EDa, EDb and EDc.

Referring to FIG. 15, a plurality of row lines RL may be arranged on a plurality of light emitting devices EDa, EDb and EDc and an optical layer 1517*a*. A plurality of row lines RL may be arranged between a plurality of light emitting devices EDa, EDb and EDc, an optical layer 1517*a*, and an adhesive layer 116.

Referring to FIG. 15, a layer stack 1410 may include a plurality of protection layers 1513*a*, 1513*b* and 1514 arranged on the side and upper surface of each of a plurality of drivers DRV, a plurality of insulating layers 1515*a*, 1515*b* and 1515*c* arranged on the plurality of protection layers 1513*a*, 1513*b* and 1514, and a bank BNK arranged on the plurality of insulating layers.

The plurality of protection layers 1513*a*, 1513*b* and 1514 may further include a side protection layer 1513 disposed on each side of the plurality of drivers DRV and an upper protection layer 1514 disposed on the upper surface of each of the plurality of drivers DRV.

The side protection layer 1513 may include a first protection layer 1513*a* disposed on the substrate 210 and a second protection layer 1513*b* disposed on the first protection layer 1513*a*.

The upper protection layer 1514 may include a third protection layer 1514 disposed on a second protection layer 1513*b* and the plurality of drivers DRV.

The plurality of insulating layers 1515*a*, 1515*b* and 1515*c* may include a first insulating layer 515*a* disposed on the upper protection layer 1514, and a second insulating layer 1515*b* disposed on the first insulating layer 1515*a*. The plurality of insulating layers 1515*a*, 1515*b* and 1515*c* may further include a third insulating layer 1515*c* disposed on the second insulating layer 1515*b*.

Each of the plurality of light emitting devices EDa, EDb and EDc may be disposed on the bank BNK and positioned in an opening of the optical layer 1517*a*.

At least a portion of each of the plurality of column lines CL may extend onto the bank BNK on the plurality of insulating layers 1515*a*, 1515*b* and 1515*c*. Each of the plurality of row lines RL may be arranged on the optical layer 1517*a* and the plurality of light emitting devices EDa, EDb and EDc.

A first electrode Ecl of each of the plurality of light emitting devices EDa, EDb and EDc may be electrically connected to at least a portion of a column line CL extending onto the bank BNK among the plurality of column lines CL. A second electrode Erl of each of the plurality of light emitting devices EDa, EDb and EDc may be electrically connected to one of the plurality of row lines RL.

Referring to FIG. 15, the display panel 110 according to the embodiments of the present disclosure may include a plurality of line connection patterns LCPs that connect each of a plurality of lines including a plurality of row lines RL and a plurality of column lines CL to a plurality of drivers DRV.

The plurality of line connection patterns LCPs may include a first line connection pattern LCP1 disposed on a side protection layer 1513, a second line connection pattern LCP2 disposed on an upper protection layer 1514 and electrically connected to the first line connection pattern LCP1 through a hole in the upper protection layer 1514, a third line connection pattern LCP3 disposed on a first insulating layer 1515*a* and electrically connected to the second line connection pattern LCP2 through a hole in the first insulating layer 1515*a*, and a fourth line connection pattern LCP4 disposed on a second insulating layer 1515*b* and electrically connected to the third line connection pattern LCP3 through a hole in the second insulating layer 1515*b*.

The first line connection pattern LCP1 may be electrically connected to one of the plurality of drivers DRV. The fourth line connection pattern LCP4 may be electrically connected to at least one second electrode Erl of the plurality of light emitting devices EDa, EDb and EDc, or may be electrically connected to at least one first electrode Ecl of the plurality of light emitting devices EDa, EDb and EDc.

The side protection layer 1513 arranged on each side of the plurality of drivers DRV may include two or more organic layers.

The first and second protection layers 1513*a* and 1513*b* as the side protection layer 1513, the third protection layer 1514 as the upper protection layer 1514, and the first to third insulating layers 1515*a*, 1515*b* and 1515*c* may each be composed of organic layers.

In the above, there have been described the structure and operation related to the display function of the display device 100 according to the embodiments of the present disclosure.

The display device 100 according to the embodiments of the present disclosure may provide not only a display function but also a touch sensing function. Accordingly, hereinafter, it will be described a structure and an operation related to the touch sensing function of the display device 100 according to the embodiments of the present disclosure.

Figure 17:
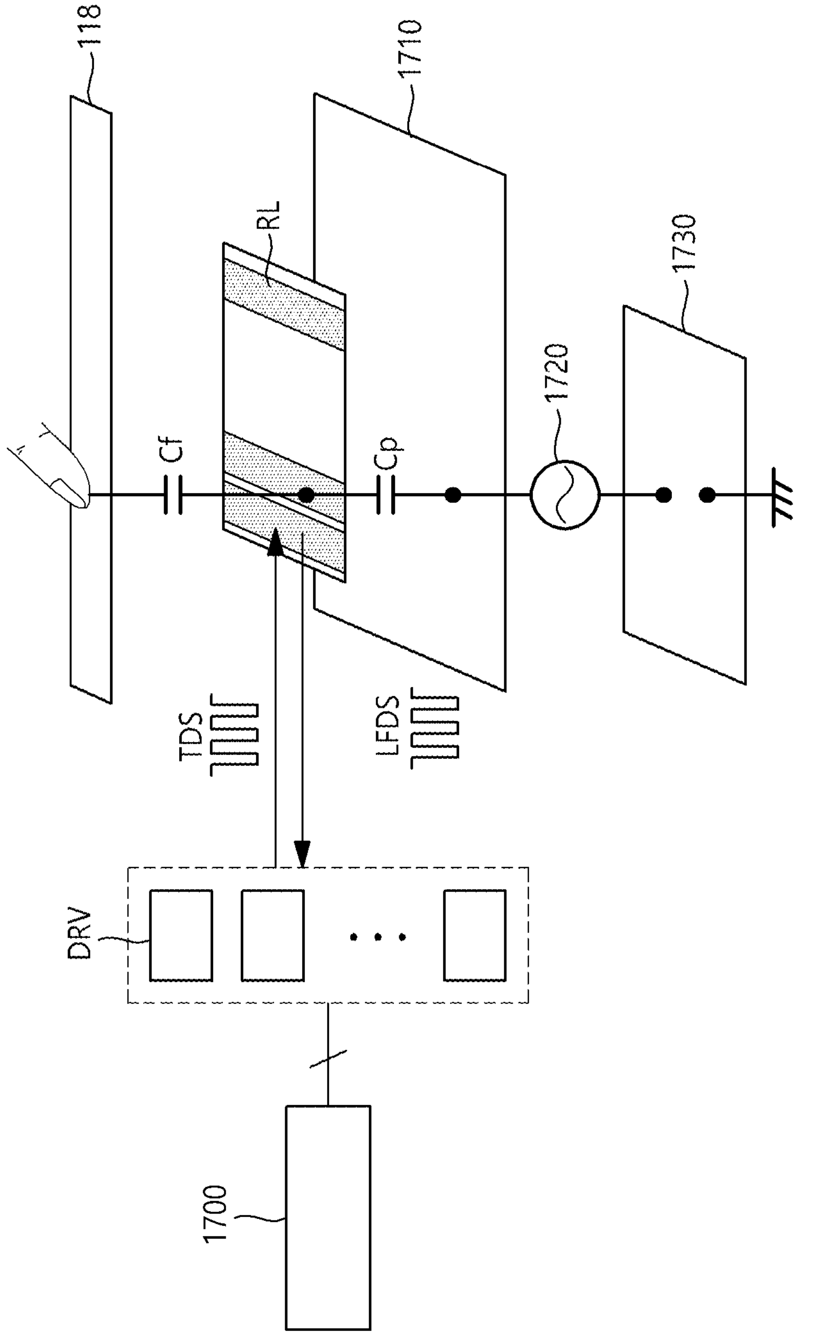
FIG. 17 illustrates a touch sensing structure of a display device according to embodiments of the present disclosure.

FIG. 17 is a diagram illustrating the touch sensing structure of the display device 100 according to the embodiments of the present disclosure.

Referring to FIG. 17, the display device 100 according to the embodiments of the present disclosure may include a plurality of row lines RL that serve as touch sensors to perform touch sensing, a plurality of drivers DRV for driving and sensing the plurality of row lines RL, and a touch control circuit 1700 that controls the plurality of drivers DRV. The drivers DRV and the touch control circuit 1700 may be included in a driving circuit.

The plurality of drivers DRV may supply a touch driving signal TDS having a variable voltage level to at least one of the plurality of row lines RL. The touch driving signal TDS is a signal whose voltage level fluctuates and may also be referred to as an AC signal or a pulse signal. For example, the touch driving signal TDS may have a signal waveform such as a square wave, a sine wave, or a triangular wave. For example, the frequency of the touch driving signal TDS may be constant. In another example, the frequency of the touch driving signal TDS may be variable. If the frequency of the touch driving signal TDS is variable according to the touch driving period T or time, it is possible to prevent the touch sensitivity degradation due to noise generated during the touch driving.

A plurality of drivers DRV may sense or detect an electrical state (e.g., a capacitance change) in at least one of a plurality of row lines RL to generate sensing data and output the generated sensing data. Here, the sensing data may include digital sensing values.

The plurality of drivers DRV may include at least one analog-to-digital converter ADC to sense an electrical state in at least one of the plurality of row lines RL to obtain digital sensing values.

For example, the electrical state in at least one of the plurality of row lines RL may include a capacitance Cf between a touch object such as a finger or a pen and each row line RL. In another example, the electrical state in at least one of the plurality of row lines RL may include a capacitance between two row lines RL.

The touch control circuit 1700 may supply a touch driving signal TDS or a signal as a base of the touch driving signal TDS to each of the plurality of drivers DRV and determine an occurrence of a touch or a touch position based on sensing data provided from each of the plurality of drivers DRV. For example, the touch control circuit 1700 may include a timing controller or a micro-control unit. The touch control circuit 1700 may further include a power management integrated circuit PMIC, etc.

The display device 100 according to the embodiments of the present disclosure may perform self-capacitance-based touch sensing and/or mutual-capacitance-based touch sensing.

Referring to FIG. 17, if a touch driving signal TDS is applied to at least one of a plurality of row lines RL for touch sensing, an unwanted parasitic capacitance Cp may be formed between the row line RL supplied with the touch driving signal TDS and other electrodes or other wirings around the corresponding row line RL. The parasitic capacitance Cp may be a factor causing a reduction of the touch sensitivity.

Referring to FIG. 17, the display device 100 according to the embodiments of the present disclosure may further include a touch ground 1710 arranged below the plurality of row lines RL. The touch ground 1710 may correspond to an electrode that forms a parasitic capacitance Cp with the row line RL.

Referring to FIG. 17, the display device 100 according to the embodiments of the present disclosure may further include a guard driver 1720 that supplies a load free driving signal LFDS whose signal characteristics correspond to the touch driving signal TDS to the touch ground 1710 in order to prevent an unwanted parasitic capacitance Cp from being formed between the row line RL and the touch ground 1710.

The load free driving signal LFDS output from the guard driver 1720 and applied to the touch ground 1710 may be a signal whose signal characteristics are similar to the touch driving signal TDS output from the driver DRV and supplied to the row line RL. For example, the signal characteristics may include frequency, amplitude, and phase.

For example, the load free driving signal LFDS may have the same frequency as the touch driving signal TDS. The load free driving signal LFDS may have the same amplitude as the touch driving signal TDS. The load free driving signal LFDS may have the same phase as the touch driving signal TDS.

Referring to FIG. 17, the display device 100 according to the embodiments of the present disclosure may further include a system ground 1730 that serves as a ground for the entire system.

Hereinafter, it will be described the touch sensing system and touch sensing operation of the display device 100 according to the embodiments of the present disclosure in more detail.

Figure 18:
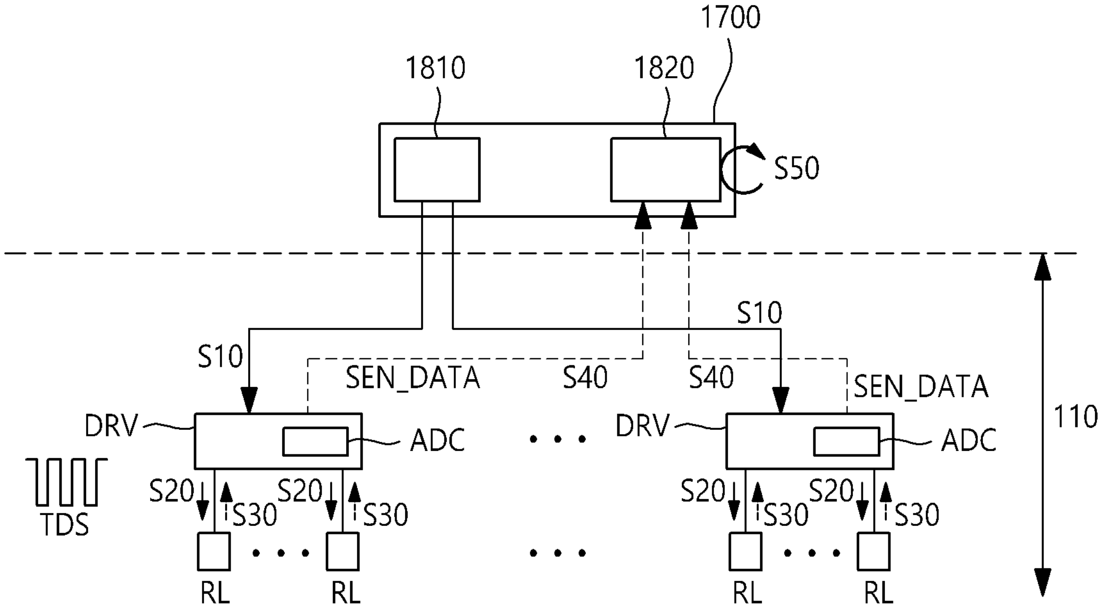
FIG. 18 illustrates a touch sensing system of a display device according to embodiments of the present disclosure.

FIG. 18 illustrates the touch sensing system of the display device 100 according to the embodiments of the present disclosure.

Referring to FIG. 18, the display device 100 according to the embodiments of the present disclosure may include a plurality of row lines RL corresponding to touch sensors, a plurality of drivers DRV for driving and sensing the plurality of row lines RL, and a touch control circuit 1700 for controlling the plurality of drivers DRV.

Referring to FIG. 18, the touch control circuit 1700 may include a signal supply circuit 1810 that supplies a touch driving signal TDS to at least one of the plurality of drivers DRV, and a touch sensing circuit 1820 that receives sensing data SEN_DATA from at least one of the plurality of drivers DRV to determine an occurrence of a touch and/or a touch position (e.g., touch coordinates).

Referring to FIG. 18, each of the plurality of drivers DRV may include an analog-to-digital converter ADC that converts a signal (e.g., analog signal) sensed through at least one row line RL of the plurality of row lines RL into a digital sensing value. In this way, since the analog-to-digital converter ADC exists in the display panel 110, a digital sensing value corresponding to a digital signal may exist among various signals existing in the display panel 110. That is, the display panel 110 may be a unique panel in which an analog domain in which an analog signal exists and a digital domain in which a digital signal exists coexist.

Referring to FIG. 18, the signal supply circuit 1810 of the touch control circuit 1700 may supply a touch driving signal TDS or a signal that is the basis of the touch driving signal TDS to each of the plurality of drivers DRV (step S10).

Referring to FIG. 18, each of the plurality of drivers DRV may receive a touch driving signal TDS or a signal that is the basis of the touch driving signal TDS from the signal supply circuit 1810 of the touch control circuit 1700 (step S10), and output the touch driving signal TDS to at least one of two or more row lines RL arranged in the corresponding unit driving area UDA (step S20).

Each of the plurality of drivers DRV may supply a touch driving signal TDS to all or part of two or more row lines RL included in a corresponding unit driving area UDA (step S20).

Referring to FIG. 18, each of the plurality of drivers DRV may sense at least one of two or more row lines RL arranged in the corresponding unit driving area UDA (step S30). Each of the plurality of drivers DRV may sense at least one of the two or more row lines RL, convert a sensing signal obtained according to the sensing result into a digital sensing value, and generate sensing data SEN_DATA including the converted digital sensing values.

Referring to FIG. 18, each of the plurality of drivers DRV may provide sensing data SEN_DATA to a touch sensing circuit 1820 of a touch control circuit 1700 (step S40).

Referring to FIG. 18, the touch control circuit 1700 may determine whether a touch has occurred or a touch position based on sensing data SEN_DATA provided from each of the plurality of drivers DRV (step S50).

Figure 19:
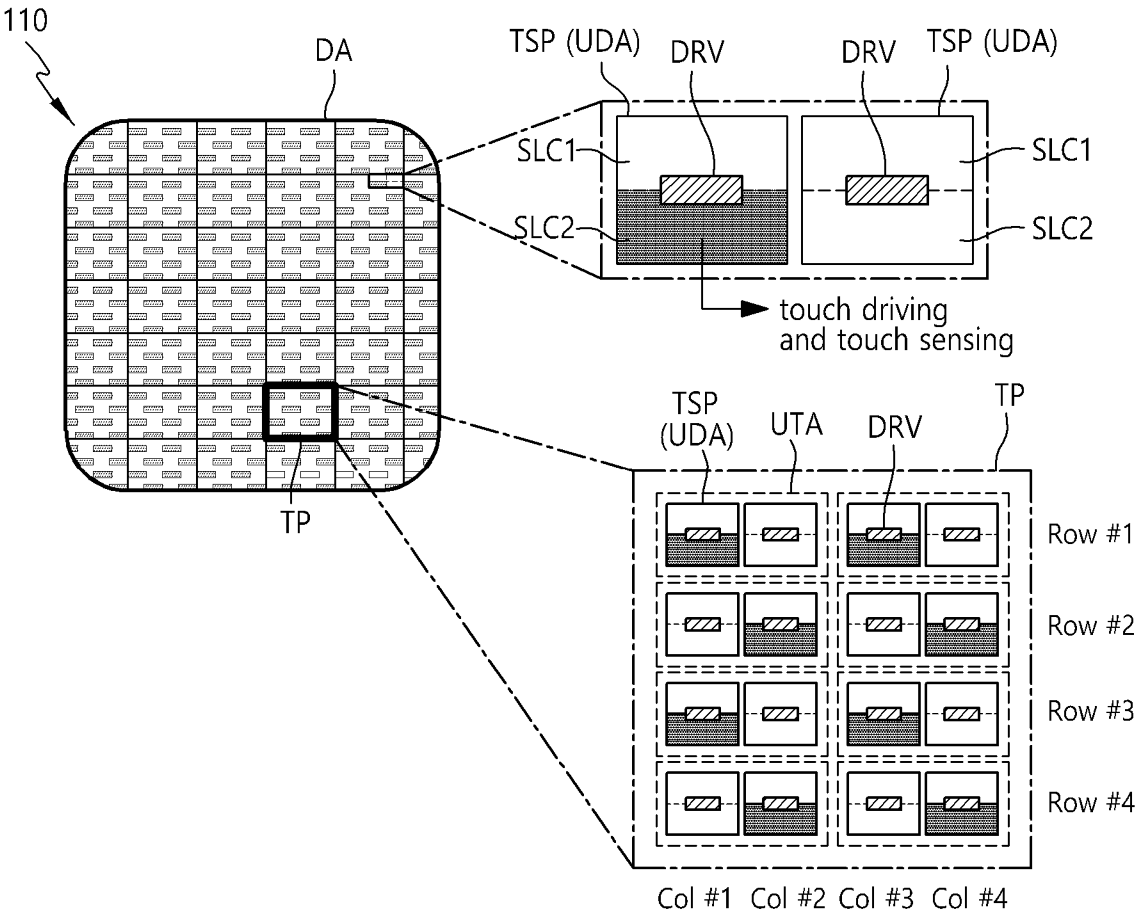
FIG. 19 illustrates a touch driving structure of a display panel according to embodiments of the present disclosure.

FIG. 19 illustrates a touch driving structure of a display panel 110 according to embodiments of the present disclosure. FIG. 4, FIG. 6, and FIG. 11 may also be referred to in the following description.

Referring to FIG. 19, the display area DA of the display panel 110 may include a plurality of touch pixel areas TP. Each of the plurality of touch pixel areas TP may be an area corresponding to one touch electrode TE (see FIG. 20).

A plurality of row lines RL arranged in one touch pixel area TP corresponding to one touch electrode and simultaneously performing touch driving may be processed as one touch electrode TE in the touch control circuit 1700 even if they are driven and sensed by a plurality of drivers DRV. That is, a plurality of row lines RL arranged in one touch pixel area TP and simultaneously performing touch driving may be recognized as one touch electrode TE electrically connected to each other.

The touch control circuit 1700 may determine an occurrence of the touch and/or a touch coordinate by considering the combined sensing data SEN_DATA obtained from each of the plurality of row lines RL arranged in one touch pixel area TP and simultaneously performing touch driving as sensing data obtained from one touch electrode TE.

Referring to FIG. 19, each of the plurality of touch pixel areas TP may include a plurality of touch subpixel areas TSP. According to the example of FIG. 19, each of the plurality of touch pixel areas TP may include 16 touch subpixel areas TSP. The 16 touch subpixel areas TSP may be arranged in 4 rows and 4 columns.

Referring to FIG. 19, each of the plurality of touch subpixel areas TSP may include one of the plurality of drivers DRV. That is, one driver DRV may be arranged in one touch subpixel area TSP. One touch subpixel area TSP may correspond to one unit driving area UDA.

Each of the plurality of touch subpixel areas TSP may include two or more row lines RL and two or more column lines CL. Each of the plurality of touch subpixel areas TSP may include two or more subpixels SP. Each of the plurality of touch subpixel areas TSP may include two or more light emitting devices ED.

Referring to FIG. 19, each of the plurality of touch pixel areas TP may include two or more unit touch driving areas UTA. Each of the two or more unit touch driving areas UTA may include at least one touch subpixel area TSP. According to the example of FIG. 19, each of the two or more unit touch driving areas UTA may include two touch subpixel areas TSP. Here, the unit touch driving area UTA is an area that becomes a basic unit of a touch driving pattern.

Referring to FIG. 19, one touch subpixel area TSP corresponding to one unit driving area UDA may include two sub-touch driving areas SLC1 and SLC2. The two sub-touch driving areas may include a first sub-touch driving area SLC1 and a second sub-touch driving area SLC2. For example, the first sub-touch driving area SLC1 may correspond to an upper area in one touch subpixel area TSP, and the second sub-touch driving area SLC2 may correspond to a lower area in one touch subpixel area TSP. However, embodiments of the present disclosure are not limited thereto.

Two or more row lines RL and two or more column lines CL may be arranged in each of the first sub-touch driving area SLC1 and the second sub-touch driving area SLC2. Each of the first sub-touch driving area SLC1 and the second sub-touch driving area SLC2 may include two or more light emitting devices ED.

Two or more row lines RL arranged in the first sub-touch driving area SLC1 and two or more row lines RL arranged in the second sub-touch driving area SLC2 may not be connected to each other, and may be arranged separately from each other. Two or more column lines CL arranged in the first sub-touch driving area SLC1 and two or more column lines CL arranged in the second sub-touch driving area SLC2 may not be connected to each other, and may be arranged separately from each other.

The two sub-touch driving areas SLC1 and SLC2 may correspond to the two sub-driving areas SDA1 and SDA2 included in one unit driving area UDA in FIG. 4, FIG. 6, and FIG. 11, respectively.

Referring to FIG. 19, one unit touch driving area UTA may include two touch subpixel areas TSP. One unit touch driving area UTA may include two sub-touch driving areas SLC1 and SLC2 included in each of two touch subpixel areas TSP. That is, one unit touch driving area UTA may include four sub-touch driving areas. One unit touch driving area UTA may include two drivers DRV.

For example, a touch pixel area TP may include 16 touch subpixel areas TSP arranged in four rows and four columns. Each of the 16 touch subpixel areas TSP may include one driver DRV and two sub-touch driving areas SLC1 and SLC2.

As an example, during a touch driving period for touch sensing, all four sub-touch driving areas included in one unit touch driving area UTA may be driven and sensed. Accordingly, during a touch driving period for touch sensing, each of the two drivers DRV included in one unit touch driving area UTA may drive and sense all two sub-touch driving areas SLC1 and SLC2 included in the corresponding touch subpixel area TSP.

As another example, during a touch driving period for touch sensing, only some of the four sub-touch driving areas included in one unit touch driving area UTA may be driven and sensed. According to the example of FIG. 19, during the touch driving period for touch sensing, only one sub-touch driving area among four sub-touch driving areas included in one unit touch driving area UTA may be driven and sensed. Accordingly, during the touch driving period for touch sensing, only one driver DRV among two drivers DRV included in one unit touch driving area UTA may drive and sense one of two sub-touch driving areas SLC1 and SLC2 included in the corresponding touch subpixel area TSP.

According to the embodiments of the present disclosure, the fact that the sub-touch driving area is driven and sensed may mean that two or more row lines RL arranged in the sub-touch driving area are driven (i.e., touch driven) and sensed.

The fact that two or more row lines RL arranged in the sub-touch driving area are driven (i.e., touch driven) may mean that a touch driving signal TDS having a variable voltage level is applied to two or more row lines RL arranged in the sub-touch driving area.

Referring to FIG. 19, in the touch pixel area TP, the sub-touch driving area where touch driving and touch sensing are performed may be arranged in a zigzag shape.

For example, if a touch pixel area TP includes 16 touch subpixel areas TSP arranged in four rows and four columns, in each of the first touch subpixel row Row #1 and the third touch subpixel row Row #3, the second sub-touch driving area SLC2 among the two sub-touch driving areas SLC1 and SLC2 included in the touch subpixel area TSP located in the first column Col #1 may be driven and sensed, the two sub-touch driving areas SLC1 and SLC2 included in the touch subpixel area TSP located in the second column Col #2 may be not driven and sensed. In addition, the second sub-touch driving area SLC2 among the two sub-touch driving areas SLC1 and SLC2 included in the touch subpixel area TSP located in the third column Col #3 may be driven and sensed, and the two sub-touch driving areas SLC1 and SLC2 included in the touch subpixel area TSP located in the fourth column Col #4 may not be driven and sensed.

In the second touch subpixel row Row #2 and the fourth touch subpixel row Row #4, the two sub-touch driving areas SLC1 and SLC2 included in the touch subpixel area TSP located in the first column Col #1 may not be driven and sensed, and the second sub-touch driving area SLC2 among the two sub-touch driving areas SLC1 and SLC2 included in the touch subpixel area TSP located in the second column Col #2 may be driven and sensed. In addition, the two sub-touch driving areas SLC1 and SLC2 included in the touch subpixel area TSP located in the third column Col #3 may not be driven and sensed, and the second sub-touch driving area SLC2 among the two sub-touch driving areas SLC1 and SLC2 included in the touch subpixel area TSP located in the fourth column Col #4 may be driven and sensed.

Referring to FIG. 19, one touch pixel area TP includes a plurality of touch subpixel areas TSP, and each of the plurality of touch subpixel areas TSP may include two or more row lines RL and two or more column lines CL. Each of the plurality of touch subpixel areas TSP may include two or more light emitting devices ED.

Referring to FIG. 19, one touch pixel area TP includes a plurality of touch subpixel areas TSP, and each of the plurality of touch subpixel areas TSP may include two sub-touch driving areas SLC1 and SLC2. Each of the two sub-touch driving areas SLC1 and SLC2 may include two or more row lines RL and two or more column lines CL. Each of the two sub-touch driving areas SLC1 and SLC2 may include two or more light emitting devices ED.

The touch subpixel area TSP will be exemplified by using the (2n×m) pixel array structure of FIG. 4.

One touch subpixel area TSP may be a unit driving area UDA driven by one of the plurality of drivers DRV.

Each of the plurality of pixels P may include k light emitting devices ED among the plurality of light emitting devices ED, and k may be a natural number greater than or equal to 2.

Each of the plurality of touch subpixel areas TSP may include (2n×m) pixels P arranged in 2n rows and m columns among the plurality of pixels P, 2n row lines RL among the plurality of row lines RL, and (m×k) column lines CL or (m×k×2) column lines CL among the plurality of column lines CL.

Each of the 2n row lines RL may correspond to m pixels P arranged in the same row among the (2n×m) pixels P. The (2n×m) pixels P may include (2n×m×k) light emitting devices ED. The n may be a natural number greater than or equal to 1, and the m may be a natural number greater than or equal to 1.

Each of the plurality of touch subpixel areas TSP may be divided into a first sub-touch driving area SLC1 and a second sub-touch driving area SLC2, which correspond to two sub-driving areas SDA1 and SDA2.

Each of the first sub-touch driving area SLC1 and the second sub-touch driving area SLC2 may include (n×m) pixels P arranged in n rows and m columns among (2n×m) pixels P, n row lines RL among 2n row lines RL, and (m×k) column lines CL among (m×k×2) column lines CL.

One row line RL among the n row lines RL may be shared by m pixels P arranged in one row among the (n×m) pixels P. The k column lines CL among the (m×k) column lines CL may be shared by n pixels P arranged in the same column among the (n×m) pixels P.

Each of the first sub-touch driving area SLC1 and the second sub-touch driving area SLC2 may include (n×m×k) light emitting devices ED. Among the (n×m×k) light emitting devices ED, the first electrodes Ecl of the n light emitting devices ED arranged in the same column may be electrically connected in common with one of the (m×k) column lines CL. Among the (n×m×k) light emitting devices ED, the second electrodes Erl of the (m×k) light emitting devices ED arranged in the same row may be electrically connected in common with one of the n row lines RL.

Among the plurality of touch subpixel areas TSP, two adjacent touch subpixel areas TSP may be combined to define one unit touch driving area UTA.

Among the plurality of touch subpixel areas TSPs, two adjacent touch subpixel areas TSP may include four sub-touch driving areas.

For example, during the touch driving period, a touch driving signal TDS may be supplied to all four sub-touch driving areas. That is, during the touch driving period, all four sub-touch driving areas may be driven and sensed.

In another example, during the touch driving period, a touch driving signal TDS may be supplied to only one to three sub-touch driving areas among the four sub-touch driving areas. That is, during the touch driving period, one to three sub-touch driving areas among the four sub-touch driving areas may be driven and sensed.

Hereinafter, it will be described a planar structure of the touch pixel area TP with reference to FIG. 20, and it will be described display driving and touch driving for the touch pixel area TP with reference to FIG. 21 and FIG. 22.

Figure 20:
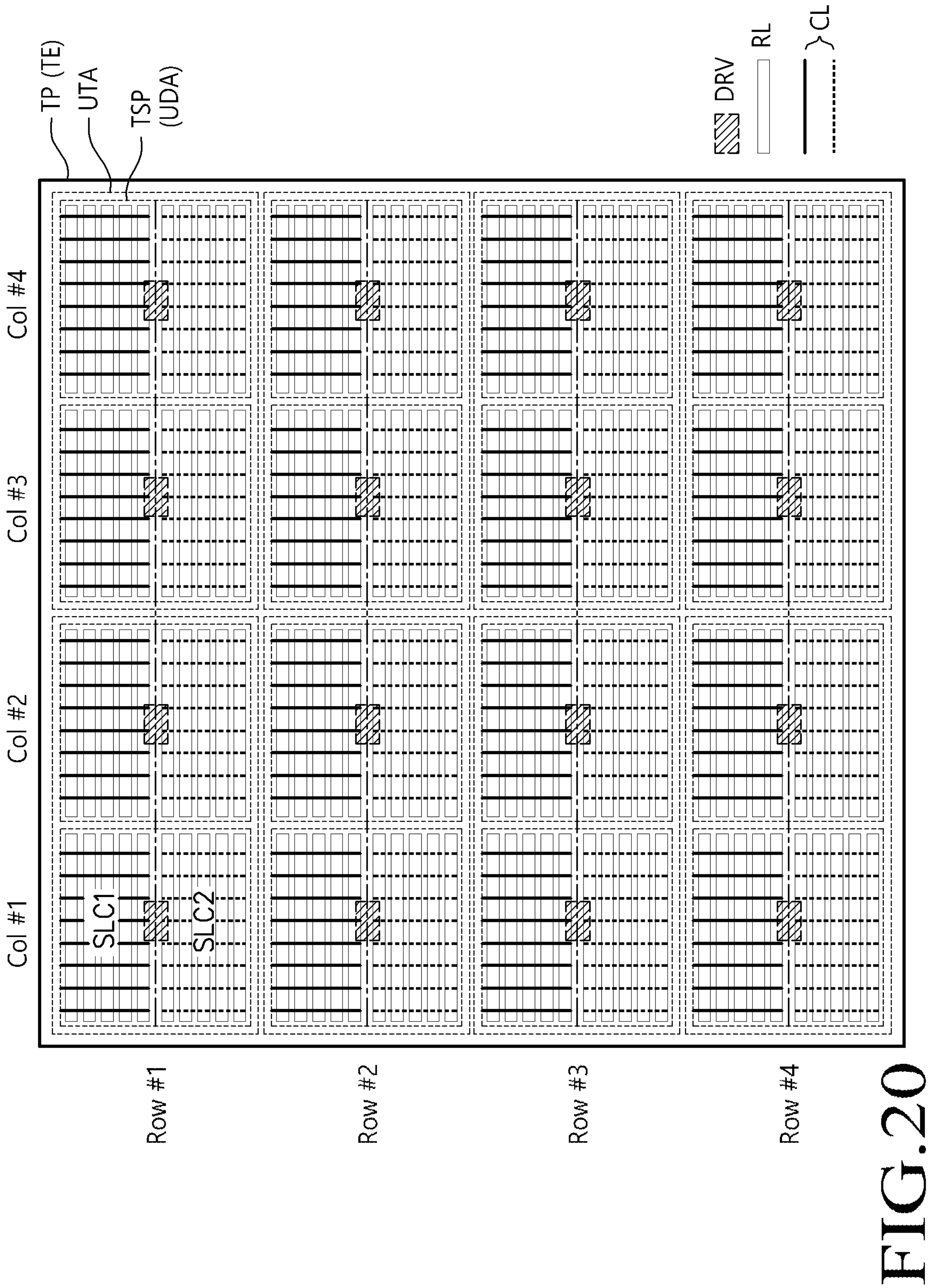
FIG. 20 is a plan view of a touch pixel area of a display panel according to embodiments of the present disclosure.

FIG. 20 is a plan view of one touch pixel area TP of a display panel 110 according to embodiments of the present disclosure.

Referring to FIG. 20, one touch pixel area TP may be an area of one touch electrode TE. At least one row line RL among a plurality of row lines RL arranged in one touch pixel area TP may constitute one touch electrode TE.

The touch pixel area TP may include a plurality of touch subpixel areas TSP arranged in a matrix form. For example, the touch pixel area TP may include 16 touch subpixel areas TSP arranged in four rows Row #1 to Row #4 and four columns Col #1 to Col #4.

Each of the 16 touch subpixel areas TSP may be a unit driving area UDA and may include one driver DRV as a driving circuit.

Each of the 16 touch subpixel areas TSP may include a plurality of row lines RL and a plurality of column lines CL. The plurality of row lines RL and the plurality of column lines CL may overlap and intersect with each other. The plurality of row lines RL and the plurality of column lines CL may be arranged in different metal layers.

In each of the 16 touch subpixel areas TSP, a plurality of row lines RL and a plurality of column lines CL may be driven by the same driver DRV.

Each of the 16 touch subpixel areas TSP may include a first sub-touch driving area SLC1 and a second sub-touch driving area SLC2. Each of the first sub-touch driving area SLC1 and the second sub-touch driving area SLC2 may include at least one row line RL and at least one column line CL.

Each of the 16 touch subpixel areas TSP may include a plurality of pixels P, each of the plurality of pixels P may include two or more subpixels SP, and each of the two or more subpixels SP may include at least one light emitting device ED.

The light emitting device ED may include a first electrode and a second electrode. The first electrode may be electrically connected to one column line CL, and the second electrode may be electrically connected to one row line RL.

Two adjacent touch subpixel areas TSP may constitute one unit touch driving area UTA.

Figure 21:
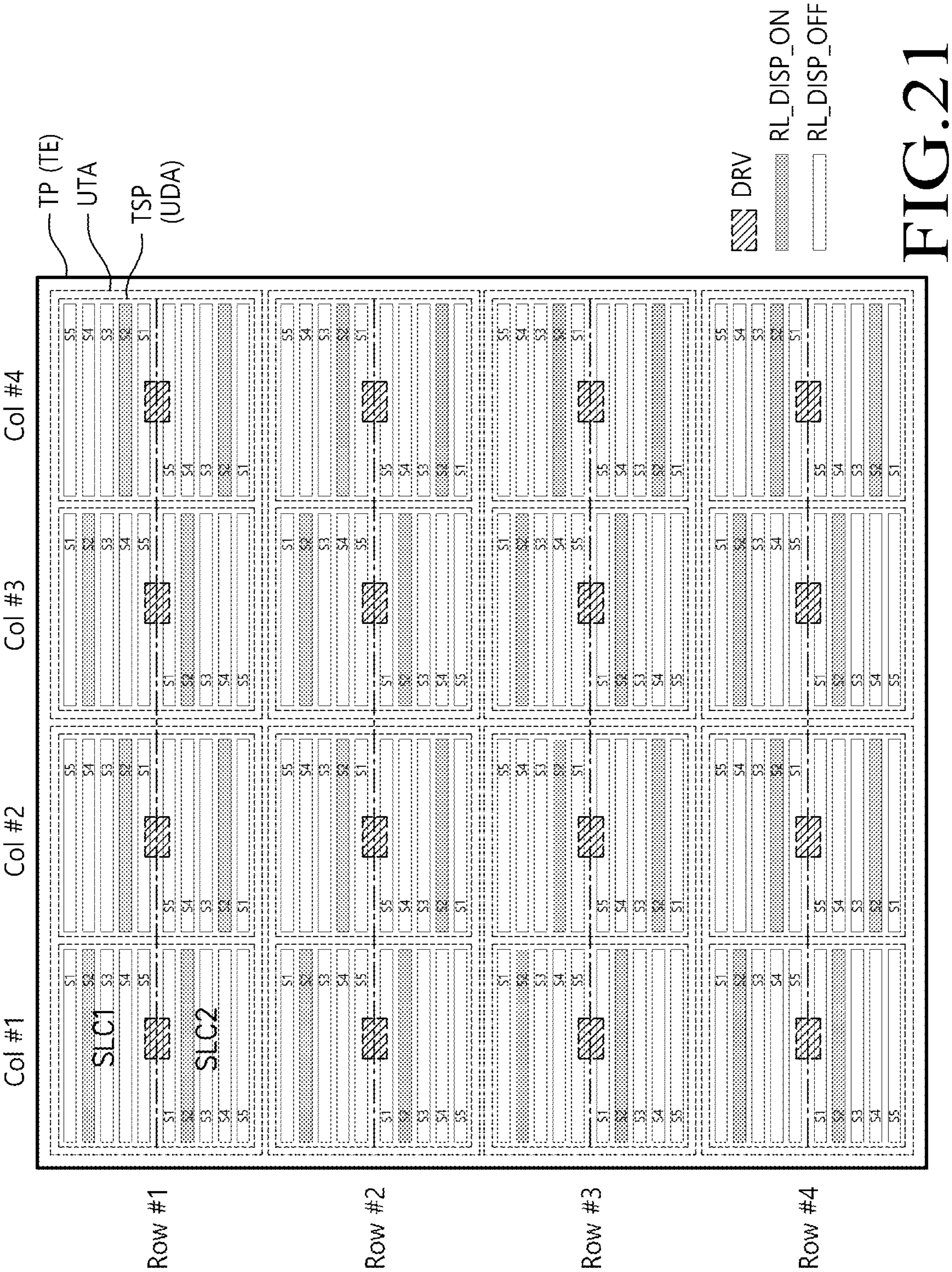
FIG. 21 illustrates a driving situation for one touch pixel area during a display driving period of a display device according to embodiments of the present disclosure.

FIG. 21 illustrates a display driving situation for one touch pixel area TP during a display driving period D of a display device 100 according to embodiments of the present disclosure.

Hereinafter, FIG. 20 is also referred to in the following description.

Referring to FIG. 21, during the display driving period D, a plurality of row lines RL may be classified into a display-on driving row line RL_DISP_ON in which display-on driving is performed and a display-off driving row line RL_DISP_OFF in which display-off driving is performed.

Referring to FIG. 21, a first low-potential voltage VSS1 may be applied to a display-on driving row line RL_DISP_ON, and a second low-potential voltage VSS2 may be applied to a display-off driving row line RL_DISP_OFF.

Referring to FIG. 21, when driving a display for a touch pixel area TP during a display driving period D, each of the 16 touch subpixel areas TSP included in the touch pixel area TP may be driven independently of each other.

Referring to FIG. 21, a first sub-touch driving area SLC1 and a second sub-touch driving area SLC2 included in each of the 16 touch subpixel areas TSP may be driven independently of each other. That is, in the 16 touch subpixel areas TSP, when the first sub-touch driving area SLC1 is driven, the second sub-touch driving area SLC2 may also be driven.

Referring to FIG. 21, in the 16 touch subpixel areas TSP, a plurality of row lines RL included in the first sub-touch driving area SLC1 may be driven sequentially, and a plurality of row lines RL included in the second sub-touch driving area SLC2 may be driven sequentially.

Referring to FIG. 21, the display driving method of each of the 8 touch subpixel areas TSP arranged in the odd columns Col #1 and Col #3 may be the same, and the display driving method of each of the 8 touch subpixel areas TSP arranged in the even columns Col #2 and Col #4 may be the same.

Referring to FIG. 21, the display driving method of each of the eight touch subpixel areas TSP arranged in odd columns Col #1 and Col #3 and the display driving method of each of the eight touch subpixel areas TSP arranged in even columns Col #2 and Col #4 may be different from each other.

Referring to FIG. 21, in each of the 8 touch subpixel areas TSP arranged in odd columns Col #1 and Col #3, a plurality of row lines RL arranged in the first sub-touch driving area SLC1 may be sequentially driven from top to bottom, and a plurality of row lines RL arranged in the second sub-touch driving area SLC2 may also be sequentially driven from top to bottom. In FIG. 21, S1 to S5 are indexes indicating the driving order, S1 is an index indicating the earliest driving order, and S5 is an index indicating the latest driving order.

Referring to FIG. 21, in each of the 8 touch subpixel areas TSP arranged in even columns Col #2 and Col #4, a plurality of row lines RL arranged in the first sub-touch driving area SLC1 may be sequentially driven from bottom to top, and a plurality of row lines RL arranged in the second sub-touch driving area SLC2 may also be sequentially driven from bottom to top.

For example, in the touch subpixel area TSP of the first row Row #1 in the first column Col #1, a plurality of row lines RL arranged in the first sub-touch driving area SLC1 may be sequentially driven from top to bottom, and a plurality of row lines RL arranged in the second sub-touch driving area SLC2 may also be sequentially driven from top to bottom.

In the second column Col #2, in the touch subpixel area TSP of the first row Row #1, a plurality of row lines RL arranged in the first sub-touch driving area SLC1 may be sequentially driven from the bottom to the top, and a plurality of row lines RL arranged in the second sub-touch driving area SLC2 may also be sequentially driven from the bottom to the top.

FIG. 21 illustrates a situation at a specific point in time (e.g., a point in time corresponding to S2) during the display driving period D.

Referring to FIG. 21, at a specific point in time (e.g., a point in time corresponding to S2) during the display driving period D, in each touch subpixel area TSP arranged in an odd column Col #1 and Col #3, among the five row lines RL arranged in each of the first sub-touch driving area SLC1 and the second sub-touch driving area SLC2, the second row line RL from the top may be a display-on driving row line RL_DISP_ON, and the remaining row lines RL may be display-off driving row lines RL_DISP_OFF.

Referring to FIG. 21, at a specific point in time (e.g., a point in time corresponding to S2) during the display driving period D, in each touch subpixel area TSP arranged in an even column Col #2 and Col #4, the second row line RL from the bottom among the five row lines RL arranged in each of the first sub-touch driving area SLC1 and the second sub-touch driving area SLC2 may be a display-on driving row line RL_DISP_ON, and the remaining row lines RL may be display-off driving row lines RL_DISP_OFF.

A first low-potential voltage VSS1 may be applied to the display-on driving row line RL_DISP_ON. Accordingly, the light emitting devices ED connected to the display-on driving row line RL_DISP_ON may emit light.

A second low-potential voltage VSS2 higher than the first low-potential voltage VSS1 may be applied to the display-off driving row line RL_DISP_OFF. Accordingly, the light emitting devices ED connected to the display-off driving row line RL_DISP_OFF may not emit light.

Figure 22:
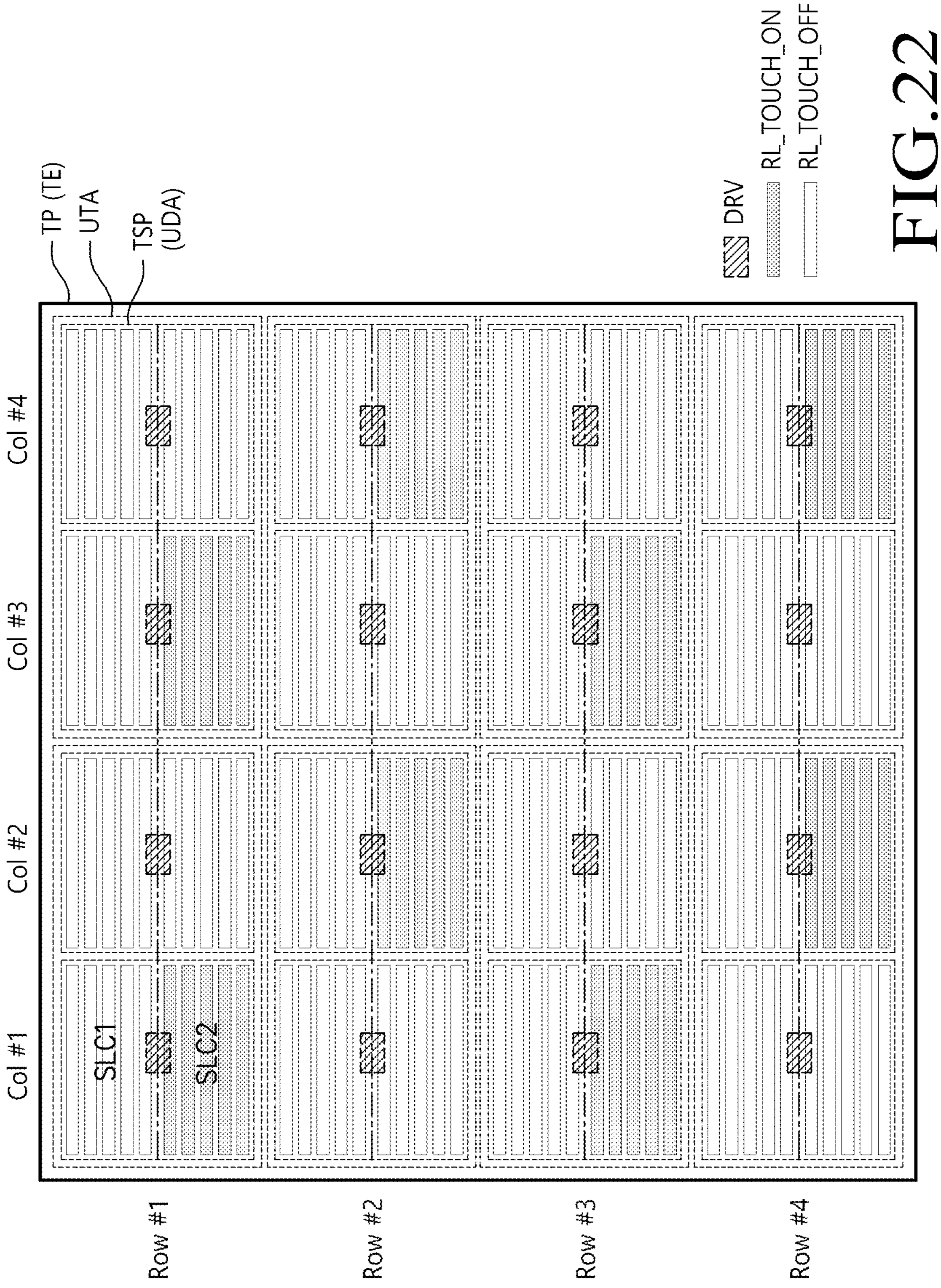
FIG. 22 illustrates a driving situation for one touch pixel area during a touch driving period of a display device according to embodiments of the present disclosure.

FIG. 22 illustrates a touch driving situation for one touch pixel area TP during a touch driving period T (see FIG. 23) of a display device 100 according to embodiments of the present disclosure.

Referring to FIG. 22, during the touch driving period T, a touch driving signal TDS is applied to the row line RL to drive the row line RL.

During the touch driving period T, a plurality of row lines RL may be classified into a touch driving row line RL_TOUCH_ON and a non-touch driving row line RL_TOUCH_OFF.

A touch driving signal TDS whose voltage level is variable may be applied to a touch driving row line RL_TOUCH_ON. The touch driving row line RL_TOUCH_ON may be sensed by a driver DRV.

A touch driving signal TDS may not be applied to a non-touch driving row line RL_TOUCH_OFF. In some cases, even if a touch driving signal TDS or a similar signal is applied to the non-touch driving row line RL_TOUCH_OFF, the non-touch driving row line RL_TOUCH_OFF may not be sensed by a driver DRV.

Hereinafter, it will be described a touch driving method for 16 touch subpixel areas TSP included in a touch pixel area TP during a touch driving period T.

As an example, during one touch driving period T, all 16 touch subpixel areas TSP included in a touch pixel area TP may be driven.

In this case, all or part of a plurality of row lines RL included in each of the 16 touch subpixel areas TSPs may be driven. For example, all or part of a plurality of row lines RL arranged in each of the first sub-touch driving area SLC1 and the second sub-touch driving area SLC2 included in each of the 16 touch subpixel areas TSP may be driven. In another example, all or part of the plurality of row lines RL arranged in one of the first sub-touch driving area SLC1 and the second sub-touch driving area SLC2 included in each of the 16 touch subpixel areas TSP may be driven.

As another example, during one touch driving period T, only at least one of the 16 touch subpixel areas TSPs included in the touch pixel area TP may be driven.

In this case, all or part of the plurality of row lines RL included in each of at least one of the 16 touch subpixel areas TSP may be driven. For example, all or part of the plurality of row lines RL arranged in each of the first sub-touch driving area SLC1 and the second sub-touch driving area SLC2 included in each of at least one of the 16 touch subpixel areas TSP may be driven. In another example, all or part of a plurality of row lines RL arranged in one of the first sub-touch driving area SLC1 and the second sub-touch driving area SLC2 included in at least one of the 16 touch subpixel areas TSP may be driven.

According to the example of FIG. 22, during one touch driving period T, among the four touch subpixel areas TSP arranged in each of the first row Row #1 and the second row Row #2, only the touch subpixel areas TSP arranged in the first column Col #1 and the third column Col #3 may be driven. In addition, in this case, among the four touch subpixel areas TSP arranged in each of the second row Row #2 and the fourth row Row #4, only the touch subpixel areas TSP arranged in the second column Col #2 and the fourth column Col #4 may be driven.

In each of the first row Row #1 and the second row Row #2, among the first sub-touch driving area SLC1 and the second sub-touch driving area SLC2 included in each of the touch subpixel areas TSP arranged in the first column Col #1 and the third column Col #3 where touch driving is performed, only the second sub-touch driving area SLC2 may be driven. If a touch driving signal TDS is applied to five row lines RL arranged in the second sub-touch driving area SLC2, which is the area where touch driving is performed, the second sub-touch driving area SLC2 may be driven.

In each of the second row Row #2 and the fourth row Row #4, among the first sub-touch driving area SLC1 and the second sub-touch driving area SLC2 included in each of the touch subpixel areas TSP arranged in the second column Col #2 and the fourth column Col #4 where touch driving is performed, only the second sub-touch driving area SLC2 may be driven. The second sub-touch driving area SLC2 may be driven by applying a touch driving signal TDS to five row lines RL arranged in the second sub-touch driving area SLC2, which is the area where touch driving is performed.

Hereinafter, it will be described a driving method of a display device 100 according to embodiments of the present disclosure in more detail.

Figure 23:
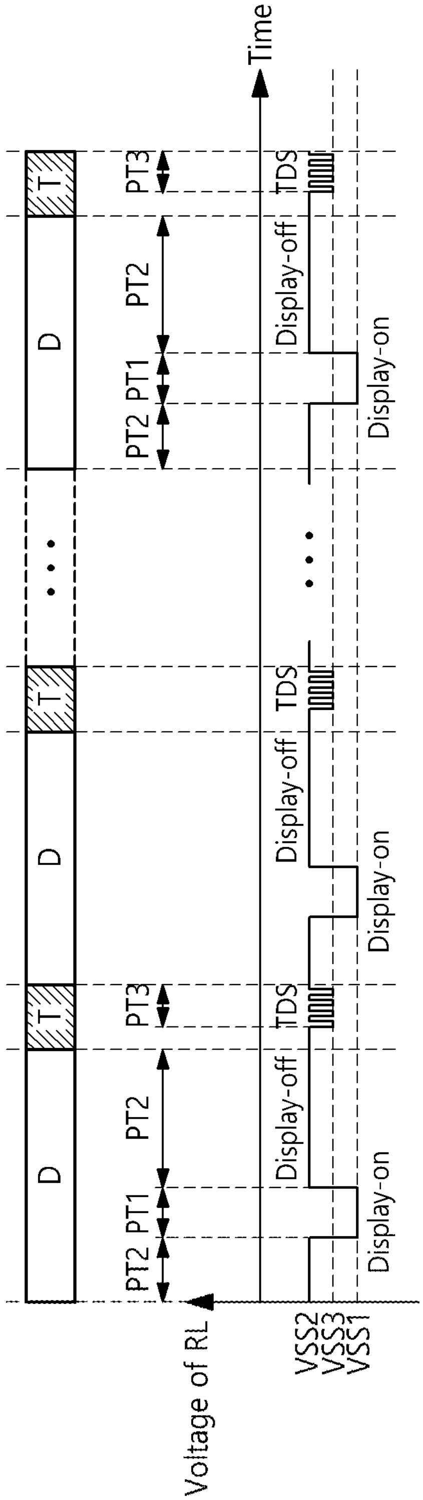
FIG. 23 and FIG. 24 are driving timing diagrams of a display device according to embodiments of the present disclosure.
Figure 24:
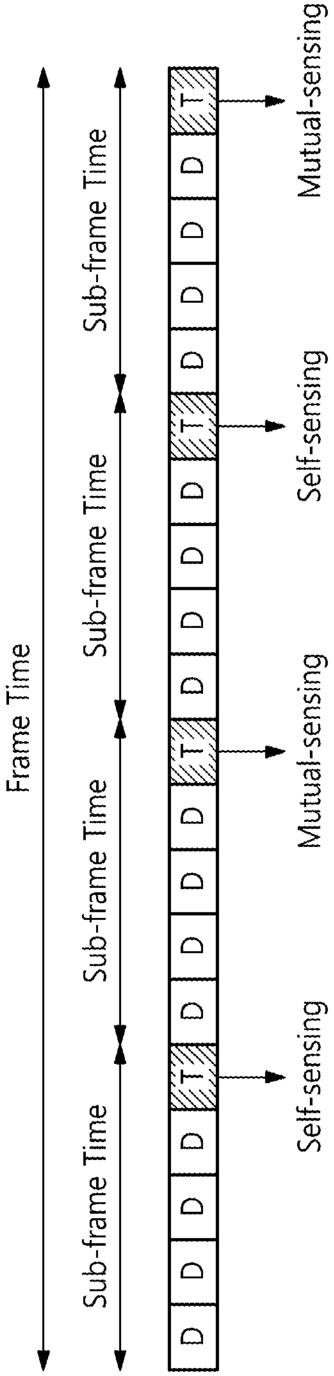

FIG. 23 and FIG. 24 are driving timing diagrams of a display device 100 according to embodiments of the present disclosure.

Referring to FIG. 23 and FIG. 24, the display device 100 according to the embodiments of the present disclosure may perform display driving for image display and touch driving (or touch sensing) for touch sensing.

The display device 100 according to the embodiments of the present disclosure may allocate a display driving period D and a touch driving period T, perform display driving during the display driving period D, and perform touch driving during the touch driving period T.

The display device 100 according to the embodiments of the present disclosure may perform display driving and touch driving according to a time-division driving method or a simultaneous driving method.

For example, the display device 100 according to the embodiments of the present disclosure may allocate the display driving period D and the touch driving period T as separate time periods according to the time-division driving method, and may perform display driving during the display driving period D and perform touch driving during the touch driving period T different from the display driving period D.

As another example, the display device 100 according to the embodiments of the present disclosure may perform display driving and touch driving simultaneously during the display driving period D and the touch driving period T that overlap in time according to the simultaneous driving method.

Hereinafter, for the convenience of explanation, the display device 100 according to the embodiments of the present disclosure performs display driving and touch driving at different time periods according to the time division driving method as an example. However, this is not limited thereto.

As an example of a time division driving method, as illustrated in FIG. 23, one display driving period D and one touch driving period T may alternately proceed. That is, one display driving period D may proceed, and then one touch driving period T may proceed.

As an example, one display driving period D may be a period during which display driving is performed to display an image on the entire screen. That is, the period that is the sum of one display driving period D and one touch driving period T may be a frame time. In this case, one display driving period D may correspond to an active time among the active time and a blank time included in one frame time, and one touch driving period T may correspond to a blank time among the active time and blank time included in one frame time.

As another example, two or more display driving periods D may be a period during which display driving is performed to display an image on the entire screen. That is, the time period that is the sum of two or more display driving periods D and two or more touch driving periods T may be a frame time. In this case, one frame time may include two or more sub-frame times. Each of the two or more sub-frame times may include a sub-active time and a sub-blank time. The time summing one display driving period D and one touch driving period T may be one sub-frame time among two or more sub-frame times included in one frame time. One display driving period D included in one sub-frame time may correspond to a sub-active time, and one touch driving period T may correspond to a sub-blank time.

As another example of the time division driving method, as illustrated in FIG. 24, a plurality of display driving periods D and one touch driving period T may alternately proceed. That is, a plurality of display driving periods D may proceed, and then one touch driving period T may proceed.

According to the example of FIG. 24, four display driving periods D may be performed, and then one touch driving period T may be performed. For example, the time summing four display driving periods D and one touch driving period T may correspond to one sub-frame time, and the time summing four sub-frame times may correspond to one frame time for displaying an image on the entire screen.

According to the example of FIG. 24, four touch driving periods T included in one frame time may include self-sensing-based touch driving periods T and mutual-sensing-based touch driving periods T that are alternately proceeded. For example, among the four touch driving periods T included in one frame time, the first and third touch driving periods T may be self-sensing-based touch driving periods T, and the second and fourth touch driving periods T may be mutual-sensing-based touch driving periods T.

Self-sensing-based touch driving may be a touch driving for determining the occurrence of the touch and/or a touch coordinate based on the capacitance (e.g., self-capacitance) between a plurality of row lines RL corresponding to a touch electrode TE and a touch object (e.g., a finger, a pen, etc.).

Mutual-sensing-based touch driving may be a touch driving for determining the occurrence of the touch and/or a touch coordinate based on the capacitance (e.g., mutual-capacitance) between a plurality of row lines RL corresponding to a touch electrode TE and a plurality of row lines RL corresponding to another touch electrode TE.

Referring to FIG. 23, a plurality of row lines RL may simultaneously perform the role of a cathode electrode (or an anode electrode) for display driving and the role of a touch sensor (e.g., touch electrode) for touch driving. Therefore, the electrical state of the row line RL during the display driving period D and the electrical state of the row line RL during the touch driving period T may be different.

Referring to FIG. 23, one row line RL among the plurality of row lines RL may be supplied with a first low-potential voltage VSS1 during a first period PT1 and may be supplied with a second low-potential voltage VSS2 during a second period PT2 different from the first period PT1.

Referring to FIG. 23, the first period PT1 and the second period PT2 may be periods included in one display driving period D or periods included in different display driving periods D.

The first low-potential voltage VSS1 and the second low-potential voltage VSS2 are a type of low-potential voltage VSS and may be a row line voltage applied to the row line RL. In addition, the first low-potential voltage VSS1 and the second low-potential voltage VSS2 may be a voltage (for example, a cathode voltage or an anode voltage) applied to the second electrode Erl of the light emitting devices ED connected to the row line RL.

Among the first low-potential voltage VSS1 and the second low-potential voltage VSS2, the first low-potential voltage VSS1 may be a low-potential voltage for driving the display-on, and the second low-potential voltage VSS2 may be a low-potential voltage for driving the display-off.

The first low-potential voltage VSS1 may be a voltage lower than the second low-potential voltage VSS2. That is, the second low-potential voltage VSS2 may be a higher voltage than the first low-potential voltage VSS1. Accordingly, during the first period PT1, the voltage difference between the first electrode Ecl and the second electrode Erl of the light emitting device ED may be higher than the threshold voltage of the light emitting device ED. Accordingly, the light emitting device ED may be in a state capable of emitting light. Then, during the second period PT2, the voltage difference between the first electrode Ecl and the second electrode Erl of the light emitting device ED may be lower than the threshold voltage of the light emitting device ED. Accordingly, the light emitting device ED may be in a state in which it cannot emit light.

Meanwhile, one of the plurality of row lines RL may be supplied with a touch driving signal TDS, which is a signal whose voltage level swings, during a third period PT3 different from the first period PT1 and the second period PT2.

The third period PT3 may be a period included in the touch driving period T.

The touch driving signal TDS may be a signal having a predetermined frequency and whose voltage level fluctuates. The touch driving signal TDS may be a signal that swings between a predefined high voltage and a low voltage. For example, the high voltage may be a second low-potential voltage VSS2, and the low voltage may be a third low-potential voltage VSS3. The amplitude of the touch driving signal TDS may be a voltage difference between the high voltage and the low voltage. For example, the third low-potential voltage VSS3 may be a voltage lower than the second low-potential voltage VSS2 and may be the same as or different from the first low-potential voltage VSS1. For example, the third low-potential voltage VSS3 may be a voltage higher than the first low-potential voltage VSS1 and lower than the second low-potential voltage VSS2.

Depending on the driving type and driving timing, each of the plurality of row lines RL may be driven in a predetermined method.

For example, the display-on driving for each of the plurality of row lines RL may be performed sequentially. In another example, the display-on driving for each of the plurality of row lines RL may be performed simultaneously. In another example, the display-on driving for each of two or more row lines RL among the plurality of row lines RL may be performed simultaneously.

For example, during a specific display driving period, among the plurality of row lines RL arranged in the unit driving area UDA, display-on driving may be performed for at least one row line RL, and display-off driving may be performed for the remaining row lines RL without display-on driving.

The display-on driving performed for a specific row line RL may mean that a first low-potential voltage VSS1 of a predefined level is supplied to the corresponding row line RL.

When the display-on driving for a specific row line RL is performed, the light emitting devices ED arranged corresponding to the corresponding row line RL may emit light.

The display-off driving performed for a specific row line RL without display-on driving may mean that a second low-potential voltage VSS2 of a predefined level is supplied to the corresponding row line RL. Here, the second low-potential voltage VSS2 may be a higher voltage than the first low-potential voltage VSS1.

When display-off driving is performed for a specific row line RL, the light emitting devices ED arranged corresponding to the row line RL may not emit light.

For example, a first row line RL among the plurality of row lines RL may be supplied with a first low-potential voltage VSS1 during a first period, and may be supplied with a second low-potential voltage VSS2 higher than the first low-potential voltage VSS1 during a second period different from the first period. For example, the first period and the second period may be included in one display driving period. In another example, the first period and the second period may be included in different display driving periods.

The situation in the display panel 110 during the first to third periods PT1, PT2 and PT3 will be described again as follows.

During the first period PT1, the first row line RL among the plurality of row lines RL may be supplied with a first low-potential voltage VSS1. Accordingly, display-on driving may be performed on the first row line RL during the first period PT1.

During a second period PT2 different from the first period PT1, the first row line RL among the plurality of row lines RL may be supplied with a second low-potential voltage VSS2 higher than the first low-potential voltage VSS1. Accordingly, during the second period PT2, display-off driving may be performed on the first row line RL.

During a third period PT3 different from the first period PT1 and the second period PT2, the first row line RL among the plurality of row lines RL may be supplied with a touch driving signal TDS, which is a signal whose voltage level swings. That is, during the third period PT3, the first row line RL may function as a touch sensor.

The plurality of row lines RL may further include a second row line RL different from the first row line RL.

The plurality of column lines CL may include a first column line CL overlapping with the first row line RL and the second row line RL.

In addition, the first row line RL, the second row line RL, and the first column line CL may be arranged together in a touch subpixel area TSP which is one unit driving area UDA. The first row line RL, the second row line RL, and the first column line CL may be driven by the same driver DRV.

During the first period PT1 in which display-on driving is performed in the first row line RL, the second row line RL may be supplied with the second low-potential voltage VSS2. That is, during the first period PT1, display-on driving may be performed in the first row line RL, and display-off driving may be performed in the second row line RL.

The plurality of light emitting devices ED may include a first light emitting device ED having a first electrode connected to a first column line CL and a second electrode connected to a first row line RL, and a second light emitting device ED having a first electrode connected to the first column line CL and a second electrode connected to a second row line RL.

During the first period PT1, display-on driving is performed on the first row line RL, and display-off driving is performed on the second row line RL. Accordingly, during the first period PT1, the first light emitting device ED may emit light, and the second light emitting device ED may not emit light.

During the third period PT3, the voltage difference between the first column line CL and the first row line RL may be less than the threshold voltage of the first light emitting device ED. Accordingly, during the third period PT3, the first light emitting device ED may not emit light.

The plurality of drivers DRV may be positioned closer to the substrate 210 than the plurality of light emitting devices ED.

Figure 25:
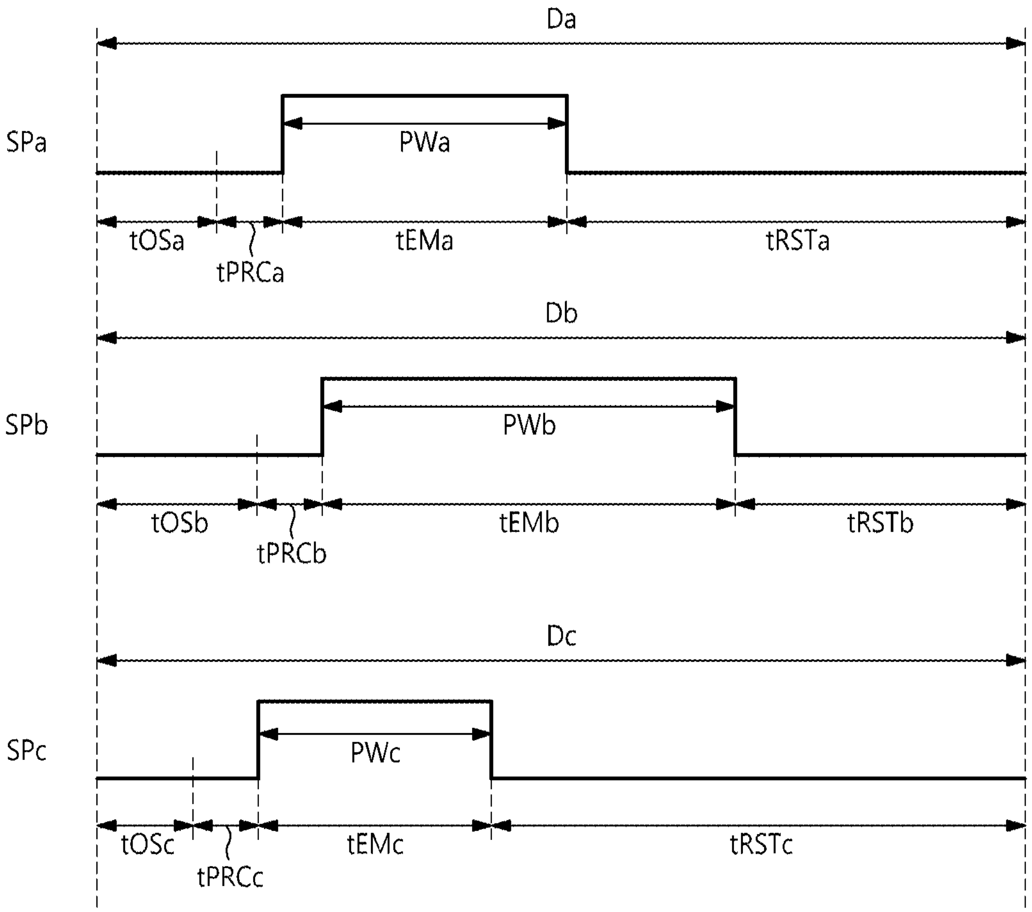
FIG. 25 is a display driving timing diagram for three subpixels of a display device according to embodiments of the present disclosure.

FIG. 25 is a display driving timing diagram for three subpixels SPa, SPb and SPc of the display device 100 according to embodiments of the present disclosure.

Referring to FIG. 25, a plurality of pixels P arranged in a display device 100 according to embodiments of the present disclosure may be classified into k subpixels. The k may be a natural number greater than or equal to 2. For example, k may be 3. In this case, the k subpixels may be three subpixels SPa, SPb and SPc.

Referring to FIG. 25, if k is 3, each of a plurality of pixels P arranged in a display device 100 according to embodiments of the present disclosure may include three subpixels SPa, SPb and SPc. For example, the three subpixels SPa, SPb and SPc may include a first subpixel SPa including a first light emitting device EDa that emits a first color light, a second subpixel SPb including a second light emitting device EDb that emits a second color light, and a third subpixel SPc including a third light emitting device EDc that emits a third color light.

Referring to FIG. 25, the display driving period D may include a first display driving period Da, a second display driving period Db, and a third display driving period Dc. The first display driving period Da may include a first pre-charge period tPRCa, a first emission period tEMa, and a first reset period tRSTa for the first subpixel SPa. The second display driving period Db may include a second pre-charge period tPRCb, a second emission period tEMb, and a second reset period tRSTb for the second subpixel SPb. The third display driving period Dc may include a third pre-charge period tPRCc, a third emission period tEMc, and a third reset period tRSTc for the third subpixel SPc.

Referring to FIG. 25, according to the display device 100 according to the embodiments of the present disclosure, the timing of the first emission period tEMa, the timing of the second emission period tEMb, and the timing of the third emission period tEMc may be different from each other.

Referring to FIG. 25, according to the display device 100 according to the embodiments of the present disclosure, a first length PWa of the first emission period tEMa, a second length PWb of the second emission period tEMb, and a third length PWc of the third emission period tEMc may be different from each other.

For example, according to the display device 100 according to the embodiments of the present disclosure, the first length PWa of the first emission period tEMa, the second length PWb of the second emission period tEMb, and the third length PWc of the third emission period tEMc may each correspond to luminance to be expressed in the corresponding subpixel, correspond to an image signal (e.g., image data) corresponding to the corresponding subpixel, or correspond to a length of a turn-on level voltage section of an emission control signal in the column driver C-DRV. For example, the emission control signal in the column driver C-DRV is a display driving control signal supplied from a controller (e.g., a timing controller) to the column driver C-DRV, and may include the first emission control signal EM1 of FIGS. 5, 8, and 9, and may further include the second emission control signal EM2 of FIG. 9. For example, the turn-on level voltage section of the emission control signal may be a high level voltage section or a low level voltage section.

Referring to FIG. 25, according to the display device 100 according to the embodiments of the present disclosure, the first display driving period Da may further include a first offset period tOSa before the first pre-charge period tPRCa, the second display driving period Db may further include a second offset period tOSb before the second pre-charge period tPRCb, and the third display driving period Dc may further include a third offset period tOSc before the third pre-charge period tPRCc.

Referring to FIG. 25, according to the display device 100 according to the embodiments of the present disclosure, the length of the first offset period tOSa, the length of the second offset period tOSb, and the length of the third offset period tOSc may be different from each other.

As described above, the driving period of the display device 100 according to the embodiments of the present specification may include a display driving period D and a touch driving period T. Hereinafter, driving of the row line RL and the column line CL during the display driving period D will be described in more detail with reference to FIG. 26, and driving of the row line RL and the column line CL during the touch driving period T will be described in more detail with reference to FIGS. 27 and 28.

Figure 26:
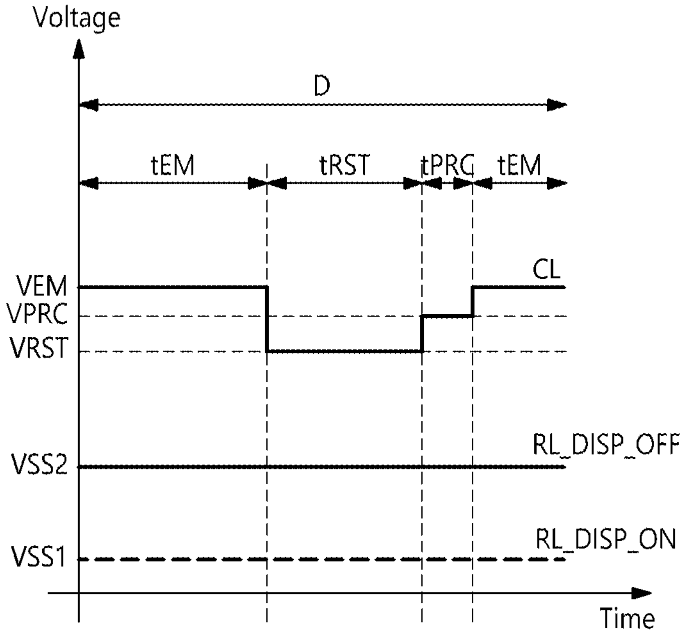
FIG. 26 is a driving timing diagram for a row line and a column line during a display driving period of a display device according to embodiments of the present disclosure.

FIG. 26 is a driving timing diagram for the row line RL and the column line CL during the display driving period D of the display device 100 according to the embodiments of the present disclosure.

Referring to FIG. 26, according to the display device 100 according to the embodiments of the present disclosure, during the display driving period D, at least one first row line RL_DISP_ON among the plurality of row lines RL is supplied with a first low-potential voltage VSS1. At least one second row line RL_DISP_OFF different from at least one first row line RL_DISP_ON among the plurality of row lines RL may be applied with a second low-potential voltage VSS2 higher than the first low-potential voltage VSS1.

As an example, at least one first row line RL_DISP_ON and at least one second row line RL_DISP_OFF may be arranged in one unit driving area UDA. In this case, at least one first row line RL_DISP_ON and at least one second row line RL_DISP_OFF may be electrically connected to the same driver DRV. At least one first row line RL_DISP_ON and at least one second row line RL_DISP_OFF may be driven by the same driver DRV.

As another example, at least one first row line RL_DISP_ON and at least one second row lines RL_DISP_OFF may be arranged in different unit driving areas UDAs. In this case, at least one first row line RL_DISP_ON and at least one second row line RL_DISP_OFF may be electrically connected to different drivers DRV. At least one first row line RL_DISP_ON and at least one second row line RL_DISP_OFF may be driven by different drivers DRV.

During the display driving period D, the light emitting devices ED overlapping with at least a portion of at least one first row line RL_DISP_ON may emit light, and the light emitting devices ED overlapping with at least a portion of at least one second row line RL_DISP_OFF may not emit light.

Referring to FIG. 26, the display driving period D may include a pre-charge period tPRC, an emission period tEM, and a reset period tRST.

During the pre-charge period tPRC, the emission period tEM, and the reset period tRST, a first low-potential voltage VSS1 may be applied to at least one first row line RL_DISP_ON, and a second low-potential voltage VSS2 can be applied to at least one second row line RL_DISP_OFF.

During the pre-charge period tPRC, a display driving pre-charge voltage VPRC may be applied to at least one column line CL among the plurality of column lines CL. Here, the display driving pre-charge voltage VPRC may be a constant voltage or a variable voltage.

During the emission period tEM, an emission driving voltage VEM may be applied to at least one column line CL. Here, the emission driving voltage VEM may be a display voltage for displaying an image.

During the reset period tRST, a display driving reset voltage VRST may be applied to at least one column line CL. Here, the display driving reset voltage VRST may be a constant voltage or a variable voltage.

The voltage applied to the column line CL may be referred to as a column line voltage, and may also be referred to as an anode voltage or a cathode voltage. The pre-charge voltage for display driving VPRC, the emission driving voltage VEM, and the reset voltage for display driving VRST may be column line voltages having different purposes depending on the driving timing.

For example, among the pre-charge voltage for display driving VPRC, the emission driving voltage VEM, and the reset voltage for display driving VRST, the reset voltage for display driving VRST may have the lowest voltage, and the emission driving voltage VEM may have the highest voltage value.

As an example, at least one column line CL may intersect with at least one first row line RL_DISP_ON and at least one second row line RL_DISP_OFF. In this case, at least one column line CL, at least one first row line RL_DISP_ON, and at least one second row line RL_DISP_OFF may be arranged in the same unit driving area UDA. At least one column line CL, at least one first row line RL_DISP_ON, and at least one second row line RL_DISP_OFF may be electrically connected to the same driver DRV. At least one column line CL, at least one first row line RL_DISP_ON, and at least one second row line RL_DISP_OFF may be driven by the same driver DRV.

In another example, the at least one column line CL may not intersect with the at least one first row line RL_DISP_ON and the at least one second row line RL_DISP_OFF. In this case, the at least one column line CL may be arranged in a different unit driving area UDA from the at least one first row line RL_DISP_ON and the at least one second row line RL_DISP_OFF. At least one column line CL may be electrically connected to another driver DRV different from at least one driver DRV that is electrically connected to at least one first row line RL_DISP_ON and at least one second row line RL_DISP_OFF. At least one column line CL may be driven by a driver DRV that is different from the driver DRV driving at least one first row line RL_DISP_ON and at least one second row line RL_DISP_OFF.

In another example, the at least one column line CL may intersect with one of the at least one first row line RL_DISP_ON and the at least one second row line RL_DISP_OFF. In this case, the at least one column line CL may be arranged in the same unit driving area UDA as one of the at least one first row line RL_DISP_ON and the at least one second row line RL_DISP_OFF. At least one column line CL may be electrically connected to at least one driver DRV that is electrically connected to at least one first row line RL_DISP_ON and at least one second row line RL_DISP_OFF. At least one column line CL may be driven by a driver DRV driving at least one first row line RL_DISP_ON and at least one second row line RL_DISP_OFF.

Figure 27:
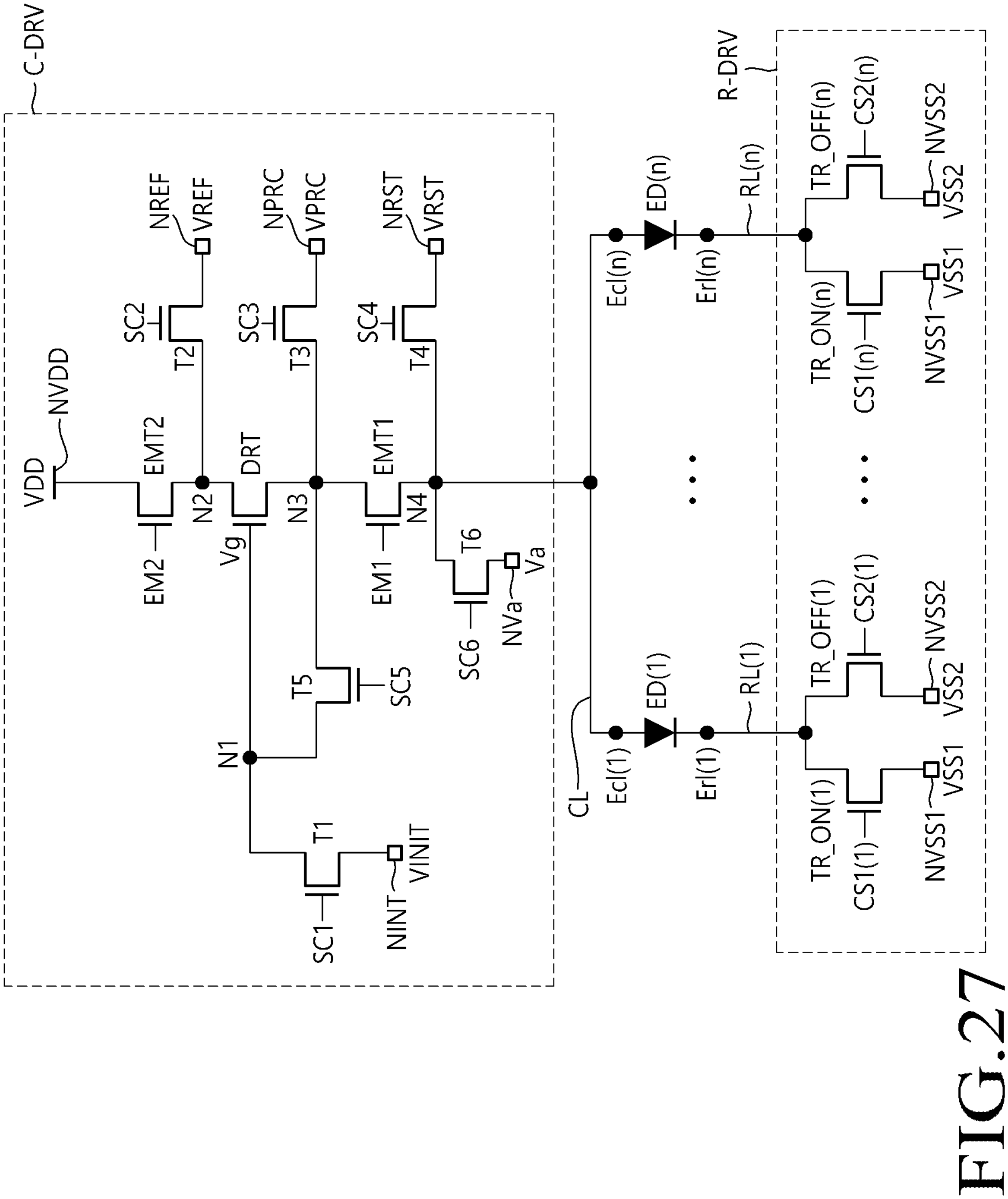
FIG. 27 illustrates circuits for driving n light emitting devices connected to one column line included in a first sub-driving area of a display panel according to embodiments of the present disclosure.

FIG. 27 illustrates circuits for driving n light emitting devices ED connected to one column line CL included in a first sub-driving area of a display panel 110 according to embodiments of the present disclosure.

Figure 28:
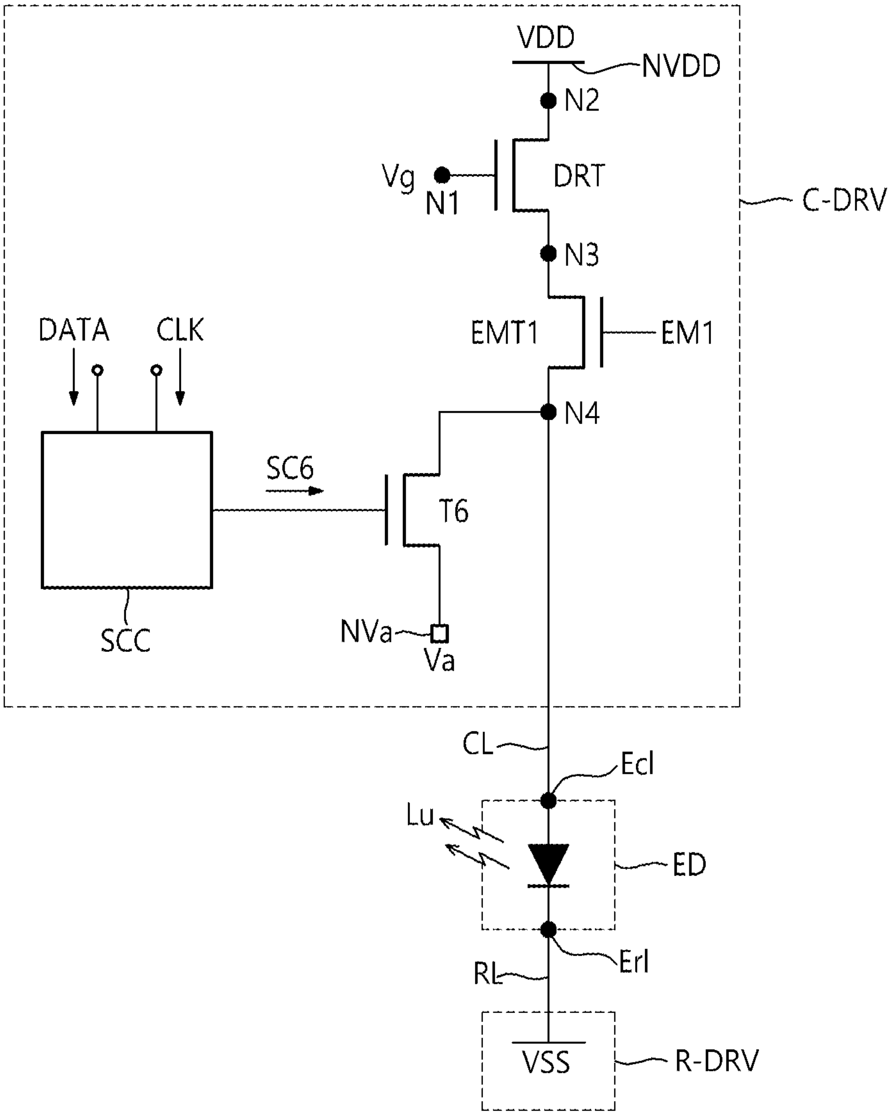
FIG. 28 illustrates subpixels of a display panel according to embodiments of the present disclosure.

FIG. 28 illustrates subpixels SP of a display panel 110 according to embodiments of the present disclosure.

Figure 29:
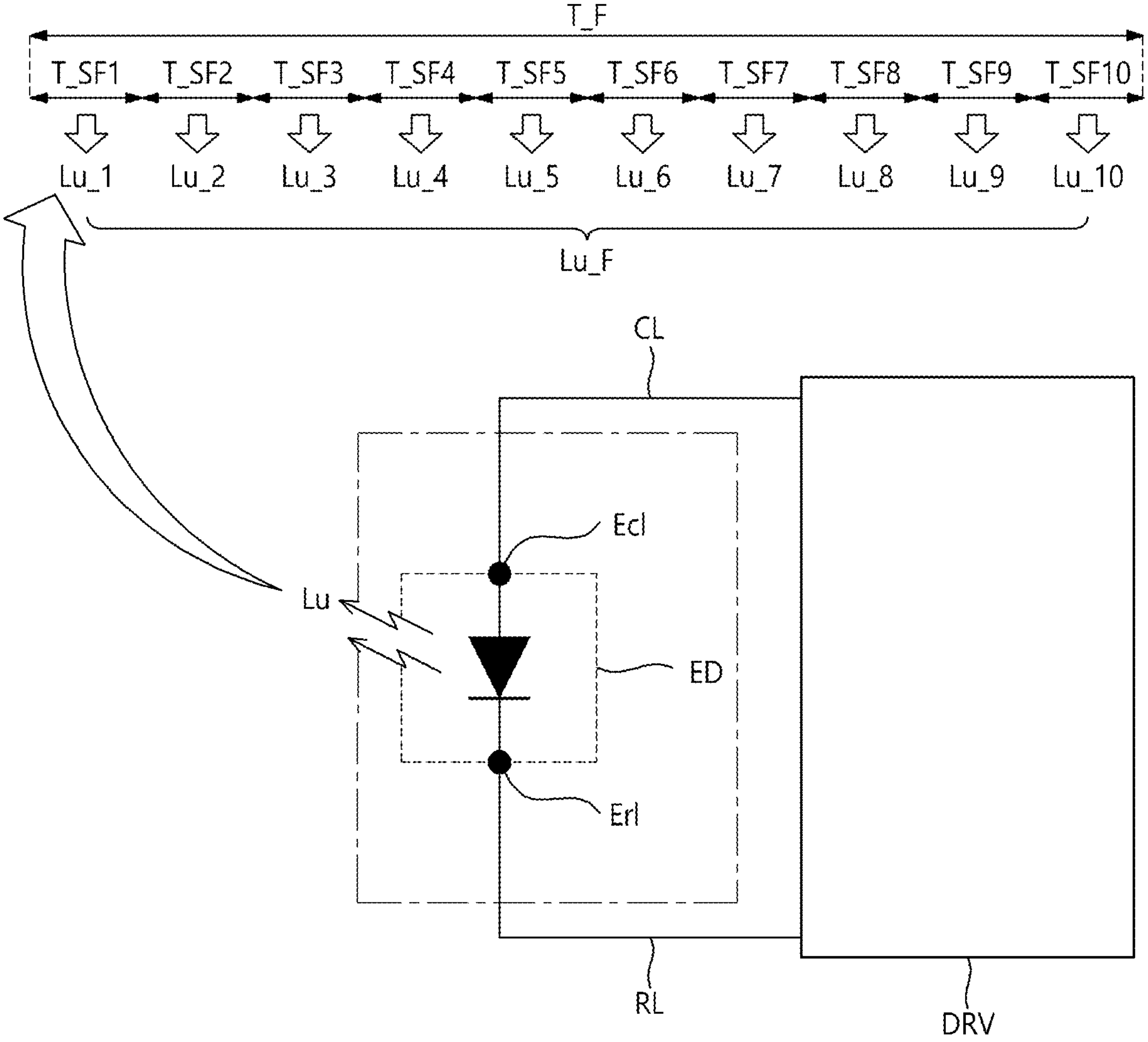
FIG. 29 is a diagram for explaining driving of a light emitting device according to embodiments of the present disclosure.

FIG. 29 is a diagram for explaining driving of a light emitting device ED according to embodiments of the present disclosure.

The configuration included in the column driver C-DRV illustrated in FIG. 9 may be the same as a configuration included in the column driver C-DRV illustrated in FIG. 27. Referring to FIG. 27, the column driver C-DRV may further include a voltage control transistor T6.

The voltage control transistor T6 may be electrically connected between a first voltage node NVa and the fourth node N4. The first voltage node NVa may be a node to which a first voltage Va is supplied. The voltage control transistor T6 may be defined as a sixth transistor.

The gate node of the voltage control transistor T6 may be a node to which a sixth scan signal SC6 is supplied. The voltage control transistor T6 may be turned on or turned off depending on a voltage level of the sixth scan signal SC6.

If the voltage control transistor T6 is turned off, the first voltage Va may not be supplied to the fourth node N4.

If the voltage control transistor T6 is turned on, a specific voltage may be supplied to the fourth node N4. Since the fourth node N4 may be electrically connected to the column line CL, the first voltage Va may be supplied to the column line CL.

Referring to FIG. 28, the column driver C-DRV may further include a voltage control transistor T6. The characteristics of the voltage control transistor T6 illustrated in FIG. 28 may be the same as the characteristics of the voltage control transistor T6 illustrated in FIG. 27.

The voltage control transistor T6 may be electrically connected between a first voltage node NVa and the fourth node N4. The gate node of the voltage control transistor T6 may be a node to which the sixth scan signal SC6 is supplied.

Referring to FIG. 28, the column driver C-DRV may further include a control signal generation circuit SCC. The control signal generation circuit SCC may be supplied with emission data (or data signal) DATA and a clock signal CLK. The emission data DATA may include information about the time for which the voltage control transistor T6 is to be maintained in a turn-on state. The control signal generation circuit SCC may generate the sixth scan signal SC6 based on the emission data DATA.

It will be described an example of the control signal generation circuit SCC generating the sixth scan signal SC6. The clock signal CLK may be a signal that alternates between a high-level voltage state and a low-level voltage state. The control signal generation circuit SCC may count the cases where the clock signal CLK changes from a low-level voltage state to a high-level voltage state. This can be defined as a single-edge counting mode. The control signal generation circuit SCC may count both the cases where the clock signal CLK changes from a low-level voltage state to a high-level voltage state, and the cases where the clock signal CLK changes from a high-level voltage state to a low-level voltage state. This may be defined as a dual-edge counting mode. The control signal generation circuit SCC may be driven in a single-edge counting mode or a dual-edge counting mode. The control signal generation circuit SCC may count the clock signal CLK based on the emission data DATA, and generate the sixth scan signal SC6 corresponding to the counting information.

The time for which the sixth scan signal SC6 is maintained in a high-level voltage state may be determined based on the emission data DATA. The control signal generation circuit SCC may generate the sixth scan signal SC6 based on the clock signal CLK and the emission data DATA. For example, the clock signal CLK may be a signal that alternates between a high-level voltage state and a low-level voltage state. The control signal generation circuit SCC may count the time for which the sixth scan signal SC6 is maintained in a high-level voltage state based on the emission data. The first emission control signal EM1 may be also be generated through an example in which the sixth scan signal SC6 is generated. Next, it will be described an example in which the light emitting device ED emits light at a specific luminance Lu.

Referring to FIG. 28, the light emitting device ED may emit light with a specific luminance Lu. If the light emitting device ED emits light with a specific luminance Lu, then the light emitting device ED may become in a non-emission state. The light emitting device ED emitting light can be expressed as the light emitting device ED in a turn-on state. The light emitting device ED becoming a non-emission state can be expressed as the light emitting device ED in a turn-off state.

Referring to FIG. 28, a first emission control transistor EMT1 may be controlled by a first emission control signal EM1. The time for which the first emission control transistor EMT1 is maintained in a turn-on state may be the same as the time for which the light emitting device ED emits light.

The light emitting device ED may maintain an emission state for a predetermined time, and it is possible to express the grayscale during the light emitting device ED emits light. The specific grayscale expressed by the light emitting device ED may be the n-th gray. For example, the light emitting device ED may express various gradations or grayscales such as a first gray, a second gray, a 16-th gray, and a 32-nd gray. The time for the light emitting device ED to express the first gray may be defined as a "first gray time," which will be described later.

For example, in order for the light emitting device ED to emit light in the first gray, the first emission control transistor EMT1 may be maintained in a turned-on state for the time for the light emitting device ED to express the first gray. Thereafter, the first emission control transistor EMT1 may be changed to a turn-off state, and accordingly, the light emitting device ED may not emit light. During the light emitting device ED is maintained in the turned-on state, the light emitting device ED can express the first gray. The time for the light emitting device ED to express the first gray can be defined as the "first gray time."

For example, in order for the light emitting device ED to emit light in the n-th gray, the first emission control transistor EMT1 may be maintained in a turned-on state for a time for the light emitting device ED to express the n-th gray. Thereafter, the first emission control transistor EMT1 may be turned off, and accordingly, the light emitting device ED may not emit light. During the light emitting device ED is maintained in a turned-on state, the light emitting device ED may express the n-th gray. The time for the light emitting device ED to express the n-th gray may be defined as "a n-th gray time."

Hereinafter, a frame will be described. Each of the plurality of light emitting devices ED may be repeatedly turned on and off. As each of the plurality of light emitting devices ED is repeatedly turned on and off, one frame may be expressed. A frame may mean one still image or may mean the time for which one still image is expressed. Hereinafter, a frame means one still image. A frame period means a period during which one frame is expressed. The light emitting device ED may emit light at least twice during a frame period.

One frame may be expressed by controlling a plurality of light emitting devices ED. Each of the plurality of light emitting devices ED can emit light with a specific luminance Lu for one frame. Each of the plurality of light emitting devices ED may be independently controlled. Hereinafter, it will be described an example of controlling one light emitting device ED.

Referring to FIG. 29, one frame period T_F may include a plurality of sub-frame periods T_SF1, . . . , T_SF10. Referring to FIG. 29, the sub-frame period may be expressed as "T_SF". A first sub-frame period may be expressed as "T_SF1", and a second sub-frame period may be expressed as "T_SF2".

Referring to FIG. 29, one frame period T_F can include ten sub-frame periods T_SF1, . . . , T_SF10. However, the embodiments are not limited thereto, and the number of sub-frame periods T_SF of one frame period T_F may be 8, 16, and so on. Hereinafter, for convenience of explanation, it is assumed that the number of sub-frame periods T_SF in one frame period T_F is 10. Hereinafter, an earliest sub-frame period is a first sub-frame period T_SF1. The specific luminance Lu of the light emitting device ED emitted in the first sub-frame period T_SF1 is a first luminance Lu_1.

Referring to FIG. 29, the light emitting device ED may emit light with a specific luminance Lu in each of the plurality of sub-frame periods T_SF. The light emitting device ED may emit light with a specific luminance Lu in the sub-frame period T_SF and then is turned off. The light emitting device ED may emit light with an n-th luminance in the n-th sub-frame period T_SF.

For example, the light emitting device ED may emit light with a first luminance Lu_1 in the first sub-frame period T_SF1 and then turn off. The light emitting device ED may emit light with a second luminance Lu_2 in a second sub-frame period T_SF2 and then turn off. Thereafter, in a third sub-frame period T_SF3 to a ninth sub-frame period T_SF9, the turning on and off of the light emitting device ED may be repeated. The light emitting device ED may emit light with a tenth luminance Lu_10 in a tenth sub-frame period T_SF10 and then turn off.

The light emitting device ED may emit light once in one sub-frame period T_SF and then turn off. The light emitting device ED may repeatedly emit light and then turn off in one frame period T_F. For example, if there are 10 sub-frame periods T_SF in one frame period T_F, the plurality of light emitting devices ED may be repeatedly turned on and off 10 times in one frame period T_F.

During the frame period T_F, the light emitting device ED may be turned on with a first luminance Lu_1 to a tenth luminance Lu_10. A frame period luminance Lu_F of the light emitting device ED may be equal to the sum of the first luminance Lu_1 to the tenth luminance Lu_10. That is, the frame period luminance Lu_F of the light emitting device ED may be equal to the sum of the first luminance Lu_1, the second luminance Lu_2, a third luminance Lu_3, a fourth luminance Lu_4, the fifth luminance Lu_5, a sixth luminance Lu_6, a seventh luminance Lu_7, an eighth luminance Lu_8, a ninth luminance Lu_9, and a tenth luminance Lu_10. If the number of sub-frame periods T_SF is n, the light emitting device ED emits light n times, and the frame period luminance Lu_F may be equal to the sum of the first luminance to a n-th luminance. [0698].

Figure 30:
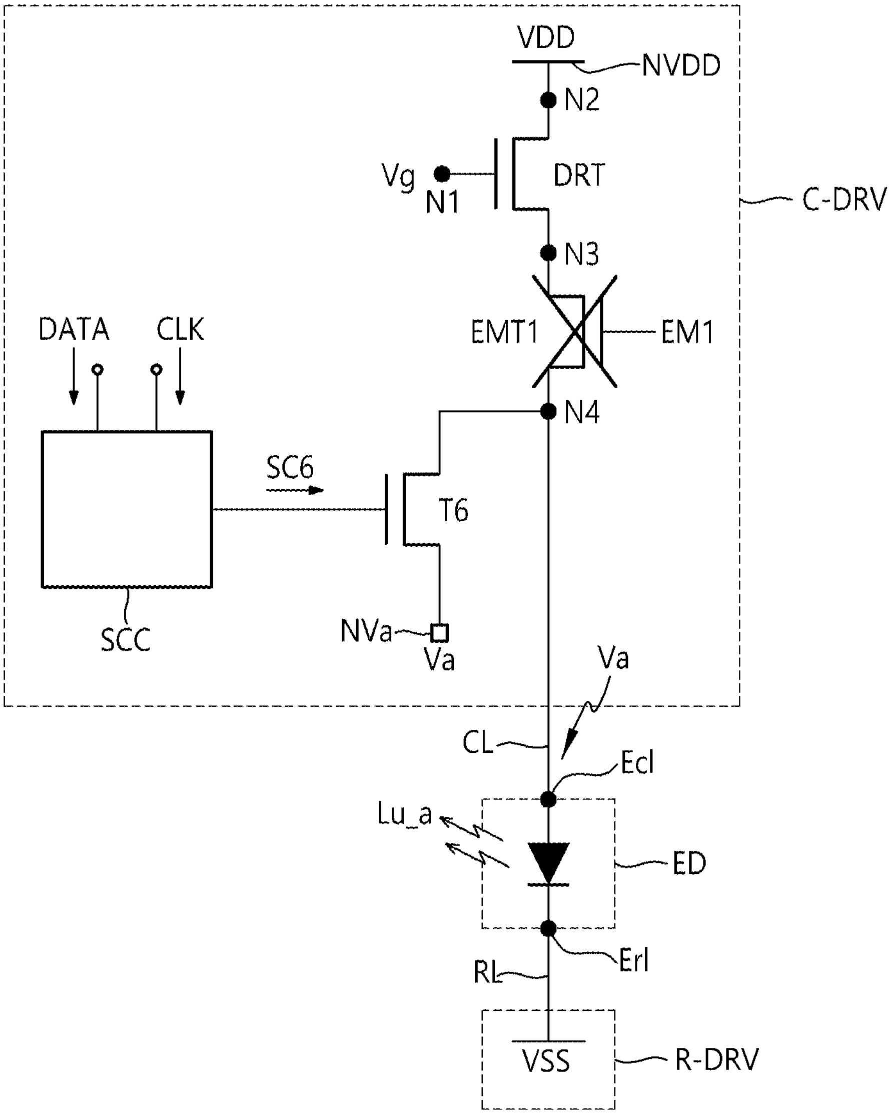
FIG. 30 and FIG. 31 are diagrams for controlling a voltage control transistor according to embodiments of the present disclosure.
Figure 31:
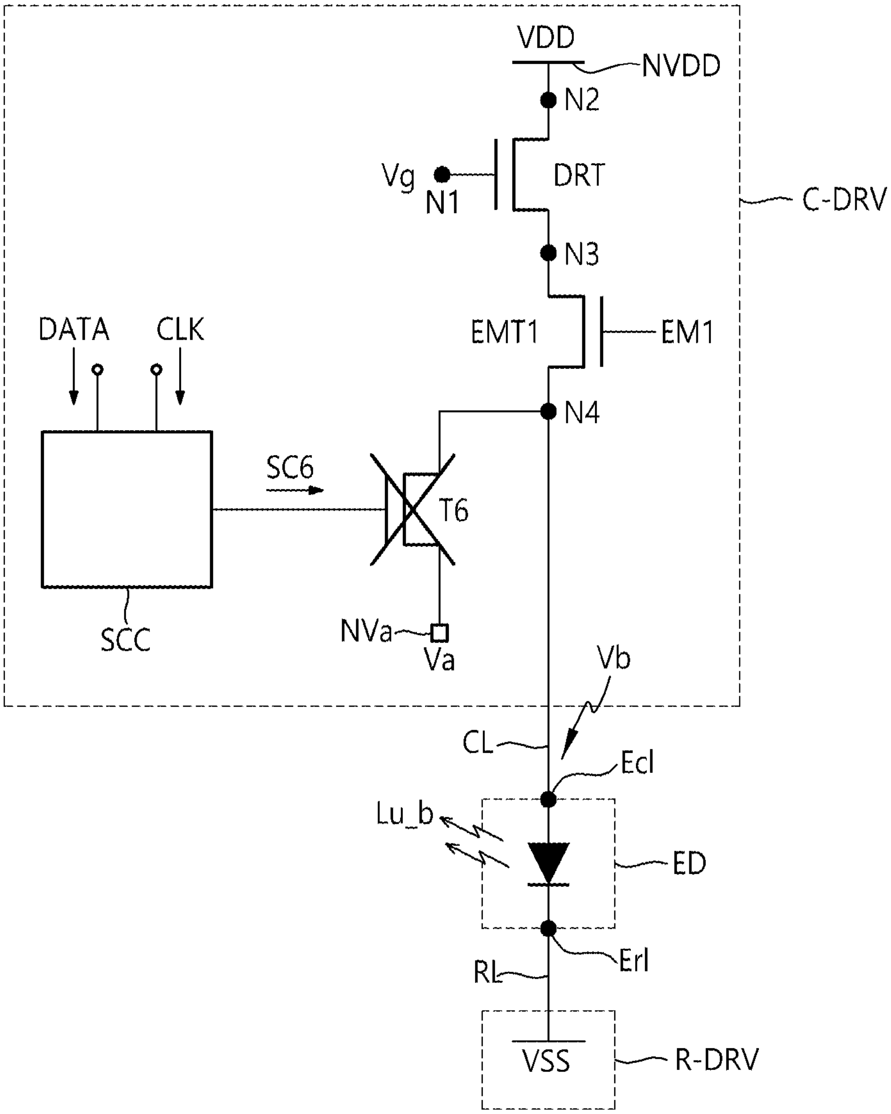

FIG. 30, and FIG. 31 are diagrams for explaining the control of the voltage control transistor T6 according to embodiments of the present disclosure.

Figure 32:
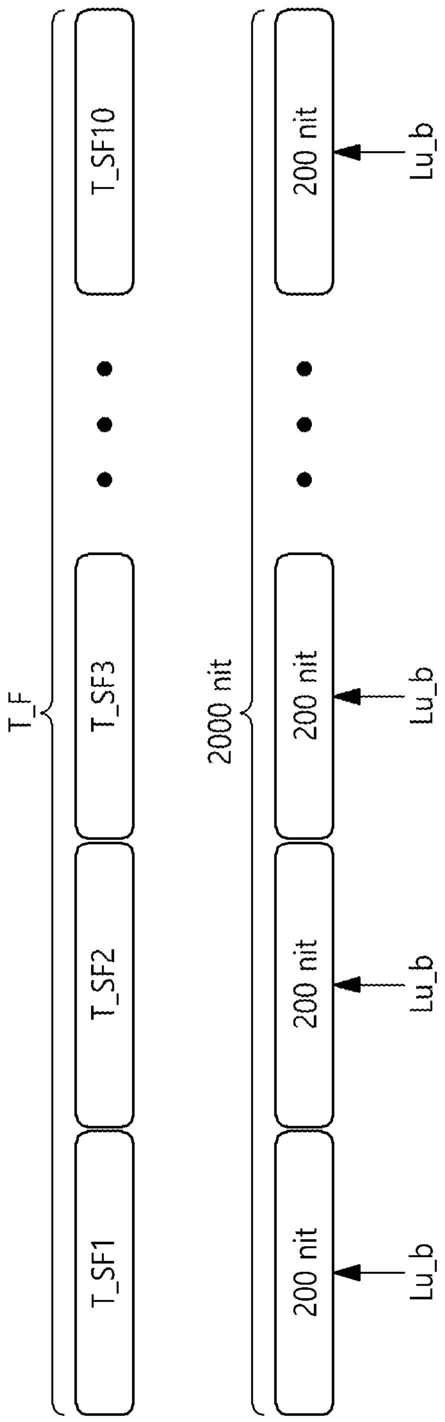
Figure 33:
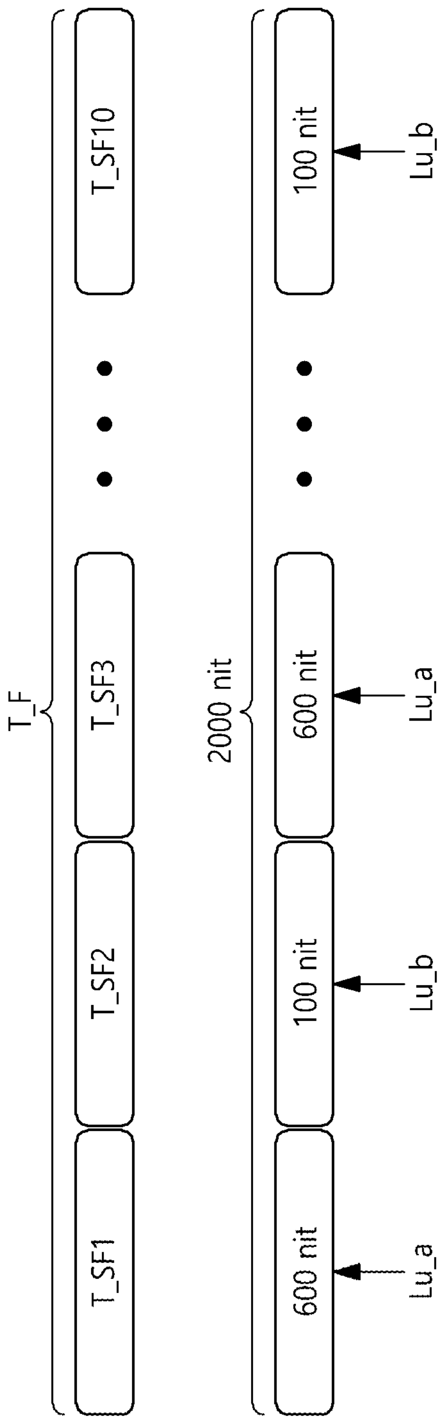

FIG. 32, FIG. 33, and FIG. 34 are examples of luminance for each of a plurality of sub-frame periods T_SF according to embodiments of the present disclosure.

Referring to FIG. 30, and FIG. 31, the column driver C-DRV may include a voltage control transistor T6. The equivalent circuits illustrated in FIG. 30, and FIG. 31 may correspond to the equivalent circuit illustrated in FIG. 28. Since the voltage control transistor T6 illustrated in FIG. 28 corresponds to the voltage control transistor T6 illustrated in FIG. 27, the following embodiments may also be applied to the column driver C-DRV illustrated in FIG. 27.

Referring to FIG. 30, the control signal generation circuit SCC may generate a sixth scan signal SC6 based on the emission data DATA and the clock signal CLK. The sixth scan signal SC6 may be a signal that maintains a high-level voltage state for a predetermined time. The sixth scan signal SC6 may be supplied to the gate node of the voltage control transistor T6.

Referring to FIG. 30, the voltage control transistor T6 may be controlled to be in a turn-on state. In this case, the first emission control transistor EMT1 may be controlled to be in a turn-off state.

Referring to FIG. 30, as the voltage control transistor T6 is turned on, the first voltage Va may be supplied to the column line CL. The column line CL may be electrically connected to the light emitting device ED, and the first voltage Va may be supplied to the first electrode Ecl. The first voltage Va may be supplied to the light emitting device ED, and the light emitting device ED may emit light with an 'a-luminance' Lu_a. After emitting light with the a-luminance Lu_a, the light emitting device ED may enter a non-emission state. That is, the light emitting device ED may emit light at the 'a-luminance' Lu_a during the first sub-frame period and then switch to a non-emission state.

Referring to FIG. 31, the voltage control transistor T6 may be controlled to be in a turn-off state. At this time, the first emission control transistor EMT1 may be controlled to be in a turn-on state. That is, since the voltage control transistor T6 is in a turn-off state, the first voltage Va is not supplied to the light emitting device ED.

Referring to FIG. 31, the light emitting device ED may be emitted by a driving current (I_LED) supplied by the driving transistor DRT. For example, the first electrode Ecl of the light emitting device ED may be in a state where the second voltage Vb is supplied. In this case, the light emitting device ED may emit with a 'b-luminance' Lu_b. After the light emitting device ED has emitted with the b-luminance Lu_b, the light emitting device ED may be in a non-emission state. That is, the light emitting device ED may emit light at the 'b-luminance' Lu_b during the second sub-frame period and then switch to a non-emission state. The b-luminance Lu_b may be relatively darker or lower than the a-luminance Lu_a.

Referring to FIG. 30, the column line CL may be supplied with the first voltage Va. Referring to FIG. 31, the column line CL may be supplied with a second voltage Vb.

Referring to FIGS. 30 and 31, the a-luminance Lu_a may be relatively brighter or higher than the b-luminance Lu_b. In this case, the first voltage Va may be greater than the second voltage Vb. The light emitting device ED may emit light with a higher luminance when supplied with the first voltage Va than when supplied with the second voltage Vb.

Referring to FIG. 30 and FIG. 31, the a-luminance Lu_a may be relatively brighter or higher than the b-luminance Lu_b. In this case, the first voltage Va may be equal to the second voltage Vb. The time for which the first voltage Va is supplied to the light emitting device ED may be longer than the time for which the second voltage Vb is supplied to the light emitting device ED. If the time for which the first voltage Va is supplied is longer, the light emitting device ED may emit light with a higher luminance.

Referring to FIG. 30, if the first voltage Va is supplied to the column line CL, the driving transistor DRT and the emission control transistor EMT may be in a turn-off state. Since the first voltage Va is supplied to the column line CL, power consumption by the transistors (e.g., DRT, EMT1) may be reduced. In addition, the a-luminance Lu_a may be high luminance, and in this case, the high luminance can be easily implemented by directly supplying the first voltage Va to the column line CL. In addition, since the first voltage Va is directly supplied to the column line CL instead of controlling the driving transistor DRT, it is possible to suppress the deterioration problem of the driving transistor DRT.

Referring to FIG. 32, the frame period T_F may include a plurality of sub-frame periods T_SF. The light emitting device ED may emit light with the b-luminance Lu_b in each of the plurality of sub-frame periods T_SF. For example, the b-luminance Lu_b may be 200 nit. If the light emitting device ED emits light with 200 nit in each of 10 sub-frame periods T_SF, the frame luminance of the light emitting device ED for the frame period T_F may be 2000 nit.

Referring to FIG. 33, the light emitting device ED may emit light with the a-luminance Lu_a during the first sub-frame period T_SF1 and the third sub-frame period T_SF3, and the light emitting device ED may emit light with the b-luminance Lu_b during the remaining sub-frame periods T_SF2, T_SF4, . . . , T_SF10. For example, the a-luminance Lu_a may be 600 nit, and the b-luminance Lu_b may be 100 nit. That is, the light emitting device ED emits light twice at 600 nit and eight times at 100 nit. In this case, one frame luminance of one frame period may be 2000 nit.

Referring to FIG. 34, there are described other examples for implementing the luminance of the light emitting device ED for the frame period T_F.

In a first case Case 1 in FIG. 34, the light emitting device ED may emit light with the a-luminance Lu_a in a first sub-frame period T_SF1 and a third sub-frame period T_SF3, and the light emitting device ED may emit light with the b-luminance Lu_b in the remaining sub-frame periods T_SF2, T_SF4, T_SF5, T_SF6, T_SF7, T_SF8, T_SF9 and T_SF10. For example, the a-luminance Lu_a may be 600 nit, and the b-luminance Lu_b may be 100 nit. That is, the light emitting device ED emits light twice with 600 nit and eight times with 100 nit. In this case, the frame luminance Lu_F may be 2000 nit.

In a second case Case 2 of FIG. 34, the light emitting device ED can emit light with the a-luminance Lu_a in the second sub-frame period T_SF2 and the seventh sub-frame period T_SF7, and the light emitting device ED may emit light with the b-luminance Lu_b in the remaining sub-frame periods T_SF1, T_SF3, T_SF4, T_SF5, T_SF6, T_SF8, T_SF9 and T_SF10. For example, the a-luminance Lu_a may be 600 nit, and the b-luminance Lu_b may be 100 nit. That is, the light emitting device ED emits light twice with 600 nit and eight times with 100 nit. In this case, the frame luminance Lu_F may be 2000 nit.

Referring to FIG. 34, in a third case Case3, the light emitting device ED may emit light with the a-luminance Lu_a in odd-numbered sub-frame periods T_SF1, T_SF3, T_SF5, T_SF7 and T_SF9, and the light emitting device ED may emit light with the b-luminance Lu_b in even-numbered sub-frame periods T_SF2, T_SF4, T_SF6, T_SF8 and T_SF10. For example, the a-luminance Lu_a may be 300 nit, and the b-luminance Lu_b may be 100 nit. In other words, the light emitting device ED emits light with 300 nit five times and with 100 nit five times. In this case, the frame luminance Lu_F may be 2000 nit.

Figure 35:
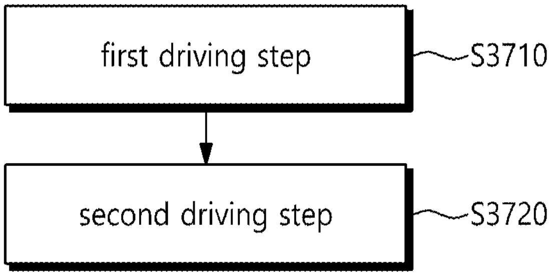
FIG. 35 is a flowchart of a driving method of a display device according to embodiments of the present disclosure.

FIG. 35 is a flowchart of a driving method of a display device 100 according to embodiments of the present disclosure.

The driving method of the display device 100 may include a first driving step S3710 and a second driving step S3720.

The first driving step S3710 may be a period in which a voltage control transistor T6 electrically connected to a first electrode Ecl of a light emitting device ED is in a turn-on state, and a first emission control transistor EMT1 electrically connected to a first electrode Ecl of a light emitting device ED is in a turn-off state.

In the first driving step S3710, since the voltage control transistor T6 is in a turn-on state, a first voltage Va may be supplied to the first electrode Ecl of the light emitting device ED. The first voltage Va may have the same voltage level as the high-potential voltage VDD. The base voltage may be supplied to the second electrode of the light emitting device ED.

In the first driving step S3710, the light emitting device ED may emit light during the time period in which the first voltage Va is supplied. In the first driving step S3710, the light emitting device ED may emit light with the a-luminance Lu_a.

The second driving step S3720 may be a period in which a voltage control transistor T6 electrically connected to a first electrode Ecl of a light emitting device ED is in a turn-off state, and a first emission control transistor EMT1 electrically connected to a first electrode Ecl of a light emitting device ED is in a turn-on state.

In the second driving step S3720, since the voltage control transistor T6 is in a turn-off state, the first voltage Va may not be supplied to the first electrode Ecl of the light emitting device ED. In addition, the first emission control transistor EMT1 is in a turn-on state, and a driving current (I_LED) may be supplied to the light emitting device ED.

In the second driving step S3720, the light emitting device ED may emit light during the time that the first emission control transistor EMT1 is in a turn-on state. In the second driving step S3720, the light emitting device ED may emit light at the b-luminance Lu_b. The b-luminance Lu_b may be darker or lower than the a-luminance Lu_a.

The first driving step S3710 may be the first sub-frame period T_SF1, and in this case, the second driving step S3720 may be the second sub-frame period T_SF2. However, the second driving step S3720 may be the first sub-frame period T_SF1, and in this case, the first driving step S3710 may be the second sub-frame period T_SF2.

Since each of the first driving step S3710 and the second driving step S3720 may be a sub-frame period T_SF, each of the first driving step S3710 and the second driving step S3720 may be included in one frame period T_F.

The display device 100 according to the embodiments of the present disclosure may be included in various devices or electronic devices. For example, the various electronic devices may include a wearable device, a mobile device, a notebook, and a monitor or television (TV).

For example, the display device 100 according to the embodiment of the present disclosure can be applied to a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an electronic book, a portable multimedia player (PMP), a personal digital assistant (PDA), an MP3 player, a mobile medical device, a desktop PC, a laptop PC, a netbook computer, a workstation, a navigation system, a vehicle display device, a theater display device, a television, a wallpaper device, a signage device, a game device, a notebook, a monitor, a camera, a camcorder, and home appliances.

A display device according to embodiments of the present disclosure may be described as follows.

Embodiments of the present disclosure may provide a display device including a light emitting device with a first electrode and a second electrode, a column line electrically connected to the first electrode, a row line electrically connected to the second electrode, and a driver electrically connected to the column line and the row line, and configured to control an emission of the light emitting device in each of a plurality of sub-frame periods, wherein the light emitting device emits light with a first luminance in a first sub-frame period, wherein the light emitting device emits light with a second luminance different from the first luminance in a second sub-frame period different from the first sub-frame period, and wherein the first luminance is brighter than the second luminance.

The column line may be supplied with a first driving voltage in the first sub-frame period, and the column line may be supplied with a second driving voltage different from the first driving voltage in the second sub-frame period. In this case, the first driving voltage may be greater than the second driving voltage.

The light emitting device may emit light at the first luminance during the first sub-frame period and then switch to a non-emission state, and may emit light at the second luminance during the second sub-frame period and then switch to a non-emission state.

The light emitting device may emit light with the first luminance in a third sub-frame period, and the light emitting device may be driven during a frame period for expressing one frame. The frame period may include the first sub-frame period, the second sub-frame period, and the third sub-frame period.

Embodiments of the present disclosure may provide a display device including a light emitting device with a first electrode and a second electrode, a column driver electrically connected to the first electrode, and a row driver electrically connected to the second electrode, wherein the column driver includes a voltage control transistor electrically connected between the first electrode and a first voltage node, and an emission control transistor electrically connected between the first electrode and a driving voltage node.

The first voltage node may be a node supplied with a first voltage, and the first electrode may be supplied with the first voltage if the voltage control transistor is turned on.

The driving voltage node may be a node to supplied with a driving voltage, and the first voltage may have the same voltage level as the driving voltage.

The column driver may further include a driving transistor electrically connected between the driving voltage node and the emission control transistor, and the driving transistor may be in a turn-off state if the voltage control transistor is in a turn-on state.

The emission control transistor may be in a turn-off state if the voltage control transistor is in a turn-on state.

The voltage control transistor may be in a turn-off state if the emission control transistor is in a turn-on state.

The light emitting device may emit light at a first luminance if the voltage control transistor is in a turn-off state and the emission control transistor is in a turn-on state. The light emitting device may emit light at a second luminance different from the first luminance if the voltage control transistor is in a turn-on state and the emission control transistor is in a turn-off state. In this case, the first luminance may be brighter than the second luminance.

A period during which the light emitting device is driven may include a first sub-frame period during which the light emitting device emits light at a first luminance, and a second sub-frame period during which the light emitting device emits light at a second luminance different from the first luminance.

The first electrode may be supplied with a first voltage in the first sub-frame period, and may be supplied with a second voltage different from the first voltage in the second sub-frame period. In this case, the first voltage may be greater than the second voltage.

The light emitting device may emit light at least twice during a frame period, and the frame period may include the first sub-frame period and the second sub-frame period.

The light emitting device may emit light at a frame luminance during the frame period, and the frame luminance is equal to a sum of the first luminance and the second luminance.

The frame period may further include a third sub-frame period in which light is emitted at the first luminance.

The display device according to embodiments of the present disclosure may further include a control signal generation circuit for generating a control signal that controls the voltage control transistor. The control signal generation circuit may receive a clock signal and a data signal, and generate the control signal based on the clock signal and the data signal.

Embodiments of the present disclosure may provide a driving method of a display device including a first driving step in which a light emitting device emits light with a first luminance in a first sub-frame period, and a second driving step in which the light emitting device emits light with a second luminance different from the first luminance in a second sub-frame period different from the first sub-frame period. The light emitting device may be driven during a frame period for expressing one frame, and the frame period may include the first sub-frame period and the second sub-frame period. In addition, in the first driving step, the light emitting device may emit light at the first luminance brighter than the second luminance.

A first voltage may be supplied to the light emitting device in the first driving step, and a second voltage different from the first voltage may be supplied to the light emitting device in the second driving step. In this case, the first voltage may be greater than the second voltage.

The driving method of a display device according to embodiments of the present disclosure may further include a third driving step in which the light emitting device emits light at the first luminance during a third sub-frame period.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention.

What is claimed is:

1. A display device comprising:

a light emitting device with a first electrode and a second electrode;

a column line electrically connected to the first electrode;

a row line electrically connected to the second electrode; and a driver electrically connected to the column line and the row line, the driver configured to control an emission of the light emitting device in each of a plurality of sub-frame periods, wherein the light emitting device emits light with a first luminance in a first sub-frame period, wherein the light emitting device emits light with a second luminance that is different from the first luminance in a second sub-frame period different from the first sub-frame period, wherein the first luminance is brighter than the second luminance, and wherein the driver includes:

a column driver configured to drive the column line; and a row driver configured to drive the row line, wherein the column driver includes a voltage control transistor electrically connected between the first electrode and a first voltage node, and an emission control transistor electrically connected between the first electrode and a driving voltage node.

2. The display device of claim 1, wherein the column line is supplied with a first driving voltage in the first sub-frame period, wherein the column line is supplied with a second driving voltage that is different from the first driving voltage in the second sub-frame period, wherein the first driving voltage is greater than the second driving voltage.

3. The display device of claim 1, wherein the light emitting device emits light at the first luminance during the first sub-frame period and then switches to a non-emission state, and emits light at the second luminance during the second sub-frame period and then switches to a non-emission state.

4. The display device of claim 1, wherein the light emitting device emits light with the first luminance in a third sub-frame period, and the light emitting device is driven during a frame period for expressing one frame, wherein the frame period includes the first sub-frame period, the second sub-frame period, and the third sub-frame period.

5. The display device of claim 1, wherein the column driver further includes a driving transistor electrically connected between the driving voltage node and the emission control transistor.

6. The display device of claim 5, wherein the column driver further includes:

an initialization buffer connected between an initialization switch and an initialization voltage node, the initialization buffer configured to amplify an initialization voltage applied to the initialization voltage node and supply the amplified initialization voltage to a gate electrode of the driving transistor;

a pre-charge buffer connected between a pre-charge switch and a pre-charge voltage node, the pre-charge buffer configured to amplify a pre-charge voltage applied to the pre-charge voltage node and supply the amplified pre-charged voltage to a node between the emission control transistor and the driving transistor; and a reset buffer connected between a reset switch and a reset voltage node, the reset buffer configured to amplify a reset voltage applied to the reset voltage node and supply the amplified reset voltage to the first electrode.

7. The display device of claim 6, wherein the row driver includes a low-potential buffer connected between a display-off switch and a low-potential voltage node.

8. The display device of claim 5, wherein the emission control transistor includes:

a first emission control transistor connected between the driving voltage node and the driving transistor; and a second emission control transistor connected between the driving transistor and the first electrode.

9. The display device of claim 8, wherein the column driver further includes:

a first transistor connected between a gate electrode of the driving transistor and an initialization voltage node;

a second transistor connected between a node, which is between the driving transistor and the second emission control transistor, and a reference voltage node;

a third transistor connected between a node, which is between the driving transistor and the first emission control transistor, and a pre-charge voltage node;

a fourth transistor connected between the first electrode and a reset voltage node; and a fifth transistor connected between the gate electrode of the driving transistor and a node which is between the driving transistor and the first emission control transistor.

10. A display device comprising:

a light emitting device with a first electrode and a second electrode;

a column driver electrically connected to the first electrode; and a row driver electrically connected to the second electrode, wherein the column driver includes a voltage control transistor electrically connected between the first electrode and a first voltage node and an emission control transistor electrically connected between the first electrode and a driving voltage node, and wherein a period during which the light emitting device is driven includes:

a first sub-frame period during which the light emitting device emits light at a first luminance; and a second sub-frame period during which the light emitting device emits light at a second luminance different from the first luminance.

11. The display device of claim 10, wherein the first voltage node is a node supplied with a first voltage, wherein the first electrode is supplied with the first voltage if the voltage control transistor is turned on.

12. The display device of claim 11, wherein the driving voltage node is a node to supplied with a driving voltage, wherein the first voltage has a same voltage level as the driving voltage.

13. The display device of claim 10, wherein the column driver further includes a driving transistor electrically connected between the driving voltage node and the emission control transistor, wherein the driving transistor is in a turn-off state if the voltage control transistor is in a turn-on state.

14. The display device of claim 13, wherein the light emitting device emits light at least twice during a frame period, wherein the frame period includes the first sub-frame period and the second sub-frame period.

15. The display device of claim 14, wherein the light emitting device emits light at a frame luminance during the frame period, wherein the frame luminance is equal to a sum of the first luminance and the second luminance.

16. The display device of claim 14, wherein the frame period further includes a third sub-frame period in which light is emitted at the first luminance.

17. The display device of claim 13, wherein the column driver further includes:

a first transistor connected between a gate electrode of the driving transistor and an initialization voltage node;

a second transistor connected between a node, which is between the driving transistor and the second emission control transistor, and a reference voltage node;

a third transistor connected between a node, which is between the driving transistor and the first emission control transistor, and a pre-charge voltage node;

a fourth transistor connected between the first electrode and a reset voltage node; and a fifth transistor connected between the gate electrode of the driving transistor and a node which is between the driving transistor and the first emission control transistor.

18. The display device of claim 17, wherein the emission control transistor includes:

a first emission control transistor connected between the driving voltage node and the driving transistor; and a second emission control transistor connected between the driving transistor and the first electrode.

19. The display device of claim 13, wherein the column driver further includes:

an initialization buffer connected between an initialization switch and an initialization voltage node, the initialization buffer configured to amplify an initialization voltage applied to the initialization voltage node and supply the amplified initialization voltage to a gate electrode of the driving transistor;

a pre-charge buffer connected between a pre-charge switch and a pre-charge voltage node, the pre-charge buffer configured to amplify a pre-charge voltage applied to the pre-charge voltage node and supply the amplified pre-charged voltage to a node between the emission control transistor and the driving transistor; and a reset buffer connected between a reset switch and a reset voltage node, the reset buffer configured to amplify a reset voltage applied to the reset voltage node and supply the amplified reset voltage to the first electrode.

20. The display device of claim 19, wherein the row driver includes a low-potential buffer connected between a display-off switch and a low-potential voltage node.

21. The display device of claim 10, wherein the emission control transistor is in a turn-off state if the voltage control transistor is in a turn-on state.

22. The display device of claim 10, wherein the voltage control transistor is in a turn-off state if the emission control transistor is in a turn-on state.

23. The display device of claim 10, wherein the light emitting device emits light at a first luminance if the voltage control transistor is in a turn-on state and the emission control transistor is in a turn-off state, wherein the light emitting device emits light at a second luminance different from the first luminance if the voltage control transistor is in a turn-off state and the emission control transistor is in a turn-on state, wherein the first luminance is brighter than the second luminance.

24. The display device of claim 10, wherein the first electrode is supplied with a first voltage in the first sub-frame period and the first electrode is supplied with a second voltage different from the first voltage in the second sub-frame period, wherein the first voltage is greater than the second voltage.

25. The display device of claim 10, further comprising:

a control signal generation circuit configured to generate a control signal that controls the voltage control transistor, wherein the control signal generation circuit receives a clock signal and a data signal, and generates the control signal based on the clock signal and the data signal.

26. The display device of claim 25, wherein the data signal includes information about a time for which the voltage control transistor is to be maintained in a turn-on state.

27. A driving method of a display device, comprising:

a first driving step in which a light emitting device emits light with a first luminance in a first sub-frame period;

a second driving step in which the light emitting device emits light with a second luminance that is different from the first luminance in a second sub-frame period that is different from the first sub-frame period; and a third driving step in which the light emitting device emits light at the first luminance during a third sub-frame period, wherein the light emitting device is driven during a frame period for expressing one frame, wherein the frame period includes the first sub-frame period and, the second sub-frame period and the third sub-frame period, wherein, in the first driving step, the light emitting device emits light at the first luminance that is brighter than the second luminance.

28. The driving method of claim 27, wherein a first voltage is supplied to the light emitting device in the first driving step, wherein a second voltage that is different from the first voltage is supplied to the light emitting device in the second driving step, wherein the first voltage is greater than the second voltage.

29. The driving method of claim 27, wherein the display device includes a column line electrically connected to a first electrode of the light emitting device, wherein the column line is supplied with a first driving voltage in the first sub-frame period, wherein the column line is supplied with a second driving voltage that is different from the first driving voltage in the second sub-frame period, wherein the first driving voltage is greater than the second driving voltage.

30. The driving method of claim 29, wherein the display device further includes a column driver configured to drive the column line, wherein the column driver includes a voltage control transistor electrically connected between the first electrode and a first voltage node, and an emission control transistor electrically connected between the first electrode and a driving voltage node.

* * * * *